US010803160B2

United States Patent
Tussy

(10) Patent No.: US 10,803,160 B2
(45) Date of Patent: Oct. 13, 2020

(54) METHOD TO VERIFY AND IDENTIFY BLOCKCHAIN WITH USER QUESTION DATA

(71) Applicant: FaceTec, Inc., Las Vegas, NV (US)

(72) Inventor: Kevin Alan Tussy, Las Vegas, NV (US)

(73) Assignee: FaceTec, Inc., Las Vegas, NV (US)

( * ) Notice: Subject to any disclaimer, the term of this patent is extended or adjusted under 35 U.S.C. 154(b) by 0 days.

(21) Appl. No.: 16/405,906

(22) Filed: May 7, 2019

(65) Prior Publication Data

US 2019/0311102 A1 Oct. 10, 2019

Related U.S. Application Data

(63) Continuation-in-part of application No. 16/256,955, filed on Jan. 24, 2019, which is a continuation-in-part
(Continued)

(51) Int. Cl.
*G06F 21/32* (2013.01)
*G06Q 20/40* (2012.01)
(Continued)

(52) U.S. Cl.
CPC ............ *G06F 21/32* (2013.01); *G06F 21/34* (2013.01); *G06K 9/00255* (2013.01);
(Continued)

(58) Field of Classification Search
CPC ........ G06F 21/32; G06F 21/34; H04W 12/06; G06K 9/00255; G06K 9/00288; G06K 9/00912; G06K 9/00926; G06K 9/22
See application file for complete search history.

(56) References Cited

U.S. PATENT DOCUMENTS 5,031,228 A 7/1991 Lu
5,699,449 A 12/1997 Javidi
(Continued)

FOREIGN PATENT DOCUMENTS

CN 103593594 2/2014
EP 1388802 2/2004
(Continued)

OTHER PUBLICATIONS

Hagai Aronowitz, et al., Multi-Modal Biometrics for Mobile Authentication, IJCB, 2014.
(Continued)

*Primary Examiner* — Shanto Abedin
(74) *Attorney, Agent, or Firm* — Weide & Miller, Ltd.

(57) ABSTRACT

Systems and methods for enrolling and authenticating a user in an authentication system via a camera of a computing device include capturing and storing biometric information from at least one first image and at least one second image of the user taken via the camera. Prior to use, the user answers personal questions and the answers are stored as stored answer data. Later, such as at a business, the questions are presented to the user and the user provides their personal answers via a computing device. The answers are processed and uploaded to an authentication server where a comparison occurs against the stored answer data. If a match does not occur, then the authentication/identity verification processes ends. If a match does occur, then the authentication process continues. The questions match may serve as a gate function for accessing authentication data stored in a blockchain.

20 Claims, 21 Drawing Sheets

Related U.S. Application Data of application No. 15/900,681, filed on Feb. 20, 2018, now Pat. No. 10,614,204, and a continuation-in-part of application No. 15/934,105, filed on Mar. 23, 2018, now Pat. No. 10,262,126, which is a continuation of application No. 14/839,505, filed on Aug. 28, 2015, now Pat. No. 9,953,149, said application No. 15/900,681 is a continuation of application No. 14/839,505, filed on Aug. 28, 2015, now Pat. No. 9,953,149.

(60) Provisional application No. 62/668,158, filed on May 7, 2018, provisional application No. 62/321,504, filed on Jan. 24, 2018, provisional application No. 62/188,584, filed on Jul. 3, 2015, provisional application No. 62/139,558, filed on Mar. 27, 2015, provisional application No. 62/101,317, filed on Jan. 8, 2015, provisional application No. 62/085,963, filed on Dec. 1, 2014, provisional application No. 62/064,415, filed on Oct. 15, 2014, provisional application No. 62/054,847, filed on Sep. 24, 2014, provisional application No. 62/043,224, filed on Aug. 28, 2014, provisional application No. 62/460,670, filed on Feb. 17, 2017.

(51) Int. Cl.

| | |
|---|---|
| *G06K 9/00* | (2006.01) |
| *H04W 12/06* | (2009.01) |
| *G06Q 20/32* | (2012.01) |
| *G06K 9/22* | (2006.01) |
| *G06F 21/34* | (2013.01) |
| *H04W 12/00* | (2009.01) |
| *H04L 29/06* | (2006.01) |
| *H04W 88/02* | (2009.01) |

(52) U.S. Cl.
CPC ..... *G06K 9/00288* (2013.01); *G06K 9/00892* (2013.01); *G06K 9/00912* (2013.01); *G06K 9/00926* (2013.01); *G06K 9/22* (2013.01); *G06Q 20/3276* (2013.01); *G06Q 20/40145* (2013.01); *H04W 12/06* (2013.01); *G06K 9/00335* (2013.01); *H04L 63/0861* (2013.01); *H04W 12/00504* (2019.01); *H04W 12/00508* (2019.01); *H04W 88/02* (2013.01)

(56) References Cited

U.S. PATENT DOCUMENTS

| | | | |
|---|---|---|---|
| 5,781,650 | A | 7/1998 | Lobo et al. |
| 5,784,056 | A | 7/1998 | Nielsen |
| 5,835,616 | A | 11/1998 | Lobo et al. |
| 5,842,194 | A | 11/1998 | Arbuckle |
| 5,850,470 | A | 12/1998 | Kung et al. |
| 5,956,122 | A | 9/1999 | Doster |
| 5,982,912 | A | 11/1999 | Fukui et al. |
| 6,134,339 | A | 10/2000 | Luo |
| 6,173,068 | B1 | 1/2001 | Prokoski |
| 6,212,030 | B1 | 4/2001 | Koriyama et al. |
| 6,246,779 | B1 | 6/2001 | Fukui et al. |
| 6,301,370 | B1 | 10/2001 | Steffens et al. |
| 6,310,601 | B1 | 10/2001 | Moore et al. |
| 6,389,176 | B1 | 5/2002 | Hsu et al. |
| 6,461,807 | B1 | 10/2002 | Friend et al. |
| D485,279 | S | 1/2004 | DeCombe |
| 6,678,664 | B1 | 1/2004 | Ganesan |
| 6,687,390 | B2 | 2/2004 | Avni et al. |
| 6,697,502 | B2 | 2/2004 | Luo |
| 6,711,584 | B1 | 3/2004 | Wajda et al. |
| 6,728,401 | B1 | 4/2004 | Hardeberg |
| 6,775,397 | B1 | 8/2004 | Hamalainen |
| 6,840,149 | B2 | 1/2005 | Beal |
| 6,961,361 | B1 | 11/2005 | Tanaka |
| 7,003,135 | B2 | 2/2006 | Hsieh et al. |
| 7,211,138 | B2 | 5/2007 | Yamamoto et al. |
| 7,218,774 | B2 | 5/2007 | Liu |
| 7,231,657 | B2 | 6/2007 | Honarvar et al. |
| 7,289,648 | B2 | 10/2007 | Liu |
| 7,308,581 | B1 | 12/2007 | Geosimonian |
| 7,333,963 | B2 | 2/2008 | Widrow et al. |
| 7,415,152 | B2 | 8/2008 | Jiang et al. |
| 7,428,320 | B2 | 9/2008 | Northcott et al. |
| 7,460,916 | B2 | 12/2008 | Batruni |
| 7,519,200 | B2 | 4/2009 | Gokturk et al. |
| D596,192 | S | 7/2009 | Shotel |
| D601,582 | S | 10/2009 | Chaudhri |
| D606,082 | S | 12/2009 | Parker |
| 7,636,450 | B1 | 12/2009 | Bourdev |
| 7,646,909 | B2 | 1/2010 | Jiang et al. |
| 7,660,444 | B2 | 2/2010 | Hamalainen |
| 7,710,693 | B2 | 5/2010 | Guzman-Casillas et al. |
| 7,783,118 | B2 | 8/2010 | Zhou |
| 7,788,247 | B2 | 8/2010 | Wang et al. |
| 7,804,982 | B2 | 9/2010 | Howard et al. |
| D625,325 | S | 10/2010 | Vu |
| 7,809,722 | B2 | 10/2010 | Gokturk et al. |
| D637,604 | S | 5/2011 | Brinda |
| 7,945,653 | B2 | 5/2011 | Zuckerberg et al. |
| D640,277 | S | 6/2011 | Woo |
| 7,960,470 | B2 | 6/2011 | Okahira |
| D650,793 | S | 12/2011 | Impas |
| 8,121,408 | B2 | 2/2012 | Omori |
| 8,165,352 | B1 | 4/2012 | Mohanty et al. |
| D663,743 | S | 7/2012 | Tanghe |
| D663,744 | S | 7/2012 | Tanghe |
| 8,210,247 | B2 | 7/2012 | Blomgren |
| 8,244,211 | B2 | 8/2012 | Clark |
| D667,423 | S | 9/2012 | Nagamine |
| 8,280,120 | B2 | 10/2012 | Hoyos et al. |
| 8,316,237 | B1 | 11/2012 | Felsher et al. |
| 8,326,000 | B2 | 12/2012 | Jung et al. |
| 8,392,268 | B2 | 3/2013 | Smith et al. |
| 8,396,246 | B2 | 3/2013 | Anbalagan et al. |
| 8,411,909 | B1 | 4/2013 | Zhao et al. |
| 8,416,312 | B2 | 4/2013 | Matsunaga |
| 8,460,024 | B2 | 6/2013 | Damodharan et al. |
| D692,018 | S | 10/2013 | Wenz |
| D692,915 | S | 11/2013 | Brinda |
| 8,649,604 | B2 | 2/2014 | Steinberg et al. |
| D702,714 | S | 4/2014 | Abratowski |
| 8,709,801 | B2 | 4/2014 | Pan et al. |
| 8,743,051 | B1 | 6/2014 | Moy et al. |
| 8,750,574 | B2 | 6/2014 | Ganong et al. |
| 8,788,977 | B2 | 7/2014 | Bezos |
| D712,909 | S | 9/2014 | Francisco |
| D713,410 | S | 9/2014 | Francisco |
| D715,317 | S | 10/2014 | Pearce |
| 8,856,541 | B1 | 10/2014 | Chaudhury |
| 8,867,849 | B1 | 10/2014 | Kirkham |
| D717,339 | S | 11/2014 | Wen |
| D717,829 | S | 11/2014 | Lee |
| 8,922,480 | B1 | 12/2014 | Freed et al. |
| 8,959,578 | B2 | 2/2015 | Simpson et al. |
| D725,151 | S | 3/2015 | Bray |
| D725,668 | S | 3/2015 | Clare |
| D726,221 | S | 4/2015 | Gomez |
| D728,623 | S | 5/2015 | Lim |
| D730,389 | S | 5/2015 | Izotov |
| 9,037,354 | B2 | 5/2015 | Mondragon |
| D730,941 | S | 6/2015 | Marianek |
| D731,552 | S | 6/2015 | Seo |
| 9,069,447 | B2 | 6/2015 | Kim |
| D733,755 | S | 7/2015 | Kadosh |
| 9,076,008 | B1 | 7/2015 | Moy |
| 9,076,028 | B2 | 7/2015 | Summers |
| D736,812 | S | 8/2015 | Yoo |
| D737,325 | S | 8/2015 | Kim |
| D738,921 | S | 9/2015 | Lim |
| 9,137,246 | B2 | 9/2015 | Parry et al. |
| D740,833 | S | 10/2015 | Bae |
| 9,152,849 | B2 | 10/2015 | Ganong et al. |

(56) References Cited

U.S. PATENT DOCUMENTS

| | | |
|---|---|---|
| D742,417 S | 11/2015 | Brunner |
| D745,567 S | 12/2015 | Park |
| 9,202,105 B1 | 12/2015 | Wang et al. |
| 9,209,355 B2 | 12/2015 | Senda et al. |
| D747,354 S | 1/2016 | Park |
| D752,078 S | 3/2016 | Guesnon, Jr. |
| D753,132 S | 4/2016 | Cuthbert |
| D756,401 S | 5/2016 | Soldner |
| D757,084 S | 5/2016 | Chaudhri |
| D759,723 S | 6/2016 | Butcher |
| D761,268 S | 7/2016 | Oh |
| D761,277 S | 7/2016 | Harvell |
| D762,655 S | 8/2016 | Kai |
| D762,673 S | 8/2016 | Seo |
| D762,715 S | 8/2016 | Williamson |
| D763,271 S | 8/2016 | Everette |
| D763,306 S | 8/2016 | Lee |
| D764,526 S | 8/2016 | Gomez |
| D764,534 S | 8/2016 | Seo |
| D765,117 S | 8/2016 | Joo |
| D765,133 S | 8/2016 | Joo |
| 9,424,491 B1 | 8/2016 | Kirkham |
| 9,430,695 B2 | 8/2016 | Summers |
| D765,674 S | 9/2016 | Kim |
| D766,298 S | 9/2016 | Bae |
| D766,314 S | 9/2016 | Bauer |
| D766,926 S | 9/2016 | Fleischmann |
| 9,448,687 B1 | 9/2016 | McKenzie |
| D769,933 S | 10/2016 | Sabia |
| 9,459,132 B2 | 10/2016 | Fehrenbach et al. |
| D772,288 S | 11/2016 | Montes |
| D772,929 S | 11/2016 | Montes |
| D776,680 S | 1/2017 | Bae |
| D777,755 S | 1/2017 | Beaty |
| D778,923 S | 2/2017 | Zhou |
| D778,940 S | 2/2017 | Williamson |
| D780,781 S | 3/2017 | Ding |
| 9,600,649 B2 | 3/2017 | Parry et al. |
| 9,607,138 B1 | 3/2017 | Baldwin |
| D783,633 S | 4/2017 | Oh |
| D783,652 S | 4/2017 | Guan |
| D784,363 S | 4/2017 | Fleming et al. |
| D787,527 S | 5/2017 | Wilberding |
| D788,122 S | 5/2017 | Tada |
| D788,810 S | 6/2017 | Kim |
| D790,567 S | 6/2017 | Su |
| D791,158 S | 7/2017 | Shiino |
| 9,708,909 B2 | 7/2017 | Atkinson et al. |
| D794,663 S | 8/2017 | Sakuma |
| 9,740,848 B2 | 8/2017 | Parry et al. |
| D798,321 S | 9/2017 | Lieb |
| D798,902 S | 10/2017 | Choi |
| D799,544 S | 10/2017 | Kim |
| D800,743 S | 10/2017 | Rhodes |
| 9,798,420 B2 | 10/2017 | Ichikawa |
| D801,990 S | 11/2017 | Reissner |
| D803,870 S | 11/2017 | Landry |
| D805,546 S | 12/2017 | Wu |
| D805,548 S | 12/2017 | King |
| D806,113 S | 12/2017 | Beckman |
| D807,378 S | 1/2018 | Imamura |
| D807,381 S | 1/2018 | Hersh |
| 9,911,036 B2 | 3/2018 | Hartman |
| D817,994 S | 5/2018 | Jou |
| D819,075 S | 5/2018 | Tsuji |
| 9,958,687 B2 | 5/2018 | Chern et al. |
| D820,305 S | 6/2018 | Clediere |
| D821,439 S | 6/2018 | Sowden |
| D821,443 S | 6/2018 | Jang |
| D822,054 S | 7/2018 | Persson |
| D823,335 S | 7/2018 | Alonso |
| D823,867 S | 7/2018 | Berlow |
| D823,891 S | 7/2018 | Lupe |
| D825,587 S | 8/2018 | O'Rourke |
| D825,588 S | 8/2018 | Hashimoto |
| 2002/0054059 A1 | 5/2002 | Schneiderman |
| 2002/0055955 A1 | 5/2002 | Lloyd-Jones et al. |
| 2002/0103813 A1 | 5/2002 | Frigon |
| 2002/0087622 A1 | 7/2002 | Anderson |
| 2002/0191818 A1 | 12/2002 | Matsuo et al. |
| 2003/0039380 A1 | 2/2003 | Sukegawa et al. |
| 2003/0053663 A1 | 3/2003 | Chen et al. |
| 2003/0063669 A1 | 4/2003 | Lee et al. |
| 2003/0095053 A1 | 5/2003 | Kandogan |
| 2003/0103652 A1 | 6/2003 | Lee et al. |
| 2003/0133599 A1 | 7/2003 | Tian et al. |
| 2003/0198368 A1 | 10/2003 | Kee |
| 2003/0236832 A1 | 12/2003 | McIntyre et al. |
| 2004/0070678 A1 | 4/2004 | Toyama et al. |
| 2004/0081338 A1 | 4/2004 | Takenaka |
| 2004/0109584 A1 | 6/2004 | Lestideau |
| 2004/0125991 A1 | 7/2004 | Yokoi |
| 2004/0143598 A1 | 7/2004 | Drucker et al. |
| 2004/0190758 A1 | 9/2004 | Doi et al. |
| 2004/0201709 A1 | 10/2004 | McIntyre et al. |
| 2004/0218792 A1 | 11/2004 | Squilla et al. |
| 2004/0264780 A1 | 12/2004 | Zhang et al. |
| 2005/0031173 A1 | 2/2005 | Hwang |
| 2005/0065855 A1 | 3/2005 | Geller |
| 2005/0094849 A1 | 5/2005 | Sung et al. |
| 2005/0100195 A1 | 5/2005 | Li |
| 2005/0117802 A1 | 6/2005 | Yonaha et al. |
| 2005/0141766 A1 | 6/2005 | Nagahashi et al. |
| 2005/0180627 A1 | 8/2005 | Yang et al. |
| 2005/0190273 A1 | 9/2005 | Toyama et al. |
| 2005/0220347 A1 | 10/2005 | Enomoto et al. |
| 2005/0251015 A1 | 11/2005 | Takikawa et al. |
| 2005/0265603 A1 | 12/2005 | Porter et al. |
| 2006/0050933 A1 | 3/2006 | Adam et al. |
| 2006/0110014 A1 | 5/2006 | Philomin |
| 2006/0133672 A1 | 6/2006 | Li |
| 2006/0156029 A1 | 7/2006 | Algazi |
| 2006/0173560 A1 | 8/2006 | Widrow |
| 2006/0218225 A1 | 9/2006 | Hee Voon et al. |
| 2006/0222215 A1 | 10/2006 | Jung et al. |
| 2006/0224523 A1 | 10/2006 | Elvitigala |
| 2006/0239515 A1 | 10/2006 | Zhang et al. |
| 2006/0251292 A1 | 11/2006 | Gokturk et al. |
| 2006/0251338 A1 | 11/2006 | Gokturk et al. |
| 2006/0251339 A1 | 11/2006 | Gokturk et al. |
| 2006/0253491 A1 | 11/2006 | Gokturk et al. |
| 2006/0274978 A1 | 12/2006 | Fukuda et al. |
| 2007/0074114 A1 | 3/2007 | Adjali et al. |
| 2007/0081744 A1 | 4/2007 | Gokturk et al. |
| 2007/0098303 A1 | 5/2007 | Gallagher et al. |
| 2007/0177805 A1 | 8/2007 | Gallagher |
| 2007/0206834 A1 | 9/2007 | Shinkai et al. |
| 2007/0211925 A1 | 9/2007 | Aoki et al. |
| 2007/0290499 A1 | 12/2007 | Tame |
| 2008/0037869 A1 | 2/2008 | Zhou |
| 2008/0046458 A1 | 2/2008 | Tseng et al. |
| 2008/0077595 A1 | 3/2008 | Leebow |
| 2008/0080743 A1 | 4/2008 | Schneiderman et al. |
| 2008/0080745 A1 | 4/2008 | Vanhoucke et al. |
| 2008/0091723 A1 | 4/2008 | Zuckerberg et al. |
| 2008/0100195 A1 | 5/2008 | Kim et al. |
| 2008/0130960 A1 | 6/2008 | Yagnik |
| 2008/0212849 A1 | 9/2008 | Gao |
| 2008/0317379 A1 | 12/2008 | Steinberg et al. |
| 2009/0185784 A1 | 7/2009 | Hiroike et al. |
| 2009/0226052 A1 | 9/2009 | Fedel |
| 2009/0232367 A1 | 9/2009 | Shinzaki |
| 2009/0252383 A1 | 10/2009 | Adam et al. |
| 2009/0324018 A1 | 12/2009 | Tell |
| 2009/0324022 A1 | 12/2009 | Sangberg et al. |
| 2009/0324137 A1 | 12/2009 | Stallings et al. |
| 2010/0050134 A1 | 2/2010 | Clarkson |
| 2010/0054600 A1 | 3/2010 | Anbalagan et al. |
| 2010/0054601 A1 | 3/2010 | Anbalagan et al. |
| 2010/0061631 A1 | 3/2010 | Omori |
| 2010/0067750 A1 | 3/2010 | Matsuo |
| 2010/0158327 A1 | 6/2010 | Kangas et al. |
| 2010/0232656 A1 | 9/2010 | Ryu |
| 2010/0245614 A1 | 9/2010 | Matsunaga |

(56) References Cited

U.S. PATENT DOCUMENTS

| | | |
|---|---|---|
| 2010/0272363 A1 | 10/2010 | Steinberg et al. |
| 2010/0287053 A1 | 11/2010 | Ganong et al. |
| 2010/0310133 A1 | 12/2010 | Mason et al. |
| 2010/0317420 A1 | 12/2010 | Hoffberg |
| 2010/0318366 A1 | 12/2010 | Sullivan |
| 2011/0063108 A1 | 3/2011 | Aonuma et al. |
| 2011/0169853 A1 | 7/2011 | Oiwa |
| 2011/0202531 A1 | 8/2011 | Zuckerberg et al. |
| 2011/0225481 A1 | 9/2011 | Zuckerberg et al. |
| 2011/0282906 A1 | 11/2011 | Wong |
| 2012/0140993 A1 | 6/2012 | Bruso et al. |
| 2012/0235790 A1 | 9/2012 | Zhao et al. |
| 2012/0323704 A1 | 12/2012 | Steelberg |
| 2013/0007032 A1 | 1/2013 | Klappert |
| 2013/0057693 A1 | 3/2013 | Baranek |
| 2013/0066526 A1 | 3/2013 | Mondragon |
| 2013/0077835 A1 | 3/2013 | Kritt et al. |
| 2013/0086674 A1 | 4/2013 | Horvitz et al. |
| 2013/0179298 A1 | 7/2013 | Segman |
| 2013/0212655 A1* | 8/2013 | Hoyos ............... G06K 9/00906 726/5 |
| 2013/0226740 A1 | 8/2013 | Biliosa |
| 2013/0246158 A1 | 9/2013 | Cannon |
| 2013/0267204 A1 | 10/2013 | Schultz et al. |
| 2013/0342672 A1 | 12/2013 | Gray et al. |
| 2014/0012756 A1 | 1/2014 | Beraja |
| 2014/0022179 A1 | 1/2014 | Yoon |
| 2014/0059673 A1 | 2/2014 | Azar |
| 2014/0098174 A1 | 4/2014 | Summers |
| 2014/0118257 A1 | 5/2014 | Baldwin |
| 2014/0123275 A1 | 5/2014 | Azar et al. |
| 2014/0165187 A1 | 6/2014 | Daesung |
| 2014/0169643 A1 | 6/2014 | Todoroki |
| 2014/0173443 A1 | 6/2014 | Hawkins, III |
| 2014/0197922 A1 | 7/2014 | Stanwood et al. |
| 2014/0198959 A1 | 7/2014 | Derakhshani |
| 2014/0337791 A1 | 11/2014 | Agnetta |
| 2014/0337948 A1 | 11/2014 | Hoyos |
| 2014/0351761 A1 | 11/2014 | Bae |
| 2015/0052462 A1 | 2/2015 | Kulkarni |
| 2015/0055821 A1 | 2/2015 | Fotland |
| 2015/0074615 A1 | 3/2015 | Han |
| 2015/0077323 A1 | 3/2015 | Ramaswamy |
| 2015/0131872 A1 | 5/2015 | Ganong et al. |
| 2015/0148106 A1 | 5/2015 | Choi |
| 2015/0153571 A1 | 6/2015 | Ballard |
| 2015/0205399 A1 | 7/2015 | Kim |
| 2015/0205454 A1 | 7/2015 | Ainslie |
| 2015/0212684 A1 | 7/2015 | Sabia |
| 2015/0227286 A1 | 8/2015 | Kang et al. |
| 2015/0310260 A1 | 10/2015 | Summers |
| 2015/0378433 A1 | 12/2015 | Savastinuk et al. |
| 2016/0026425 A1 | 1/2016 | Lee |
| 2016/0063235 A1 | 3/2016 | Tussy |
| 2016/0071111 A1 | 3/2016 | Wang et al. |
| 2016/0209939 A1 | 7/2016 | Zambetti |
| 2016/0259528 A1 | 9/2016 | Foss |
| 2016/0261675 A1 | 9/2016 | Block |
| 2016/0284123 A1 | 9/2016 | Hare |
| 2016/0342826 A1 | 11/2016 | Apostolos et al. |
| 2017/0083086 A1 | 3/2017 | Mazur |
| 2017/0220843 A1 | 8/2017 | Apostolos et al. |
| 2017/0257770 A1* | 9/2017 | Derakhshani ...... G06K 9/00268 |
| 2018/0039990 A1* | 2/2018 | Lindemann ............ G06F 21/31 |
| 2018/0139157 A1 | 5/2018 | Decculus |
| 2018/0253539 A1* | 9/2018 | Minter .............. H04W 12/0605 |
| 2018/0342018 A1 | 11/2018 | Pancholi |
| 2019/0026450 A1* | 1/2019 | Egner .................. H04W 12/06 |
| 2019/0080189 A1 | 3/2019 | Van Os |
| 2019/0222567 A1* | 7/2019 | Caldera .............. H04L 63/0823 |

FOREIGN PATENT DOCUMENTS

| | | |
|---|---|---|
| EP | 1455297 | 9/2004 |
| JP | 2007-148968 | 6/2007 |
| KR | 20130097581 | 9/2013 |
| WO | WO 2006/130542 | 12/2006 |
| WO | WO 2008/107002 | 9/2008 |
| WO | WO 2015/070320 | 5/2015 |
| WO | WO 2007/119818 | 10/2019 |

OTHER PUBLICATIONS

Silvio Barra, et al., FAME: Face Authentication for Mobile Encounter, IEEE, 2013.
Girija Chetty, et al., Liveness Verification in Audio-Video Speaker Authentication, Australian Speech Science & Technology Association Inc., 2004.
Rogssignol, Joe. "How to customise the Lock screen in iOS 7." iDownloadBlog, posted Jan. 11, 2014 (Retrieved from the internet Mar. 30, 2016). Internet URL: <http: //www.idownloadblog.com/2014/01/11/how-to-theme-the-lock-screen-on-oos-7/>.
Android_locked-out-PDF, screenshot, date unknown, author unknown.
Android-lock-screen1-PDF, screenshot, date unknown, author unknown.
Facetime-PDF, screenshot, date unknown, author unknown.
Image 9-PDF, screenshot, date unknown, author unknown.
Iphone-Facetime-PDF, screen shot, date unknown, author unknown.
Keyboard-PDF, screen shot, date unknown, author unknown.
Passcode-lock-PDF, screen shot, date unknown, author unknown.
Passcode-PDF, screen shot, date unknown, author unknown.
Screen Shot-PDF, screen shot, date unknown, author unknown.
Screenshot_2012-06-20-16-06-32-PDF, screen shot, date unknown, author unknown.
Topic_facetime_ios-PDF, screen shot, date unknown, author unknown.
Wp_ss_20130124_00071-PDF, screen shot, Jan. 24, 2013, author unknown.
Shutterstock [online], Aug. 4, 2014 [retried Jul. 24, 2016]. Retrieved from the internet URL:http://www.tineye.com/search/543afefb8836762927558call587ce7f99a706ad/.,pic-199246373 stock phot male silhouette image.
After Effects Tutorial—17—Introduction to Masking, by thenewboston, uploaded Dec. 7, 2008, youtube.com [online], [retrieved Jun. 15, 2017]. Available from <URL:https://www.youtube.com/watch?v=kWd51xDqzlc>.
Optical Illusions—Animated GIF & JPG, dated Oct. 28, 2013, plus.google.com [online], [retrieved Jun. 19, 2017]. Available from internet <URL:https://plus.google.com/+Whak-Off/posts/CX4YhzXSQy2>.
The Universal Face Login for 5 Billion Smartphones, zoomlogin.com [online], [retrieved Jun. 19, 2017]. Available from internet <URL:https://zoomlogin.com/>.
Wong, Yongkang, et al. "Patch-based probabilistic image quality assessment for face selection and improved video-based face recognition." CVPR 2011 Workshops. IEEE, 2011.
Rafalovitch, "Viewfinder Friends-idea for Facebook application", Nov. 14, 2007, http://blog.outerthoughts.com/2007/11/viewfinder-friends-idea-for-facebook-application/, 5pages.
Kishore, "How to Add, Upload, and Tag Your Pictures and Photos in FaceBook", http://www.online-tech-tips.com/fun-stuff/how-to-add-upload-and-tag-your-pictures-and-photos-in-facebook/, Aug. 11, 2007, 13 pages.
Becker et al., "Evaluation of Face Recognition Techniques for Application to Facebook", IEEE International conference on Automatic Face and Gesture Recognition, 2008, 6 pages.
Baker, "Google & Riya Face Recognition Photo Search", Nov. 22, 2005, http://www.searchenginejournal.com/google-riya-face-recognition-photo-search/25501, 1 page_.
Ponce, "Riya, Photo Sharing with Face Recognition", Oct. 28, 2005, http://www.ohgizmo.com/2005/10/28/riya-photo-sharing-with-face-recognition/, 2 pages_.
Facebook, "Making Photo Tagging Easier", https://m.facebook.com/notes/facebook/making-photo-tagging-easier/467145887130/?_tn_=C&_rdr, 2 pages.

(56) References Cited

OTHER PUBLICATIONS

Michelson et al., "Auto-tagging the Facebook", 2006, http://cs229.stanford.edu/proj2006/MichelsonOrtiz-AutoTaggingTheFacebook.pdf, 5 pages.

Arrington, "First Screen Shots of Riya", Oct. 26, 2005, http://techcrunch.com/2005/10/26/riya-prepares-to-launch-alpha/, 10 pages.

Arrington, "Ojos—Auto Name & Tag Your Photos", Aug. 15, 2005, http://techcrunch.com/2005/08/31/ojos-auto-name-tag-your-photos/, 8 pages.

Stone, et al. "Autotagging Facebook: Social network context improves photo annotation," In Workshop on Internet Vision, 2008, 2 pages_.

Schuon et al., "CS229 Project Report: Automated photo tagging in Facebook", Dec. 2007, http://cs229. Stanford.edu/proj2007/SchuonRobertsonZou-AutomatedPhotoTaggingInFacebook.pdf, 5 pages.

Yadav, "Facebook—The Complete Biography", Aug. 25, 2006, http://mashable.com12006/08/25/facebook-protile/, 7 pages_.

Unknown, "What does it mean to "tag" someones picture on facebook, whats the point of doing it?", Nov. 28, 2007, https://answers.yahoo.com/question/index?qid=20071128123629AAY0DLP, 2 pages.

Yang, et al., "Detecting Faces in Images: A Survey", Jan. 2002, IEEE Trans. Pattern Analysis Machine Intelligence, 24(1), 2 pages.

\* cited by examiner

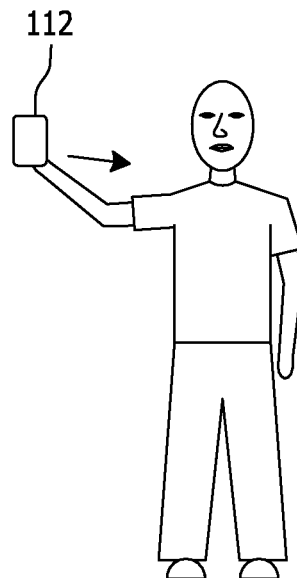
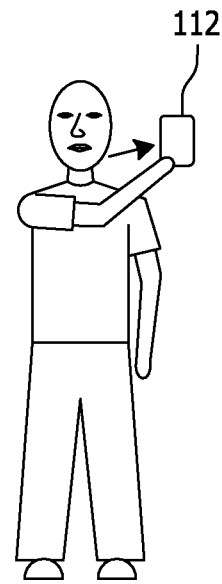
FIG. 6A    FIG. 6B
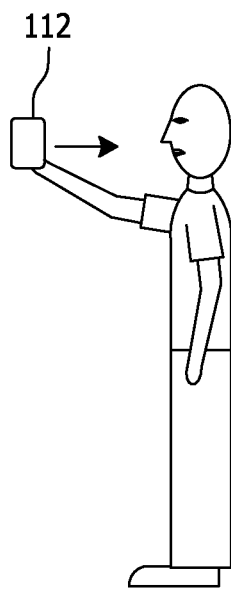
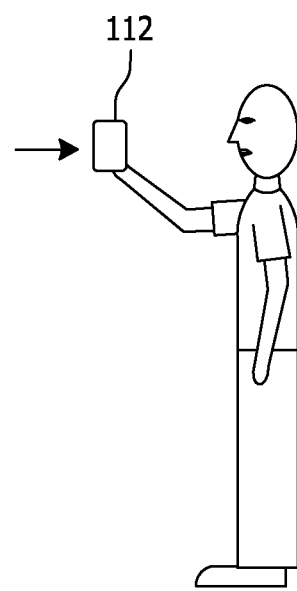
FIG. 7A    FIG. 7B

METHOD TO VERIFY AND IDENTIFY BLOCKCHAIN WITH USER QUESTION DATA

BACKGROUND

1. Field of the Invention

The disclosed embodiments relate to biometric security. More specifically, the disclosed embodiments relate to facial recognition authentication systems.

2. Related Art

With the growth of personal electronic devices that may be used to access many different user accounts, and the increasing threat of identity theft and other security issues, there is a growing need for ways to securely access user accounts via electronic devices. Account holders are thus often required to have longer passwords that meet various criteria such as using a mixture of capital and lowercase letters, numbers, and other symbols. With smaller electronic devices, such as smart phones, smart watches, "Internet of Things" ("IoT") devices and the like, it may become cumbersome to attempt to type such long passwords into the device each time access to the account is desired and if another individual learns the user's password then the user can be impersonated without actually being present themselves. In some instances, users may even decide to deactivate such cumbersome security measures due to their inconvenience on their devices. Thus, users of such devices may prefer other methods of secure access to their user accounts.

One other such method is with biometrics. For example, an electronic device may have a dedicated sensor that may scan a user's fingerprint to determine that the person requesting access to a device or an account is authorized. However, such fingerprint systems on small electronic devices, or are often considered unreliable and unsecure.

In addition, facial recognition is generally known and may be used in a variety of contexts. Two-dimensional facial recognition is commonly used to tag people in images on social networks or in photo editing software. Facial recognition software, however, has not been widely implemented on its own to securely authenticate users attempting to gain access to an account because it not considered secure enough. For example, two-dimensional facial recognition is considered unsecure because faces may be photographed or recorded, and then the resulting prints or video displays showing images of the user may be used to trick the system. Accordingly, there is a need for reliable, cost-effective, and convenient method to authenticate users attempting to log in to, for example, a user account.

SUMMARY

The disclosed embodiments have been developed in light of the above and aspects of the invention may include a method for enrolling and authenticating a user in an authentication system via a user's a mobile computing device. The user's device includes a camera.

In one embodiment, the user may enroll in the system by providing enrollment images of the user's face. The enrollment images are taken by the camera of the mobile device as the user moves the mobile device to different positions relative to the user's head. The user may thus obtain enrollment images showing the user's face from different angles and distances. The system may also utilize one or more movement sensors of a mobile device to determine an enrollment movement path that the phone takes during the imaging. At least one image is processed to detect the user's face within the image, and to obtain biometric information from the user's face in the image. The image processing may be done on the user's mobile device or at a remote device, such as an authentication server or a user account server. The enrollment information (the enrollment biometrics, movement, and other information) may be stored on the mobile device or remote device or both.

The system may then authenticate a user by the user providing at least one authentication image via the camera of the mobile device while the user moves the mobile device to different positions relative to the user's head. The authentication images are processed for face detection and facial biometric information. Path parameters may also be obtained during the imaging of the authentication images (authentication movement). The authentication information (authentication biometric, movement, and other information) is then compared with the enrollment information to determine whether the user should be authenticated or denied. Image processing and comparison may be conducted on the user's mobile device, or may be conducted remotely.

In some embodiments, multiple enrollment profiles may be created by a user to provide further security. For example, a user may create an enrollment wearing accessories such as a hat or glasses, or while making a funny face. In further embodiments, the user's enrollment information may be linked to a user's email address, phone number, or other unique identifier.

The authentication system may include feedback displayed on the mobile device to aid a user in learning and authentication with the system. For instance, an accuracy meter may provide feedback on a match rate of the authentication biometrics or movement. A movement meter may provide feedback on the movement detected by the mobile device.

In some embodiments, the system may reward users who successfully utilize the authentication system or who otherwise take fraud preventing measures. Such rewards may include leaderboards, status levels, reward points, coupons or other offers, and the like. In some embodiments, the authentication system may be used to login to multiple accounts.

In addition to biometric and movement matching, some embodiments may also utilize banding detection, glare detection, and screen edge detection to further secure the system. In other embodiments, other user attributes may be detected and matched including users' gender, age, ethnicity, and the like.

The system may also provide gradual access to user account(s) when the user first sets up the authentication system. As the user successfully implements the system, authorization may be expanded. For example, during a time period as the user gets accustomed to the authentication system, lower transaction limits may be applied.

In some embodiments, the mobile device may show video feedback of what the user is imaging to aid the user to image his or her face during enrollment or authentication. The video feedback may be displayed on only a portion of the display screen of the mobile device. For example, the video feedback may be displayed in an upper portion of the display screen. The video feedback display may be position on a portion of the display screen that corresponds with a location of a front-facing camera of the mobile device.

To facilitate imaging in low-light, portions of the screen other than the video feedback may be displayed in a bright color, such as white. In some embodiments, and LED or infrared light may be used, and near infrared thermal imaging may be done with an infrared camera. The mobile device used for imaging may thus have multiple cameras for capture visible light and infrared images. The mobile device may also have multiple cameras (two or more) imaging in a single spectrum or multiple spectrum to provide stereoscopic, three-dimensional images. In such an embodiment, the close-up frames (zoomed) may create the most differentiation as compared to images captured from a distance. In such an embodiment, the frames captured at a distance may be unnecessary.

In some embodiments, to provide added security, the mobile device may output objects, colors, or patterns on the display screen to be detected during the imaging. The predetermined object or pattern may be a unique one-dimensional or two-dimensional barcode. For example, a QR code (two-dimensional barcode) may be displayed on the screen and reflected off the user's eye. If the QR code is detected in the image, then the person may be authenticated. In other embodiments, an object may move on the screen and the system may detect whether a user's eyes follow the movement.

In some embodiments, the system may provide prompts on a video feedback display to aid the user in moving the device relative to the user's head during enrollment and/or authentication. The prompts may include ovals or frames displayed on the display screen in which the user must place his or her face by moving the mobile device until his or her face is within the oval or frame. The prompts may preferably be of differing sizes and may also be centered on different positions of the screen. When an actual three-dimensional person images himself or herself close up and far away, it has been found that the biometric results are different due to the barrel distortion effect of the lens at the different distances. Thus, a three-dimensional person may be validated when biometric results are different in the close-up and far away images. This also allows the user to have multiple biometric profiles for each of the distances.

In other embodiments, biometrics from images obtained between the close-up and far away images may be analyzed for incrementally different biometric results. In this manner, the morphing of the face from the far face to the warped close up face is captured and tracked. The incremental frames during an authentication may then be matched to frames captured at similar locations during enrollment along the motion path and compared to ensure that the expected similarities and difference are found. This results in a motion path and captured image and biometric data that can prove a three-dimensional person is presently being imaged. Thus, not only are the close-up and far away biometrics compared, but also biometric data obtained in between. The biometric data obtained in between must also correspond to a correct morphing speed along the motion path, greatly enhancing the security of the system.

The touch screen may be utilized in some embodiments. For example, the user may need to enter or swipe a code or pattern in addition to the authentication system described herein. The touchscreen may also detect a size and orientation of a user's finger, and whether a right hand or a left hand is used on the touch screen. Voice parameters may also be used as an added layer of security. The system may detect edge sharpness or other indicators to ensure that the obtained images are of sufficient quality for the authentication system.

When a camera has an autofocus, the autofocus may be controlled by the system to validate the presence of the actual, three-dimensional person. The autofocus may check that different features of the user or environment focus at different focal lengths. In other embodiments, authentication images may be saved to review the person who attempted to authenticate with the system.

In some embodiments, the match thresholds required may be adapted over time. The system may thus account for changing biometrics due to age, weight gain/loss, environment, user experience, security level, or other factors. In further embodiments, the system may utilize image distortion prior to obtaining biometric information to further protect against fraudulent access.

The system may utilize any number or combination of the security features as security layers, as described herein. When authentication fails, the system may be configured so that it is unclear which security layer triggered the failure to preserve the integrity of the security system.

Also disclosed is a method for authenticating identity of a customer as part of a business transaction comprising presenting a customer, with questions, the customer questions having corresponding customer answers, and then receiving customer answers from the customer in response to the presenting of customer questions. Next, processing the customer answers to create processed customer answers and transmitting the processed customer answers to a remote computing device. This method also compares the processed customer answers to stored data at the remote computing device and, responsive to the comparing determining that a match has not occurred, denying further authentication. Responsive to the comparing determining that a match has occurred, allowing further authentication by capturing and processing one or more facial images of the customer to verify the identity of the customer and liveness of the customer.

In one embodiment, the processed customer answers are encrypted, subject to a hash operation, or both. In one embodiment, the method further comprises inverting the one or more facial images to captured authentication data and comparing the captured authentication data to stored authentication data to determining if a match occurs. In one configuration, the stored authentication data is stored in a blockchain and the comparing, for a match, the reverse processed customer answers to stored customer answers data controls access to the blockchain storing the stored authentication data.

It is also contemplated that a result of the identity and liveness verification of the customer is communicated to a business to thereby verify the identity of the customer to the business. The business may be a credit reporting agency or a lender. It is contemplated that authentication may further comprises verifying the liveness of the customer by processing a first image of the customer's face captured at a first distance from the customer and capturing a second image of the customer's face captured at a second distance from the customer. In one configuration, the authentication further comprises comparing at least one image of the customer's face to a previously captured image of the customer's face which is part of stored authentication data.

Also disclosed is an authentication system to verify a user's identity comprising a data collection device having a processor and memory storing non-transitory machine executable code which is executable by the processor. The machine executable code of the data collection device may be configured to present user related questions to the user and receive answers to the user related questions. The answers are entered by the user into the data collection device. It is also configured to process the answers to create secured answer data, transmit the secured answer data, and responsive to instructions from a remote server, collect and transmit collected authentication data from the user.

Also part of the system is the remote server having a processor and memory storing non-transitory machine executable code which is executable by the processor, such that the machine executable code is configured to receive the secured answer data from the data collection device and process the secured answer to determine if the received secured answer data matches stored secured answer data. Responsive to the received secured answer data not matching the stored secured answer data, denying access to stored authentication data for the user. Responsive to the received secured answer data matching the stored secured answer data, then initiating an authentication session by communicating with the data collection device to collect and transmit collected authentication data, and then receive collected authentication data from the data collection device. The machine executable code is further configured to compare the collected authentication data received from the data collection device to stored user authentication data stored on the remote server to determine if a match occurs, such that a match verifies the identity of the user.

In one embodiment, the secured answer data comprises encrypted answers or hashed answers. The collected authentication data may comprise one or more images of the user captured by a camera of the data collection device. The user authentication data may comprise a first image of the user's face captured, by the camera, at a first distance separating the user and the camera and second image of the user's face captured, by the camera, at a second distance separating the user and the camera, such that the first distance is different from the second distance. In one configuration, this system further comprises transmitting a verified identity notice to a third party server and responsive thereto, receiving data from the third party server as part of a business transaction. It is also contemplated that the stored user authentication data is stored in a blockchain and the blockchain storing the stored user authentication data is only accessed when the received secured answer data matches the stored secured answer data.

An authentication system for use by a business to verify identity of a user. In one embodiment, the authentication system comprises a data collection device having a screen and a user interface. The data collection device is configured to receive answers from the user to questions presented to the user, process the answers to create secure answer data, and transmit the secure answer data to a verification server. Also part of this embodiment is a verification server configured to receive the secure answer data from the data collection device and compare the secure answer data, or processed secure answer data, to stored answer data. Responsive to the comparing determining that the secure answer data or processed secure answer data does not match the stored answer data, terminating the identify verification. Responsive to the comparing determining the secure answer data or processed secure answer data matchings the stored answer data, then initiating an authentication session which includes capture of one or more images of the customer's face with a camera associated with the data collection device or another device.

The data collection device may be an electronic device owned by the user. The data collection device may be an electronic device owned by the business. In one embodiment, the stored answer data is created by performing the same processing on the answers as occurred by the data collection device to form the secure answer data. In one configuration, the questions presented to the user are based on information personal to the user.

In one embodiment, the step of initiating an authentication session comprises providing notice, from the verification server, to initiate the authentication session by sending a message from the verification server to the data collection device or the another device, and then, capturing at least one image of the user with a camera associated with the data collection device or the another device. This step also includes processing the at least one image to generate captured image data and transmitting the captured image data to the verification server. At the verification server, processing the captured image data to verify three dimensionality of the user and comparing the captured image data to stored image data derived from at least one previously captured image of the user to determine if match occurs within a threshold range. Then, responsive to verifying three dimensionality of the user and obtaining the match within the threshold range, then verifying the identity of the user to the business. The system of claim 15 wherein the stored authentication data, such as biometric data, is stored in a blockchain. In one embodiment, the one or more images of the user's face comprises a first image captured with the camera at a first distance from the user and a second image captured with the camera at a second distance from the user, the first distance different than the second distance.

Also disclosed is a method for verifying identity of a customer by a business comprising initiating an identity verification session for the customer. At the business, presenting questions to the customer which have stored answers that are stored at a remote location and also at the business, receiving customer answers to the questions. Then, transmitting the customer answers or a processed version of the customer answers to an authentication system. At the authentication system, which may be remote from the user, receiving the customer answers or the processed version of the customer answers at the authentication system. The authentication system compares the customer answers or the processed version of the customer answers to stored customer answers or a stored processed version of the customer answers to determine if a match occurs. If a match does not occur, providing notice to the business of a failure to match and ending the identity verification processes. If a match does occur, initiating an authentication process by obtaining one or more images of the customer's face with a camera and processing one or more of the images of the customer's face to generate captured facial image data. Then, transmitting the captured facial image data to the authentication system, and processing the captured facial image data to determine three-dimensionality and liveness of the customer generating the captured facial image data. This method of operation then compares the captured facial image data to stored facial image data confirm the stored facial image data matches the captured facial image data, the stored facial image data based on previously captured images of the customer's face.

This method of operation may further comprise, responsive to the stored facial image data matching the captured facial image data, sending an identity verification success message to the business, to a credit reporting agency so the credit reporting agency can sent a credit report to the business, to a lender so the lender will provide a loan or financing to the customer, or any combination thereof.

The step of capturing the one or more images of the user may comprise a first image capture with the camera a first distance from the customer's face and a second image captured with the camera a second distance from the user's face such that the first distance is different than the second distance. The customer answers may be encrypted or hashed prior to transmitting to the authentication system. In one configuration, the step of comparing the customer answers or the processed version of the customer answers to stored customer answers or a stored processed version of the customer answers controls access to authentication data stored is a blockchain.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 6A and 6B show an example of movement of a mobile device about a user's face according to one exemplary embodiment.

FIGS. 7A and 7B show an example of movement of a mobile device about a user's face according to one exemplary embodiment.

DETAILED DESCRIPTION OF EMBODIMENTS

A system and method for providing secure and convenient facial recognition authentication will be described below. The system and method may be achieved without the need for additional expensive biometric readers or systems while offering enhanced security over conventional facial recognition systems.

Facial Recognition Authentication Environment

Figure 1:
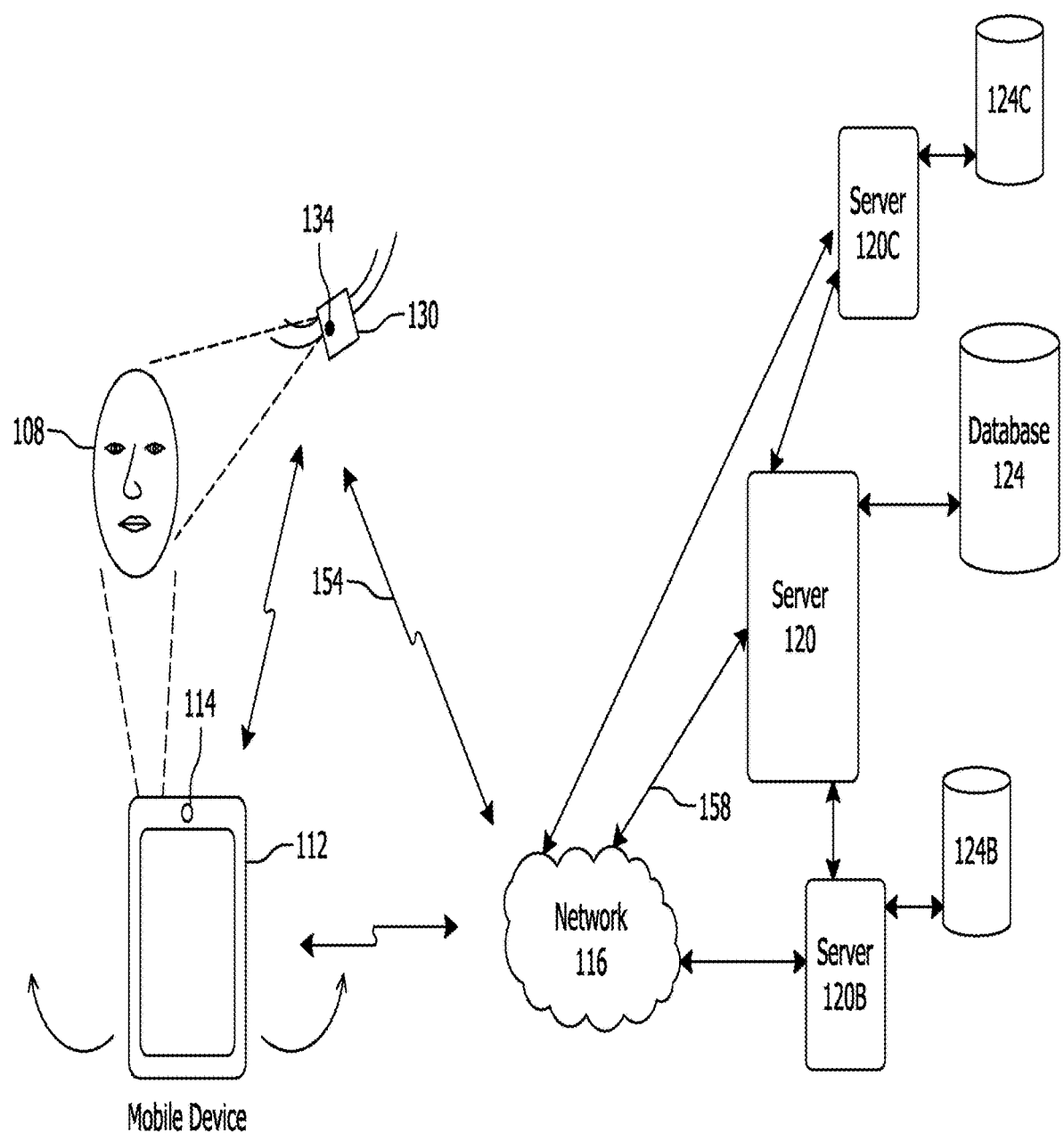
FIG. 1 illustrates an example environment of use of the facial recognition authentication system, according to one exemplary embodiment.

FIG. 1 illustrates an example environment of use of the facial recognition authentication system described herein. This is but one possible environment of use and system. It is contemplated that, after reading the specification provided below in connection with the figures, one of ordinary skill in the art may arrive at different environments of use and configurations.

In this environment, a user 108 may have a mobile device 112 which may be used to access one or more of the user's accounts via authentication systems. A user 108 may have a mobile device 112 that can capture a picture of the user 108, such as an image of the user's face. The user may use a camera 114 on or connected to the mobile device 112 to capture an image or multiple images or video of himself or herself. The mobile device 112 may comprise any type of mobile device capable of capturing an image, either still or video, and performing processing of the image or communication over a network.

In this embodiment, the user 108 may carry and hold the mobile device 112 to capture the image. The user may also wear or hold any number of other devices. For, example, the user may wear a watch 130 containing one or more cameras 134 or biosensors disposed on the watch. The camera 134 may be configured to create an image from visible light as well as infrared light. The camera 134 may additionally or alternatively employ image intensification, active illumination, or thermal vision to obtain images in dark environments.

When pointed towards a user 108, the camera 134 may capture an image of the user's face. The camera 134 may be part of a module that may either include communication capability that communicates with either a mobile device 112, such as via Bluetooth®, NFC, or other format, or communication directly with a network 116 over a wired or wireless link 154. The watch 130 may include a screen on its face to allow the user to view information. If the camera module 134 communicates with the mobile device 112, the mobile device 134 may relay communications to the network 116. The mobile device 134 may be configured with more than one front facing camera 114 to provide for a 3D or stereoscopic view, or to obtain images across different spectral ranges, such as near infrared and visible light.

The mobile device 112 is configured to wirelessly communicate over a network 116 with a remote server 120. The server 120 may communicate with one or more databases 124. The network 116 may be any type of network capable of communicating to and from the mobile device including but not limited to a LAN, WAN, PAN, or the Internet. The mobile device 112 may communicate with the network via a wired or wireless connection, such as via Ethernet, Wi-Fi, NFC, and the like. The server 120 may include any type of computing device capable of communicating with the mobile device 112. The server 120 and mobile device 112 are configured with a processor and memory and are configured to execute machine readable code or machine instructions stored in the memory.

The database 124, stored on mobile device or remote location as shown, may contain facial biometric information and authentication information of users 108 to identify the users 108 to allow access to associated user data based on one or more images or biometric information received from the mobile device 112 or watch 134. The data may be, for example, information relating to a user account or instruction to allow access to a separate account information server 120B. The term biometric data may include among other information biometric information concerning facial features and path parameters. Examples of path parameters may include an acceleration and speed of the mobile device, angle of the mobile device during image capture, distance of the mobile device to the user, path direction in relation to the user's face position in relation to the user, or any other type parameter associated with movement of the mobile device or the user face in relation to a camera. Other data may also be included such as GPS data, device identification information, and the like.

In this embodiment, the server 120 processes requests for identification from the mobile device 112 or user 108. In one configuration, the image captured by the mobile device 112, using facial detection, comprises one or more images of the user's face 108 during movement of the mobile device relative to the user's face, such as in a side to side or horizontal arc or line, vertical arc or line, forward and backwards from the user's face, or any other direction of motion. In another configuration, the mobile device 112 calculates biometric information from the obtained images, and sends the biometric information to the server 120. In yet another embodiment, the mobile device 112 compares biometric information with stored biometric information on the mobile device 112, and sends an authentication result from the comparison to the server 120.

The data including either the image(s), biometric information, or both are sent over the network 116 to the server 120. Using image processing and image recognition algorithms, the server 120 processes the person's biometric information, such as facial data, and compares the biometric information with biometric data stored in the database 124 to determine the likelihood of a match. In other embodiments, the image processing and comparison is done on the mobile device 112, and data sent to the server indicates a result of the comparison. In further embodiments, the image processing and comparison is done on the mobile device 112 without accessing the server, for example, to obtain access to the mobile device 112 itself.

By using facial recognition processing, an accurate identity match may be established. Based on this and optionally one or more other factors, access may be granted, or an unauthorized user may be rejected. Facial recognition processing is known in the art (or is an established process) and as a result, it is not described in detail herein.

Also shown is a second server 120B with associated second database 124B, and third server 120C with associated third database 124C. The second and third database may be provided to contain additional information that is not available on the server 120 and database 124. For example, one of the additional servers may only be accessed based on the authentication of the user 108 performed by the server 120.

Executing on the mobile device 112 is one or more software applications. This software is defined herein as an identification application (ID App). The ID App may be configured with either or both of facial detection and facial recognition and one or more software modules which monitor the path parameters and/or biometric data. Facial detection as used herein refers to a process which detects a face in an image. Facial recognition as used herein refers to a process that can analyze a face using an algorithm, mapping its facial features, and converting them to biometric data, such as numeric data. The biometric data can be compared to that derived from one or more different images for similarities or dis-similarities. If a high percentage of similarity is found in the biometric data, the individual shown in the images may be considered a match.

With the ultimate goal of matching a face of a user to an identity or image stored in a database 124, to authenticate the user, the ID App may first process the image captured by the camera 114, 134 to identify and locate the face that is in the image. As shown in FIG. 1, there may be the face 108. The authentication may be used for logging into an online account or for numerous other access control functions.

The portion of the photo that contains the detected face may then be cropped, cut, and stored for processing by one or more facial recognition algorithms. By first detecting the face in the image and cropping only that portion of the face, the facial recognition algorithm need not process the entire image. Further, in embodiments where the facial recognition processing occurs remotely from the mobile device 112, such as at a server 120, much less image data is required to be sent over the network to the remote location. It is contemplated that the entire image, a cropped face, or only biometric data may be sent to the remote server 120 for processing.

Facial detection software can detect a face from a variety of angles. However, facial recognition algorithms are most accurate in straight on images in well-lit situations. In one embodiment, the highest quality face image for facial recognition that is captured is processed first, then images of the face that are lower quality or at different angles other than straight toward the face are then processed. The processing may occur on the mobile device or at a remote server which has access to large databases of image data or facial identification data.

The facial detection is preferred to occur on the mobile device and is performed by the mobile device software, such as the ID App. This reduces the number or size of images (data) that are sent to the server for processing where faces are not found and minimizes the overall amount of data that must be sent over the network. This reduces bandwidth needs and network speed requirements are reduced.

In another preferred embodiment, the facial detection, facial recognition, and biometric comparison all occur on the mobile device. However, it is contemplated that the facial recognition processing may occur on the mobile device, the remote server, or both.

Figure 2:
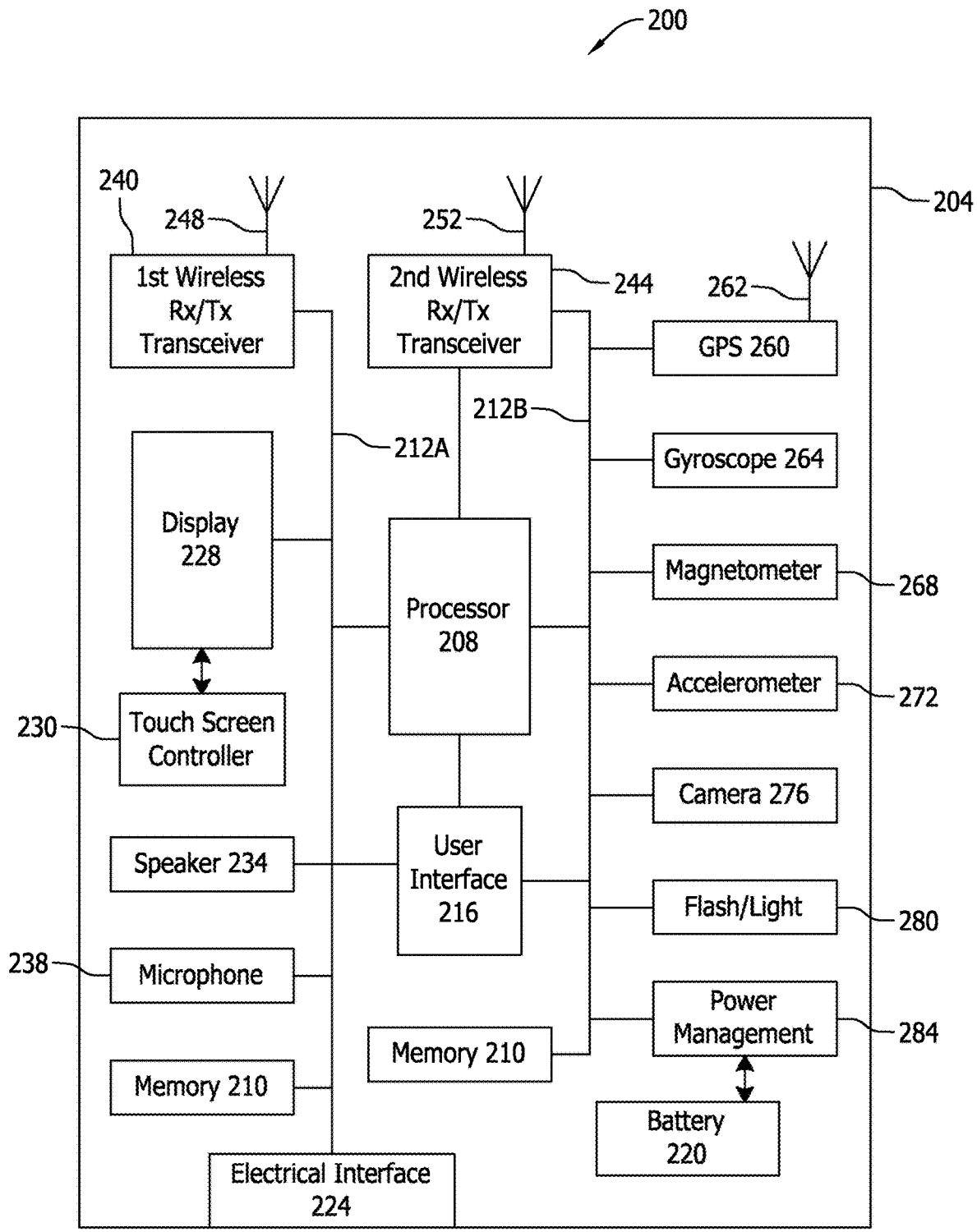
FIG. 2 illustrates an example embodiment of a mobile device.

FIG. 2 illustrates an example embodiment of a mobile device. This is but one possible mobile device configuration and as such it is contemplated that one of ordinary skill in the art may differently configure the mobile device. The mobile device 200 may comprise any type of mobile communication device capable of performing as described below. The mobile device may comprise a PDA, cellular telephone, smart phone, tablet PC, wireless electronic pad, an IoT device, a "wearable" electronic device or any other computing device.

In this example embodiment, the mobile device 200 is configured with an outer housing 204 configured to protect and contain the components described below. Within the housing 204 is a processor 208 and a first and second bus 212A, 212B (collectively 212). The processor 208 communicates over the buses 212 with the other components of the mobile device 200. The processor 208 may comprise any type processor or controller capable of performing as described herein. The processor 208 may comprise a general-purpose processor, ASIC, ARM, DSP, controller, or any other type processing device. The processor 208 and other elements of the mobile device 200 receive power from a battery 220 or other power source. An electrical interface 224 provides one or more electrical ports to electrically interface with the mobile device, such as with a second electronic device, computer, a medical device, or a power supply/charging device. The interface 224 may comprise any type electrical interface or connector format.

One or more memories 210 are part of the mobile device 200 for storage of machine readable code for execution on the processor 208 and for storage of data, such as image data, audio data, user data, medical data, location data, accelerometer data, or any other type of data. The memory 210 may comprise RAM, ROM, flash memory, optical memory, or micro-drive memory. The machine-readable code as described herein is non-transitory.

As part of this embodiment, the processor 208 connects to a user interface 216. The user interface 216 may comprise any system or device configured to accept user input to control the mobile device. The user interface 216 may comprise one or more of the following: keyboard, roller ball, buttons, wheels, pointer key, touch pad, and touch screen. A touch screen controller 230 is also provided which interfaces through the bus 212 and connects to a display 228.

The display comprises any type display screen configured to display visual information to the user. The screen may comprise a LED, LCD, thin film transistor screen, OEL CSTN (color super twisted nematic), TFT (thin film transistor), TFD (thin film diode), OLED (organic light-emitting diode), AMOLED display (active-matrix organic light-emitting diode), capacitive touch screen, resistive touch screen or any combination of these technologies. The display 228 receives signals from the processor 208 and these signals are translated by the display into text and images as is understood in the art. The display 228 may further comprise a display processor (not shown) or controller that interfaces with the processor 208. The touch screen controller 230 may comprise a module configured to receive signals from a touch screen which is overlaid on the display 228.

Also part of this exemplary mobile device is a speaker 234 and microphone 238. The speaker 234 and microphone 238 may be controlled by the processor 208. The microphone 238 is configured to receive and convert audio signals to electrical signals based on processor 208 control. Likewise, the processor 208 may activate the speaker 234 to generate audio signals. These devices operate as is understood in the art and as such are not described in detail herein.

Also connected to one or more of the buses 212 is a first wireless transceiver 240 and a second wireless transceiver 244, each of which connect to respective antennas 248, 252. The first and second transceiver 240, 244 are configured to receive incoming signals from a remote transmitter and perform analog front-end processing on the signals to generate analog baseband signals. The incoming signal maybe further processed by conversion to a digital format, such as by an analog to digital converter, for subsequent processing by the processor 208. Likewise, the first and second transceiver 240, 244 are configured to receive outgoing signals from the processor 208, or another component of the mobile device 208, and up convert these signal from baseband to RF frequency for transmission over the respective antenna 248, 252. Although shown with a first wireless transceiver 240 and a second wireless transceiver 244, it is contemplated that the mobile device 200 may have only one such system or two or more transceivers. For example, some devices are tri-band or quad-band capable, or have Bluetooth®, NFC, or other communication capability.

It is contemplated that the mobile device, and hence the first wireless transceiver 240 and a second wireless transceiver 244 may be configured to operate according to any presently existing or future developed wireless standard including, but not limited to, Bluetooth, WI-FI such as IEEE 802.11 a,b,g,n, wireless LAN, WMAN, broadband fixed access, WiMAX, any cellular technology including CDMA, GSM, EDGE, 3G, 4G, 5G, TDMA, AMPS, FRS, GMRS, citizen band radio, VHF, AM, FM, and wireless USB.

Also part of the mobile device is one or more systems connected to the second bus 212B which also interface with the processor 208. These devices include a global positioning system (GPS) module 260 with associated antenna 262. The GPS module 260 can receive and processing signals from satellites or other transponders to generate location data regarding the location, direction of travel, and speed of the GPS module 260. GPS is generally understood in the art and hence not described in detail herein. A gyroscope 264 connects to the bus 212B to generate and provide orientation data regarding the orientation of the mobile device 204. A magnetometer 268 is provided to provide directional information to the mobile device 204. An accelerometer 272 connects to the bus 212B to provide information or data regarding shocks or forces experienced by the mobile device. In one configuration, the accelerometer 272 and gyroscope 264 generate and provide data to the processor 208 to indicate a movement path and orientation of the mobile device.

One or more cameras (still, video, or both) 276 are provided to capture image data for storage in the memory 210 and/or for possible transmission over a wireless or wired link or for viewing later. The one or more cameras 276 may be configured to detect an image using visible light and/or near-infrared light. The cameras 276 may also be configured to utilize image intensification, active illumination, or thermal vision to obtain images in dark environments. The processor 208 may process image data to perform image recognition, such as in the case of, facial detection, item detection, facial recognition, item recognition, or bar/box code reading.

A flasher and/or flashlight 280, such as an LED light, are provided and are processor controllable. The flasher or flashlight 280 may serve as a strobe or traditional flashlight. The flasher or flashlight 280 may also be configured to emit near-infrared light. A power management module 284 interfaces with or monitors the battery 220 to manage power consumption, control battery charging, and provide supply voltages to the various devices which may require different power requirements.

Figure 3:
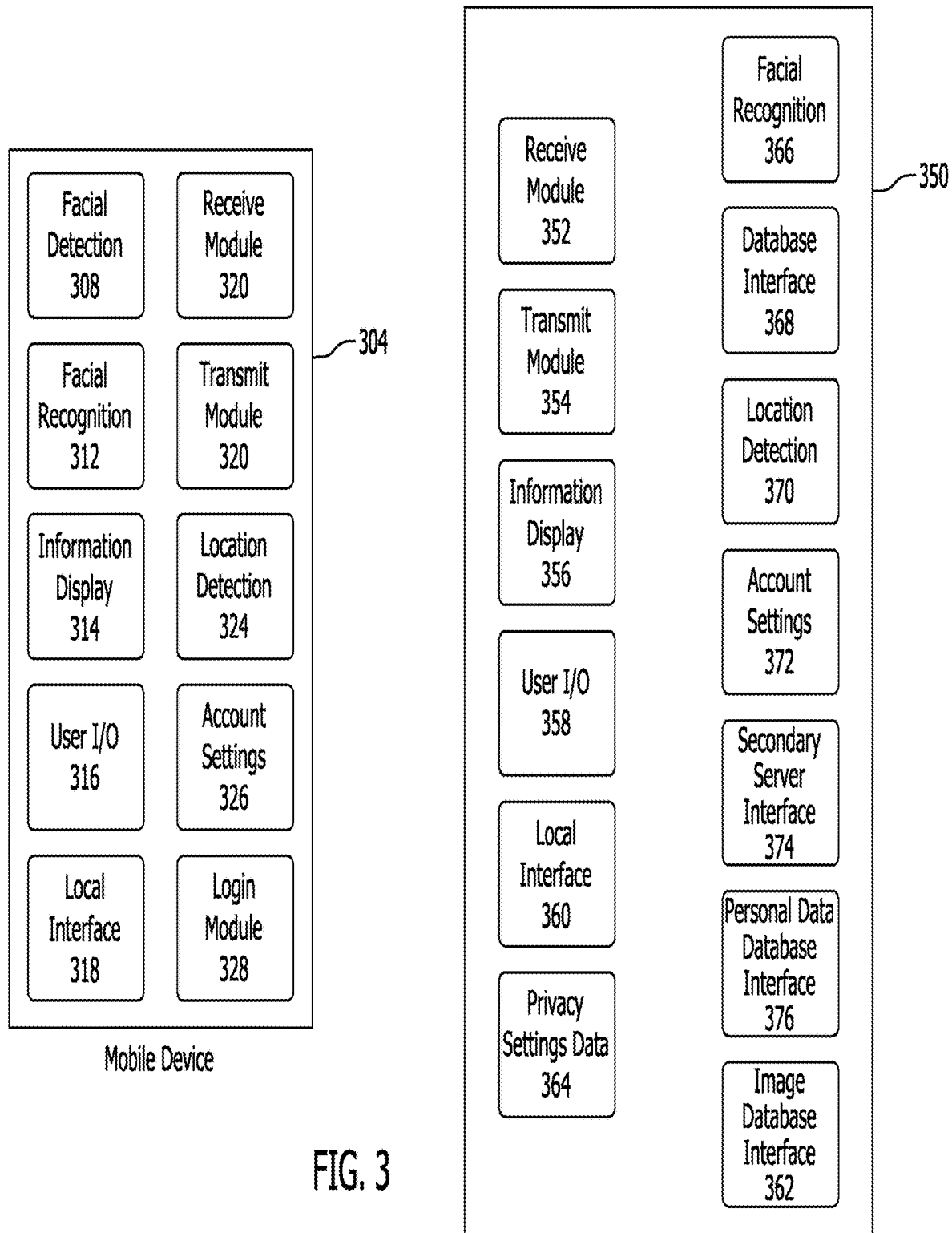
FIG. 3 illustrates exemplary software modules that are part of the mobile device and server.

FIG. 3 illustrates exemplary software modules that are part of the mobile device and server. Other software modules may be provided to provide the functionality described below. It is provided that for the functionality described herein there is matching software (non-transitory machine-readable code, machine executable instructions or code) configured to execute the functionality. The software would be stored on a memory and executable by a processor.

In this example confirmation, the mobile device 304 includes a receive module 320 and a transmit module 322. These software modules are configured to receive and transmit data to remote device, such as cameras, glasses, servers, cellular towers, or WWI system, such as router or access points.

Also part of the mobile device 304 is a location detection module 324 configured to determine the location of the mobile device, such as with triangulation or GPS. An account setting module 326 is provided to establish, store, and allow a user to adjust account settings. A log in module 328 is also provided to allow a user to log in, such as with password protection, to the mobile device 304. A facial detection module 308 is provided to execute facial detection algorithms while a facial recognition module 321 includes software code that recognizes the face or facial features of a user, such as to create numeric values which represent one or more facial features (facial biometric information) that are unique to the user.

An information display module 314 controls the display of information to the user of the mobile device. The display may occur on the screen of the mobile device or watch. A user input/output module 316 is configured to accept data from and display data to the user. A local interface 318 is configured to interface with other local devices, such as using Bluetooth® or other shorter-range communication, or wired links using connectors to connected cameras, batteries, data storage elements. All the software (with associated hardware) shown in the mobile device 304 operate to provide the functionality described herein.

Also shown in FIG. 3 is the server software module 350. These modules are located remotely from the mobile device, but can be located on any server or remote processing element. As is understood in the art, networks and network data use a distributed processing approach with multiple servers and databases operating together to provide a unified server. As a result, it is contemplated that the module shown in the server block 350 may not all be located at the same server or at the same physical location.

As shown in FIG. 3, the server 350 includes a receive module 352 and a transmit module 354. These software modules are configured to receive and transmit data to remote devices, such as cameras, watches, glasses, servers, cellular towers, or WIFI systems, such as router or access points.

An information display module 356 controls a display of information at the server 350. A user input/output module 358 controls a user interface in connection with the local interface module 360. Also located on the server side of the system is a facial recognition module 366 that is configured to process the image data from the mobile device. The facial recognition module 366 may process the image data to generate facial data (biometric information) and perform a compare function in relation to other facial data to determine a facial match as part of an identify determination.

A database interface 368 enables communication with one or more databases that contain information used by the server modules. A location detection module 370 may utilize the location data from the mobile device 304 for processing and to increase accuracy. Likewise, an account settings module 372 controls user accounts and may interface with the account settings module 326 of the mobile device 304. A secondary server interface 374 is provided to interface and communicate with one or more other servers.

One or more databases or database interfaces are provided to facilitate communication with and searching of databases. In this example embodiment the system includes an image database that contains images or image data for one or more people.

This database interface 362 may be used to access image data users as part of the identity match process. Also part of this embodiment is a personal data database interface 376 and privacy settings data module 364. These two modules 376, 364 operate to establish privacy setting for individuals and to access a database that may contain privacy settings.

Authentication System

Figure 4:
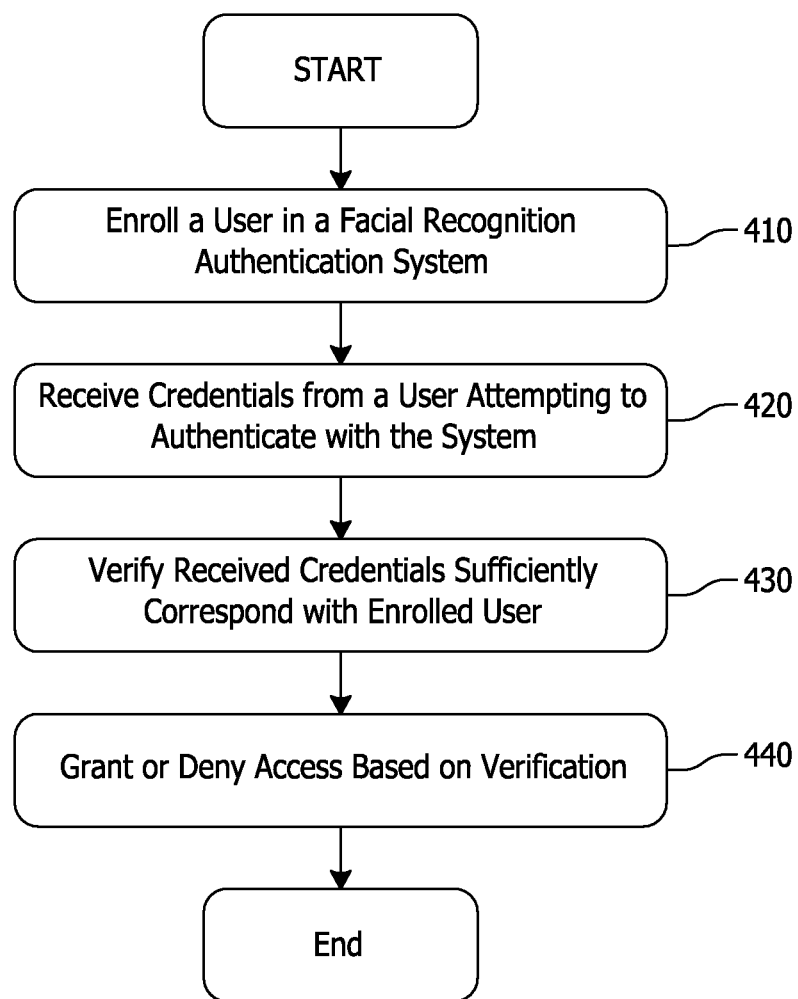
FIG. 4 shows a method for performing facial recognition authentication according to one embodiment.

An authentication system with path parameters that is operable in the above described environment and system will now be described as shown in FIG. 4. FIG. 4 shows a method for performing facial recognition authentication with path parameters according to one embodiment of the invention. As will be described in more detail below, the system utilizes the features of the mobile device 112 and server 120 defined above to generate a secure and convenient login system as one example of an authentication system. This reduces the burden of the user having to type in complex passwords onto a small screen of a mobile device, prevents fraud through means such as key logging or screen shot captures, and increases security by combining several path parameters and/or device parameters which must be met before user is authenticated.

In step 410, the system enrolls a user in the facial recognition authentication system. In one embodiment, an authentication server, such as the server 120 (FIG. 1), may be configured to authenticate a user to allow access to a user's account, such as a bank or other account, via the mobile device 112. The authentication server 120 may be included as a part of a server of the institution or entity providing user accounts (hereinafter "account server"), or the authentication server may be provided separately. For example, in the environment shown in FIG. 1, Servers 120B and 120C may represent account servers. In other embodiments, the account server and the authentication server are one in the same. In one embodiment, the authentication server 120 may provide an authentication application to the user for installation on the mobile device 112.

Figure 5:
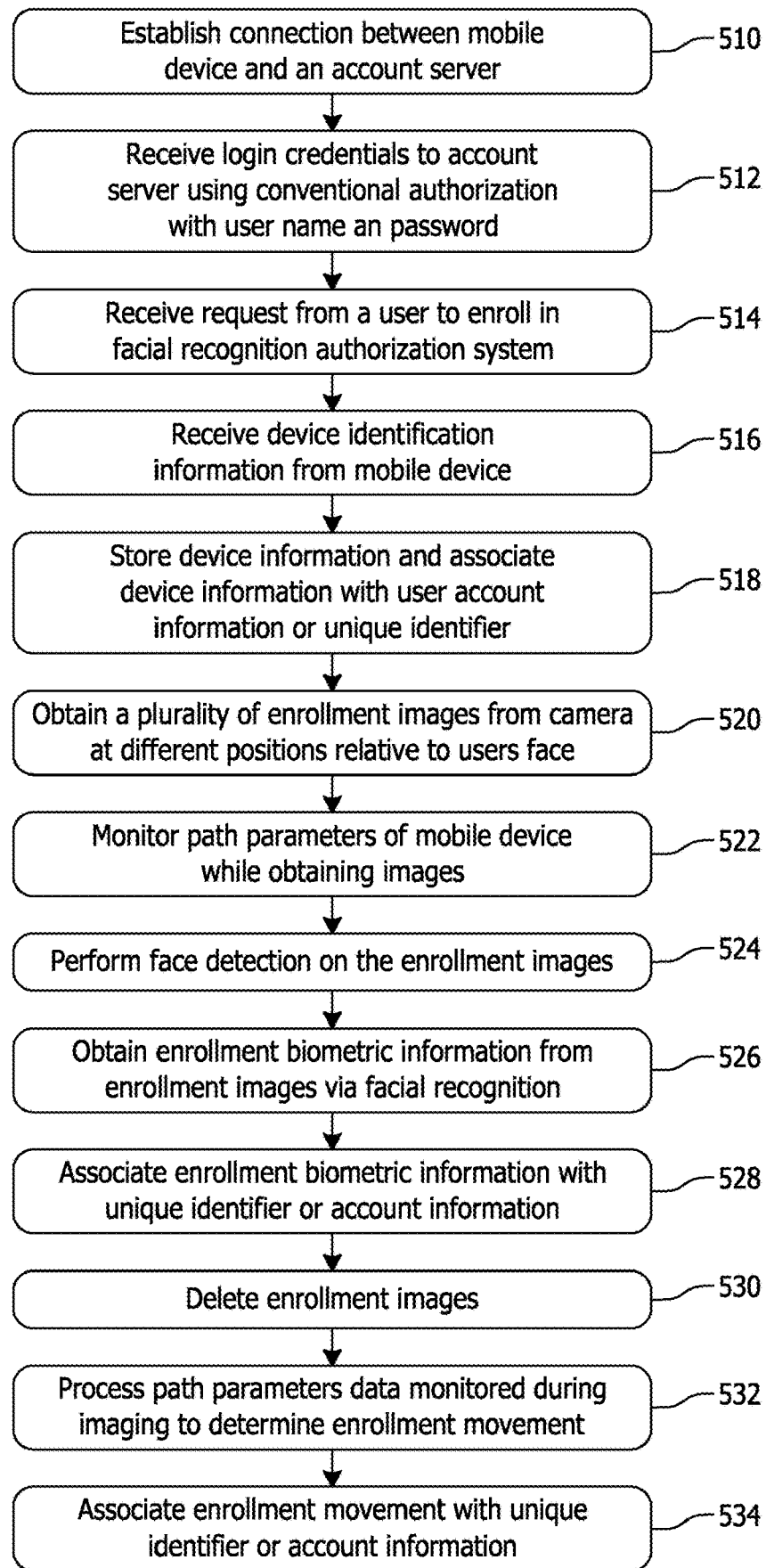
FIG. 5 shows a method for enrolling a user in a facial recognition authentication system, according to one exemplary embodiment.

An enrollment process according to one embodiment will be described with reference to FIG. 5. In this embodiment, a user via a mobile device 112 establishes a connection between the mobile device 112 and the account server 120B in step 510. As just one example, the user may establish a connection with a server of a financial institution such as a bank, or this connection may occur later in the process after authentication. The user then provides typical login information to authenticate the user, such as a user name and password for a financial account in step 512. In step 514, the user may next receive a prompt at the mobile device 112 to enroll in the facial recognition authentication system. The user then, via the user interface, indicates that he or she would like to set up the authentication system in response to the prompt.

Next, in step 516, the mobile device 112 may send device information to the authentication server 120. The device information may include among other information a device identifier that uniquely identifies the mobile device of the user. Such information may include device manufacturer, model number, serial number, and mobile network information. In step 518, when the authentication server 120 is incorporated with the account server 120B, the authentication server 120 associates and stores the device information with the user's account information. When the authentication server 120 is separate from the account server 120B, the account server 120B may generate a unique identifier related to the account information and send the unique identifier to the authentication server 120. The authentication server 120 may associate the device information and the unique identifier with each other and may store the information in a database 124.

The user is next prompted to provide a plurality of images of his or her face using a camera 114 on the mobile device 112 (hereinafter, "enrollment images") in step 510. The enrollment images of the user's face are taken as the user holds the mobile device and moves the mobile device to different positions relative to his or her head and face. Thus, the enrollment images of the user's face are taken from many different angles or positions.

Furthermore, the path parameters of the mobile device are monitored and recorded for future comparison in step 522. Some non-limiting examples of how a user might hold a mobile device and take a plurality of images of her face is shown in FIGS. 6A-7B.

In FIGS. 6A and 6B, the user holds the mobile device 112 on one side of his or her face, and moves the mobile device 112 in an arc like path horizontally about his or her face until the mobile device 112 is on the other side of her or his face. In FIGS. 7A and 7B, the user holds the mobile device 112 far away from his or her face, and then brings the mobile device 112 forward closer to his or her face. Of course, any number of other paths may be used in addition to those shown in FIGS. 6A-7B. Additionally, the user may move his or her head while the camera is held fixed. The user could also hold the camera steady and move their head in relation to the camera. This method thus can be implemented with a webcam on a laptop or desktop, or on any other device, such as an IoT device where a camera is mounted on a similarly stationary location or object.

The enrollment images may be obtained as follows. The user holds and orients a mobile device 112 with a camera 114 so that the camera 114 is positioned to image the user's face. For example, the user may use a front facing camera 114 on a mobile device 112 with a display screen and may confirm on the display screen that his or her face is in position to be imaged by the camera 114.

Once the user has oriented the device, the device may begin obtaining the enrollment images of the user. In one embodiment, the user may press a button on the device 112 such as on a touchscreen or other button on the device to initiate the obtaining of the enrollment images. The user then moves the mobile device to different positions relative to his or her head as the device images the user's face from a plurality of angles or positions as described above. When the above-mentioned front-facing camera is used, the user may continually confirm that his or her face is being imaged by viewing the imaging on the display screen. The user may again press the button to indicate that the imaging is completed. Alternatively, the user may hold the button during imaging, and then release the button to indicate that imaging is complete.

As described above, the mobile device 112 may include face detection. In this embodiment in step 524, the mobile device may detect the user's face in each of the enrollment images, crop the images to include only the user's face, and send, via a network, the images to the authentication server 120. In step 526, upon receipt of the enrollment images, the authentication server 120 performs facial recognition on the images to determine biometric information ("enrollment biometrics") for the user. The authentication server 120 may then associate the enrollment biometrics with the device information and the unique identifier (or account information) and stores the biometric information in the database 124 in step 528. For added security, in step 530, the mobile device 112 and the authentication server 120 may be configured to delete the enrollment images after the enrollment biometrics of the user are obtained.

In another embodiment, the mobile device 112 may send the images to the authentication server 120 without performing face detection. The authentication server 120 may then perform the face detection, facial recognition, and biometric information processing. In another embodiment, the mobile device 112 may be configured to perform the facial detection, facial recognition, and biometric processing, and then send the results or data resulting from the processing to the authentication server 120 to be associated with the unique identifier or user account. This prevents sensitive personal data (images) from leaving the user's device. In yet another embodiment, the mobile device 112 may perform each of the above-mentioned steps, and the mobile device 112 may store the enrollment information without sending any of the enrollment biometrics or images to the server.

In one embodiment, the mobile device's gyroscope, magnetometer, and accelerometer are configured to generate and store data while the user moves the mobile device about his or her head to obtain the enrollment images (path parameters). The mobile device may process this data in step 532 to determine a path or arc in which the mobile device moved while the user imaged his or her face ("enrollment movement"). By using data from the accelerometer, magnetometer, and gyroscope, the system may check when a user is ready to begin scanning himself/herself, as well as determining the scan path. The data is thus used to determine when to start and stop the scan interval. The data may additionally include the time elapsed during scanning. This time may be measured from the user pressing the button to start and stop the imaging, or may be measured from the duration the button is held down while imaging, or during more movement or to complete sweep.

The enrollment movement of the mobile device 112 (which is data that defined the movement of the mobile device during image capture) may be sent to the authentication server 120. The authentication server 120 associates and stores the enrollment movement, the enrollment biometrics, the device information, and the unique identifier or account information. Alternatively, the data generated by the gyroscope, magnetometer, and accelerometer may be sent to the server 120, and the server 120 may process the data to determine the enrollment movement.

Thus, in the above described embodiment, the enrollment information may thus comprise the device information, the enrollment biometrics, and the enrollment movement (based on movement of the mobile device 112).

Returning to FIG. 4, once enrollment is complete, the authentication server 120 may later receive credentials from a user attempting to authenticate with the system as shown in step 420. For example, a user may attempt to log in to a user account. When a user attempts to log in, instead of or in addition to providing typical account credentials such as user name and password, the user may again take a plurality of images or video of his or her face as the mobile device 112 is held in the hand and moved to different positions relative to the head ("authentication images") in the same manner as was done during enrollment (such as shown in FIGS. 6A-7B). In this manner, the user may provide the necessary images (the term images includes video as video is a succession of images) from many different angles and/or positions, and may provide path parameters of the device while obtaining the images ("authentication movement") to both confirm the identity of the user as well as the liveness and realness of that individual to ensure it is not a video, screen shot, or other representation of the person.

Figure 8:
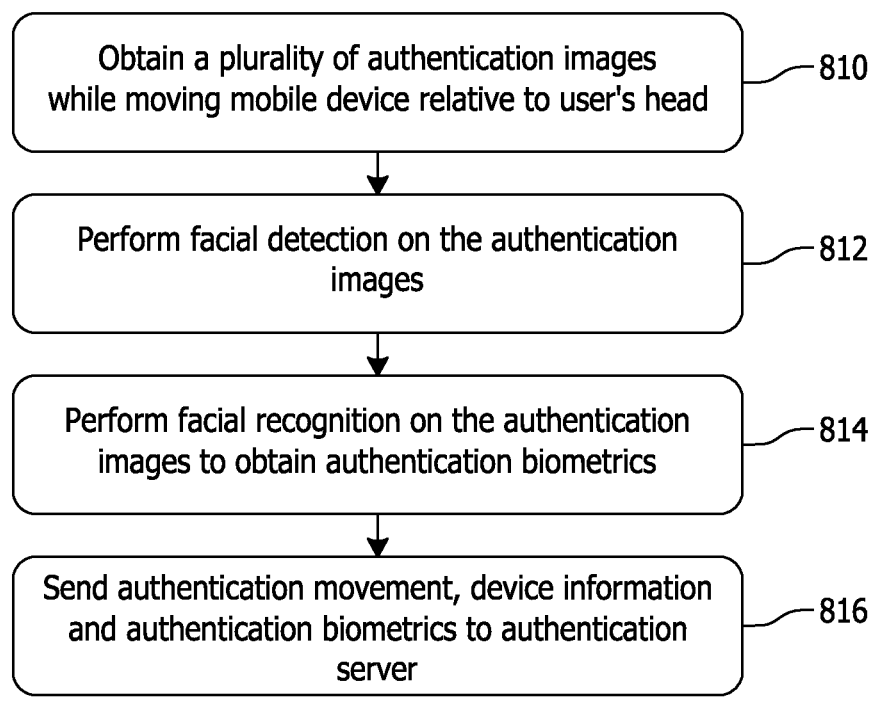
FIG. 8 shows a method of providing authentication information in a facial recognition authentication system, according to one exemplary embodiment.

In one embodiment outlined in FIG. 8, the user via the mobile device 112 obtains several authentication images in step 810 while moving the mobile device 112 to different positions relative to the user's head. Using facial detection in step 812, the mobile device 112 detects the user's face in each of the authentication images, crops the images, and sends the images to the authentication server 120. In another embodiment, the mobile device 112 sends the images to the server 124, and the server 124 performs facial detection. In step 814, the authentication routing 120 may perform facial recognition on the authentication images to obtain biometric information ("authentication biometrics"). In another embodiment, the mobile device 112 performs facial recognition to obtain the authentication biometrics and sends the authentication biometrics to the server 120.

In step 816, the mobile device 112 sends the device information identifying the device and sends path parameters such as gyroscope, magnetometer, and accelerometer information defining the path of the mobile device taken during imaging, as well as the elapsed time during imaging ("authentication movement") to the server 120. The credentials received by the authentication server 120 for a login in the facial recognition system may thus comprise the device information, the authentication images or the authentication biometrics, and the authentication movement (path parameters).

Figure 9:
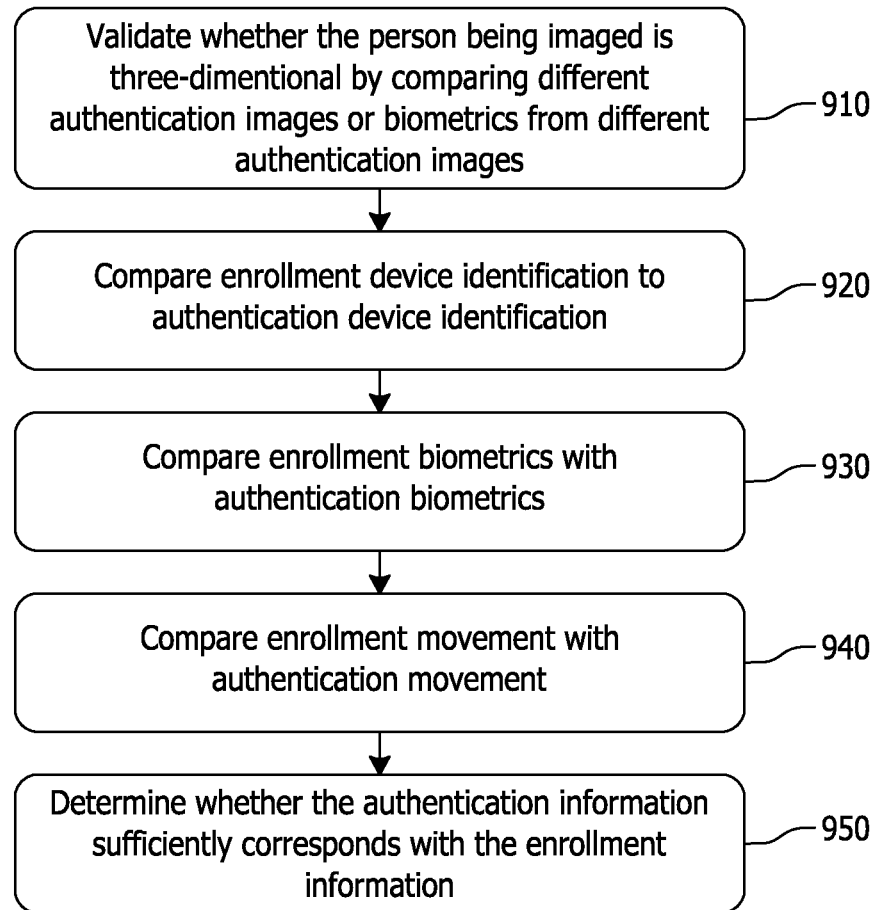
FIG. 9 shows a method of verifying authentication credential in a facial recognition authentication system, according to one exemplary embodiment.

Returning to FIG. 4, in step 430, the authentication server 120 verifies that the credentials received from the mobile device 112 sufficiently correspond with the information obtained during enrollment. For example, as shown in step 910 in FIG. 9, by using algorithms to process the characteristics of the face and light striking the face between the different images, the authentication server 120 can determine that the face in the authentication images is three-dimensional, i.e. not a representation on a printed picture or video screen. Where the mobile device 120 sends only the authentication biometrics 120 to the server, the server 120 may validate the realness or three-dimensional aspects of the user imaged by comparing the biometric results of the different images.

In step 920, the authentication server 120 may then compare the login credentials with the information stored from the enrollment process. In step 920, the server 120 compares the identification of the device obtained during the login process to that stored during enrollment. In step 930, the authentication biometrics may be compared with the enrollment biometrics to determine whether they sufficiently correspond with the enrollment biometrics. In step 940, the authentication movement may be compared with the enrollment movement to determine whether it sufficiently corresponds with the enrollment movement.

In some embodiments, a copy of the enrollment information may be stored on the mobile device 112, and the mobile device 112 may verify that the credentials received on the mobile device 112 sufficiently correspond with the enrollment information. This would allow a user to secure documents, files, or applications on the mobile device 112 itself in addition to securing a user's account hosted on a remote device, such as the authentication server 120, even when a connection to the authentication server 120 may be temporarily unavailable, such as when a user does not have access to the Internet. Further, this would allow the user to secure access to the mobile device 112 itself. Or enrollment info may be stored on server.

Accordingly, in step 950, if the authentication server 120 or mobile device 112 determines that the enrollment information sufficiently corresponds with the credentials received, then the server or mobile device may verify that the identification of the user attempting login corresponds the account holder. This avoids the cumbersome process of the user having to manually type in a complex password using the small screen of the mobile device. Many passwords now require capital, non-text letter, lower case, and numbers.

The level of correspondence required to determine that the enrollment information sufficiently corresponds with the authentication information in the login attempt may be set in advance. For example, the level of correspondence may be a 99.9% match rate between the enrollment biometrics and the authentication biometrics and a 90% match rate between the enrollment movement and the authentication movement. The required level of correspondence may be static or elastic based on the established thresholds.

For example, the required level of correspondence may be based on GPS information from the mobile device 112. In one embodiment, the authentication server 120 may require a 99.9% match rate as the level of correspondence when the GPS information of the mobile device corresponds with the location of the user's home or other authorized location(s). In contrast, if the GPS information shows the device is in a foreign country far from the user's home, the authentication server may require a 99.99% match rate as the level of correspondence or may be denied entirely. Hence, the required match between pre-stored authentication data (enrollment information) and presently received authentication data (authentication information) is elastic in that the required percentage match between path parameters or images my change depending on various factors, such as time of day, location, frequency of login attempt, date, or any other factor.

The required level of correspondence may additionally depend on time. For instance, if a second authentication attempt is made shortly after a first authentication attempt in a location far from the first authentication location based on GPS information from the mobile device 112, the level of correspondence threshold may be set higher. For example, a user can not travel from Seattle to New York in 1 hour. Likewise, login attempts at midnight to three in the morning may be a sign of fraud for some users based on patterns of the users' usage.

The level of correspondence between the enrollment information and the authentication information may be the result of compounding the various parameters of the enrollment information and the authentication information. For example, when the button hold time in the authentication information is within 5% of the button hold time of the enrollment information, the correspondence of the button hold time may constitute 20% of the overall match. Similarly, when the motion path trajectory of the authentication information is within 10% of the enrollment information, the motion path trajectory may constitute 20% of the overall match. Further parameter match rates such as the face size and facial recognition match in the authentication information as compared to the enrollment information may constitute the remaining 10% and 50% of the overall level of correspondence. In this manner, the total overall level of correspondence may be adjusted (total of all parameters being more than 75%, for example), or the match rate of individual parameters may be adjusted. For example, on a second attempted login, the threshold match rate of one parameter may be increased, or the overall level of correspondence for all parameters may be increased. The threshold match rates may also be adjusted based on the account being authenticated or other different desired levels of security.

Returning to FIG. 4, in step 440, the authentication server 120 may grant or deny access based on the verification in step 430. For example, if the authentication server 120 verifies that the credentials match the enrollment information, then the server 120 may authenticate the user to allow access to the user's account. In the instance where the authentication server 120 is separate from the account server 120B (such as a bank's server), the authentication server 120 may transmit the unique identifier to the account server along with an indication that the identity of the user associated with the unique identifier has been verified. The account server 120B may then authorize the user's mobile device 112 to transmit and receive data from the account server 120B. Of course, all this may occur at only the account server 120B or on the mobile device 112 itself.

Alternatively, if the credentials provided by the user are not verified, the authentication server may transmit a message to display on the screen of the mobile device 112 indicating that the login attempt failed. The authentication server 120 may then allow the user to try again to log in via the facial recognition login system, or the authentication server 120 may require the user to enter typical account credentials, such as a user name and password.

In one embodiment, the server 120 may allow three consecutive failed login attempts before requiring a user name and password. If in one of the attempts, the required level of correspondence is met, then the user may be verified, and access may be granted. According to one embodiment, the authentication server 120 may retain the information from each successive authentication attempt and combine the data from the multiple authentication attempts to achieve more accurate facial biometric information of the person attempting to authenticate. In addition, the level of correspondence may be increased at each successive attempt to authenticate. In addition, by averaging the path data (authentication movement) and/or image data (authentication images/biometrics) from several login attempts, the login data (enrollment information) is perfected and improved.

Accordingly, the above described authentication system allows for authentication to a remote server 120 or on the mobile device 112 itself. This may be accomplished as described above by the mobile device 112 capturing the authentication credentials, and the authentication server 120 processing and analyzing the credentials compared to the enrollment information (cloud processing and analysis); the mobile device 112 capturing the authentication credentials and processing the credentials, and the authentication server 120 analyzing the credentials compared to the enrollment information (mobile device processing, cloud analysis); or the mobile device 112 capturing the authentication credentials, and processing and analyzing the credentials compared to the enrollment information (mobile device processing and analysis).

Advantages and Features of the Embodiments

The above described system provides several advantages. As one advantage, the facial recognition authentication system provides a secure login. For example, if during a login attempt the camera of the mobile device imaged a digital screen displaying a person rotating their head while the phone was not moving, the accelerometer, magnetometer, and gyroscope data would not detect any motion. Thus, the enrollment movement and the authentication movement would not correspond, and the login attempt would be denied.

In addition, because a plurality of images are used as enrollment images and authentication images, histograms or other photo manipulation techniques may be used to determine if a digital screen is present in place of a human face in the images. For example, the system may check for light frequency changes in the captured images, or banding in an image which would indicate an electronic display generated the image, backlighting, suspicious changes in lighting, or conduct other analyses on the images by comparing the images to determine that the actual live user is indeed alive, present, and requesting authorization to login.

As yet another advantage, as explained above, not only must the enrollment biometrics sufficiently correspond to the authentication biometrics, but also the enrollment movement must match the authentication movement, and the device information must match the enrollment device information. For example, an application may be downloaded to a mobile device that has a digital camera. The application may be a login application, or may be an application from a financial institution or other entity with which the user has an account. The user may then login to the application using typical login credential such as a website user name and password. Further, the user may have a device code from logging in on another device, or may use the camera to scan QR code or other such code to pair the device to their user account.

The user then holds the mobile device to move the mobile phone to different positions relative to his or her head while keeping his or her face visible to the camera as it is moved. As the mobile device is moved, the camera takes the enrollment images of the face. During imaging, the speed and angle of the current user's mobile device movement is measured using the accelerometer, magnetometer, and gyroscope to generate the enrollment movement. Further continuous imaging and detection of the face throughout the process has been shown to prevent fraud. This is because a fraud attempt cannot be made by rotating images in and out of the front of the camera.

For example, a user may start the movement from right to left or from left to right as shown in FIGS. 6A and 6B. The movement may also be in a front and back direction as shown in FIGS. 7A and 7B. Any other movement may be utilized such as starting in the center, then going right, and then going back to center. Vertical and diagonal movements may also be used to further compound the complexity of the enrollment movement. When the user then later attempts login, the user must repeat the motion pattern in the authentication movement to match the enrollment movement in addition to the biometric data and device information matching. Thus, the security of the system is greatly enhanced.

The system therefore provides enhanced security for authenticating a user who has a mobile device. As explained above, the system may use at least any one or more of the following in any number of combinations to securely authenticate the user: physical device verification, mobile network verification, facial recognition including the size of the face in the image, a face detected in every frame during the movement, accelerometer information, gyroscope information, magnetometer information, pixels per square inch, color bits per pixel, type of image, user entered code or pattern, and GPS information.

As another advantage, the facial recognition login system provides a convenient manner for a user to login to an account with a mobile device. For example, once enrolled, a user does not need to enter a user name and password on the small mobile device each time the user wishes to access the account. Instead, the user simply needs to image himself or herself while mimicking the enrollment movement with the mobile device. This is especially advantageous with smaller mobile devices such as mobile phones, smart watches, and the like.

The system may be further configured to allow a user to securely log on to multiple devices, or to allow users to securely share devices. In one embodiment, the enrollment information may be stored on an authentication server (or on "the cloud") and thus is not associated only with the user's original device. This allows the user to use any number of suitable devices to authenticate with the authentication server. In this manner, a user may use a friend's phone (third party device) or other device to access his or her information, such as account information, address book information, email or other messaging, etc. by performing the authentication operation on any device.

For example, the user may provide an email address, user name code, or similar identifier on the friend's phone such that the authentication server compares the login information with enrollment information for the user's account. This would indicate to the authentication server which authentication profile to use, but does not by itself allow access to the user's data, accounts, or tasks. Upon logging out of a friend's phone, access to the user's information on the friend's phone is terminated. The provides the benefit of allowing a user to securely access account or other authentication accessible information or tasks using any device without having to type the user's password into the third-party device, where it could be logged or copied. In a sense, the user is the password.

Through cloud-based enrollment information, a single user may also securely transfer data between authenticated devices. In one embodiment, a user may own a first device, such as a mobile phone, and is authenticated on the first device via the authentication system. The user may then acquire a new device, such as a new phone, tablet computer, or other device. Using the cloud-based authentication system, the user may authenticate on the new device and transfer data from the first device to the new device. The transfer of data may be completed via the Internet, a local network connection, a Bluetooth connection, a wired connection, or a near field communication. The authentication process may also be part of a security check to resent or restore a system after the phone is lost or stolen. Thus, the authentication system may be used to activate or authenticate a new device, with the authentication used to verify the user of the new device.

Similarly, the system may facilitate secure access to a single shared device by multiple people to control content or other features on the device. In many cases, passwords can be viewed, copied, guessed, or otherwise detected, particularly when a device is shared by several users. The users may be, for example, family members including parents and children, coworkers, or other relationships, such as students. The authentication system may allow each of the family members to log in based on his or her own unique enrollment information associated with a user account.

The device may restrict access to certain content or features for one or more of the certain user's accounts, such as children's user accounts, while allowing access to content and features for others, such as the parents' accounts. By using the authentication system for the shared device, the users such as children are unable to utilize a password to try and gain access to the restricted content because the authentication system requires the presence of the parent for authentication, as explained above. Thus, device sharing among users with different privileges is further secured and enhanced. Likewise, in a classroom setting, a single device may be securely shared between multiple people for testing, research, and grade reporting.

Adaptations and Modifications

Numerous modifications may be made to the above system and method without departing from the scope of the invention. For example, the images may be processed by a facial recognition algorithm on the device and may also be converted to biometric data on the device which is then compared to previously created biometric data for an authorized user. Alternatively, the images from a device may be sent through a wired or wireless network where the facial recognition algorithms running on a separate server can process the images, create biometric data and compare that data against previously stored data that assigned to that device.

Multiple Profiles for a Single User

Further, the photo enrollment process may be done multiple times for a user to create multiple user profiles. For example, the user may enroll with profiles with and without glasses on, with and without other wearable devices, in different lighting conditions, wearing hats, with different hair styles, with or without facial or ear jewelry, or making different and unique faces, such as eyes closed, winking or tongue out to establish another level of uniqueness to each user profile. Such 'faces' made by the user would not be available on the user's Social Media Pages and hence not available for copying, manipulation, and use during a fraud attempt. Each set of enrollment images, enrollment biometrics, or both may be saved along with separate enrollment movement. In one embodiment at least three images are captured as the mobile device completes the path. It is contemplated that any number of images may be captured.

Linking Enrollment Information

It is also contemplated that the enrollment process may be linked to an email address, phone number, or other identifier. For example, a user may sign up with an email address, complete one or more enrollments as described above, and confirm the enrollments via the same email address. The email address may then further enhance the security of the system. For example, if a user unsuccessfully attempts to login via the authentication system a predetermined number of times, such as three times for example, then the authentication system locks the account and sends an email to the email address informing the user of the unsuccessful login attempts. The email might also include one or more pictures of the person who failed to login and GPS or other data from the login attempt. The user may then confirm whether this was a valid login attempt and reset the system, or the user may report the login attempt as fraudulent. If there is a reported fraudulent login, or if there are too many lockouts, the system may delete the account associated with the email address to protect the user's security. Thus, future fraudulent attempts could not be possible.

Feedback Meters

Figure 10:
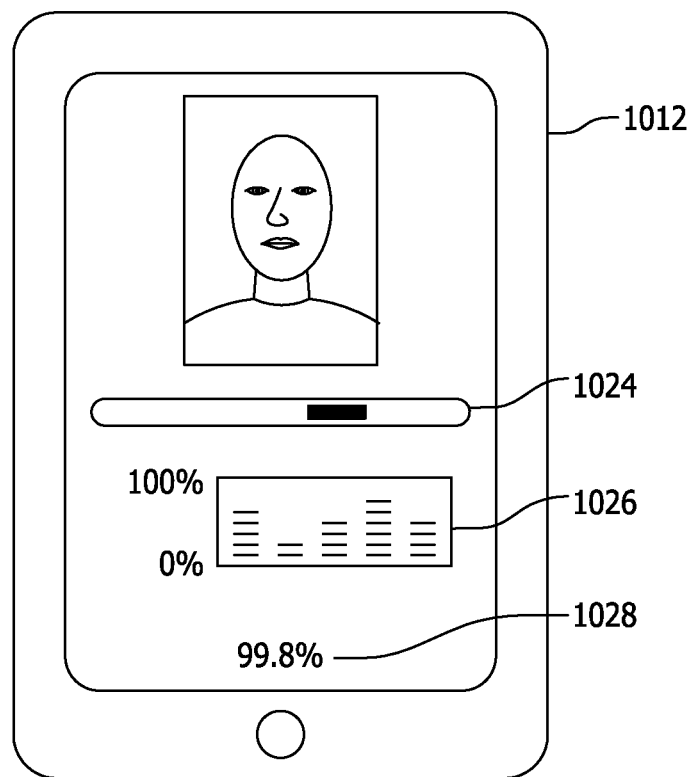
FIG. 10 illustrates an exemplary display showing a graphical and numeric feedback in a facial recognition authentication system.

To further facilitate imaging, the mobile device may include various feedback meters such as a movement meter or accuracy meter as shown in FIG. 10. In one embodiment, the mobile device 1012 may display a movement meter 1024 that indicates the amount of movement the mobile device 1012 makes as the user moves the mobile device 1012 to different positions relative to his/her head. For example, the movement meter 1024 may be represented as a line that slides from one side of the screen. In this manner, the enrollment process may require a certain threshold of device movement to register a user with the multi-dimensional authentication system. For example, the system could require that the mobile device 1012 is moved in an arc or straight line and is rotated at least 45 degrees to create the enrollment information. In another example, the system could require an acceleration experienced by the device exceeding a threshold amount. The movement meter may also aid the user in learning how to image himself/herself using the authentication system.

The mobile device 1012 may also display an accuracy meter 1026 or any other visual representation of authenticated frames to aid the user in authenticating himself/herself using the authentication system and learning to improve authentication. The accuracy meter 1026 may show a user a match rate (graphical, alpha, or numerical) of a predetermined number of images obtained during the authentication process. The accuracy meter can be represented on the display in a variety of ways including numeric percentages, color representation, graphical, and the like. A combination of representations may also be utilized.

For example, as shown in FIG. 10, match rates for a predetermined number of images taken during authentication are represented on the accuracy meter. In the embodiment shown in FIG. 10, each of the images may be represented by a column in a graph, and the accuracy can be shown for each image in each column. For example, the column with a longer bar represent higher accuracy, and a column with a lower bar represents lower accuracy. In addition to match rates for images, the match rates for the path parameter may also be displayed. Over time the user can improve.

In another embodiment, each of the images may be represented on a table as a color that corresponds to the match rate. The color dark green may represent a very high match rate, light green may represent a good match rate, yellow may represent a satisfactory match rate, red may represent a mediocre match rate, and grey may represent a poor match rate. Other colors schemes may also be used.

The height of the bars or the colors used may correspond to predetermined match rates. For example, a full bar or dark green may be a match rate greater than 99.9%, a three-quarter bar or light green may be a match rate between 90% and 99.9%, a half bar or yellow may be a match rate of 50-90%, red may be a match rate of 20%-50%, and a single line to a quarter bar or grey may be a match rate of 0-20%. A pie chart, line graph, or any other type of representation could also be used or any other numerical or graphical display. An overall score may be presented or a score per image.

The accuracy meter may also include a message 1028 indicating an overall match score. For example, the accuracy meter may indicate an average overall match score or the number of images which achieved a 99.9% match rate, and display the message to a user. With the movement meter 1024 and the accuracy meter 1026 as described above, the user may quickly learn to use the authentication system due to the feedback presented by the meters 1024, 1026.

Gamification and Rewards

The movement and accuracy meters 1024, 1026 may also be configured to incorporates game features, aspects, or techniques into the authentication system to encourage a user to try and get the best match possible (such as a high number score or a high percentage of frames), increasing the user's skill in utilizing the authentication system. This also builds user adoption rates for the technology.

For example, the user may compete with themselves to mimic or improve past authentication scores to encourage or train the user to achieve a high score. Further modifications of the authentication meter may also be incorporated such as the ability to share accuracy match results with others to demonstrate one's skill in using the system or to compete against others. In other instances, the user may receive a reward, such as a gift or coupon, for high accuracy scores. While this may slightly increase costs, the reduction in fraud loss would far outweigh the additional cost.

Further game techniques may be incorporated into the authentication system to encourage users to take actions which will prevent unauthorized or fraudulent authentication. In one embodiment, the authentication system may award users that engage in fraud preventing activities. One such activity is utilizing the facial recognition authentication system described herein. For example, based on the above described accuracy meter, the system may reward a user that successfully authenticates with the system above a certain match rate. The system may award reward points, cash, or other prizes based on the successful authentication or on a predetermined number of successful authentications. Where reward points are utilized, the points may be cashed in for predetermined prizes.

Other game features may involve award levels for users who gain a predetermined amount of experience using the authentication feature. For example, different reward levels may be based on users successfully authenticating 100 times, 500 times, 1000 times, etc. Because each instance of fraud loss can be significant and can damage the goodwill of the business or organization, the benefits to fraud prevention are significant.

In one embodiment, the user may be notified that he or she has achieved various competency levels, such as a "silver level" upon achieving 100 successful authentications, a "gold level" for achieving 500 successful authentications, or a "platinum level" for achieving 1000 successful authentications. An amount of points awarded for each authentication above a given match rate may increase based on the user's experience level. Of course, the names of the levels and the number of authentications for each level as described above are only exemplary and may vary as desired.

In one embodiment, an authentication only counts toward reward levels when business is transacted at the web site while in other embodiments, repeated attempts may be made, all of which count toward rewards. Another feature may incorporate a leaderboard where a user may be notified of a user ranking comparing his or her proficiency or willingness in using the authentication system as compared with other users.

Successful use of the authentication system benefits companies and organizations that utilize the system by reducing costs for fraudulent activities and the costs of preventing fraudulent activities. Those cost savings may be utilized to fund the above described game features of the authentication system.

Further activities that correspond to the authentication system and contribute to the reduction of fraud may also be incorporated to allow a user to earn points or receive prizes. Such activities may include a user creating a sufficiently long and strong password that uses a certain number and combination of characters. This encourages and rewards users to set passwords that are not easily compromised. Other examples may include rewarding users to take time to perform verification steps in addition to an initial authentication such as a mobile phone or email verification of the authentication, answering one or more personal questions, or other secondary verifications as currently known or later developed. This rewards users for taking on added time and inconvenience to lower the risk of fraud to a company or organization.

As another example, if the authentication service is used to login to websites or apps that provide affiliate programs, then the reward or gift can be subsidized from the affiliate commissions on purchases made on those sites. For example, if a commerce (product or service) web site utilizes the method and apparatus disclosed herein to avoid fraud, and thus increase profits, then a percentage of each purchase made by a user using the authentication service will be provided to the authentication service. By reducing fraud, consumer purchases are more likely and additional users will be willing to enter financial and personal information. An affiliate link, code, or referral source or identifier may be used to credit the authentication system with directing the consumer to the commerce (product or service) web site.

Multiple Account Login

It is also contemplated that the authentication system may be configured to allow a user to access several different web sites using a single authentication. Because the authentication process and result are unique to the user, the user may first designate which participating web sites the user elects to log into and then after selecting which one or more web sites to log into, the user performs the authentication described herein. If the secure authentication is successful, then the user is logged into the selected web sites. In this way, the authentication process is a universal access control for multiple different web sites and prevents the user from having to remember multiple different user names and passwords while also reducing fraud and password overhead for each user.

Automatic Start/Stop of Imaging

It is also contemplated that the system may be configured to have the video camera running on the phone. The mobile device would grab frames and path parameter data when the phone moves (using the camera, gyroscope, magnetometer, and accelerometer) but only process into biometric data on the device or send the frames up to the server if they have a face in them. In this embodiment, the application executing on the mobile device could trigger the software application to start saving frames once the phone is moving and then if the phone continues to move in the correct path (a semi-circle, for example) and the system detects a face in the frame the mobile device would start to send images, a portion of the image, or biometric data to the server for processing. When the system senses motion it may trigger the capture of images at certain intervals. The application may then process the frames to determine if the images contain a face. If the images do include a face, then the application crops it out and then verifies if the motion path of the mobile device is similar to the one use used during enrollment. If the motion path is sufficiently similar, then the application can send the frames one at a time to the server to be scanned or processed as described above.

Banding and Edge Detection

When a fraudulent attempt is made using a display screen, such as an LED, LCD, or other screen, the system may detect the fraudulent login attempt based on expected attributes of the screen. In one embodiment, the authentication system will run checks for banding produced by digital screens. When banding is detected, the system may recognize a fraudulent attempt at a login. In another embodiment, the system will run checks for edge detection of digital screens. As the mobile device is moved to obtain the authentication movement during a login attempt, the system checks the captured images to for edges of a screen to recognize a fraudulent login attempt. The system may also check for other image artifacts resulting from a screen such as glare detection. Any now know or later developed algorithms for banding and screen edge detection may be utilized. Upon detection of fraud will prevent authentication and access to the website or prevent the transaction or account access.

Other Attributes Estimation

The authentication system may further conduct an analysis on the enrollment images to estimate at least one of a gender, an approximate age, and an ethnicity. In an alternative embodiment, the user may manually enter one or more of their gender, an approximate age, and an ethnicity, or this information may be taken or obtained from existing records which are known to be accurate. The authentication system may then further store a user's estimated gender, age, and ethnicity as enrollment credentials or user data. Thus, when the user later attempts to authenticate with the system, the system will compare derived gender, age, and ethnicity obtained from authentication images (using biometric analysis to determine such data or estimates thereof based on processing) with the stored gender, age, and ethnicity to determine whether to authenticate the user. For example, if the derived data for gender, age and ethnicity matches the stored enrollment credentials, then the authentication is successful, or this aspect of the authentication is successful.

The authentication system may make the gender, age, and ethnicity estimations based on a single image during the authentication process or based on multiple images. For example, the authentication system may use an image from the plurality of images that has an optimal viewing angle of the user's face for the analysis. In other embodiments, a different image may be used for each analysis of age, gender, and ethnicity when different images reveal the best data for the analysis. The authentication may also estimate the gender, age, and ethnicity in a plurality of the images and average the results to obtain overall scores for a gender, age, and ethnicity.

As an alternative to obtaining the gender, age, and ethnicity as enrollment information, the estimated gender, age, and ethnicity estimations as authentication credentials may be set over a course of repeated use of the authentication system. For example, if in previous successful authentications using biometrics and movement information, the authentication system always estimates a user's age being between 40 and 50, then the authentication may set credentials for that user requiring later login information to include images of a face estimated to be between 40 and 50. Alternatively, gender, age, and ethnicity estimations may be implemented as one of many factors contributing to an overall authentication score to determine whether or not to authenticate a user.

For example, if the authentication process has a gender estimation of + or −0.2 of 1.9 male rating, then if the actual results do not fall within that range the system may deny access for the user. Likewise, if the user's age range always falls between 40-50 years of age during prior authentication attempts or enrollment, and an authentication attempt falls outside that range, the system may deny access or use the result as a compounding factor to deny access.

In a further embodiment, when a bracelet or watch capable of obtaining an EKG signature is used, a certain EKG signature may be required at login. The EKG signature could also be paired with the facial recognition rotation to provide multiple stage sign-on for critical security and identification applications. Further, the credentials could also include GPS information where login is only allowed within certain geographic locations as defined during enrollment. In one configuration the GPS coordinates of the mobile device are recorded and logged for a login attempt or actual login. This is additional information regarding the location of the user. For example, if the GPS coordinates are in a foreign country known for fraud, then the attempt was likely fraudulent, but if the GPS coordinate indicate the attempt or login was made in the user's house, then fraud is less likely. In addition, some applications may only allow a user to login when at specified location such as a secure government facility or at a hospital.

The enrollment information may further include distance information. Because the motion arc (speed, angle, duration . . . ) is unique to each user, face detection software on the device can process the images and determine if the device is too close or too far from the subject. Or in other words, the enrollment information may consider the size of the face in the images. Thus, the potential enrollment information may also vary based on the length of a user's arm, head, and face size, and on the optics of the camera in the user's particular mobile device. The user may also be positioned at a fixed computer or camera, such as laptop, desktop, or atm. The user may then move the face either forwards and back, side to side, or up and down (or a combination) to create the images. Hence, this method of operation is not limited to a mobile device. In one embodiment, the camera is disposed in an automobile, such as in a mirror, and the person moves their head or face to authenticate.

Gradual Authentication Access

In one embodiment, the system is set to limit what the user can do when first enrolled and authenticated. Then, after further authentications or after a predetermined time period and number of authentications, additional capabilities may be granted. For example, during the first 20 authentications during the first 3 months, a maximum transaction of $100 may be allowed. This builds a database of known authentication data relating to non-objected to transactions by the user. Then, during the next 20 authentications a transaction limit of $3000 may be established. This limits the total loss in the event of fraud when the authentication data is limited, and the user is new to the system. For example, if an unauthorized user manages to fraudulently enroll in the authentication system.

Video Display for Imaging

When the user images himself/herself using a front-facing camera, the user may confirm that his/her face is being imaged by viewing the image on the display, as described above. The image shown on the display may be configured to be smaller in area than the entire display, and may be positioned in an upper portion of the display towards the top of the device. When the user's image is shown only in the top portion of the user's display screen, the user's eyes tend to look more closely at the front camera. When the user's eyes are tracking up, the accuracy of the facial recognition may be improved. Further, tracking the movement of the eyes from frame to frame may allow the system to validate that the images are of a live person, and are not from a photograph or video recording of the person.

Figure 11A:
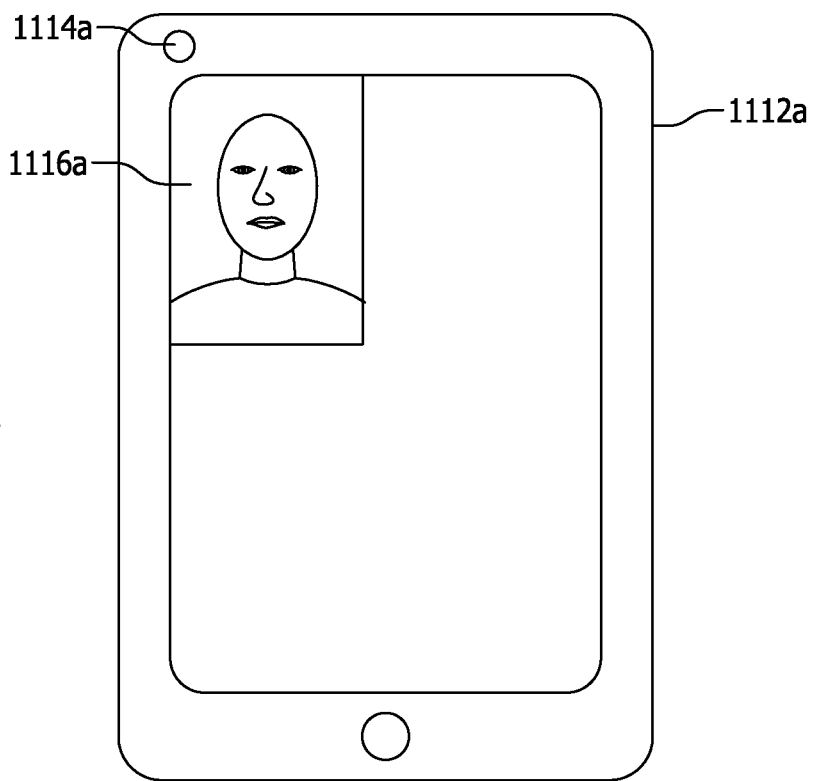
FIGS. 11A, 11B, and 11C illustrate exemplary video feedback displays corresponding to front-facing camera positions in a facial recognition authentication system.
Figure 11B:
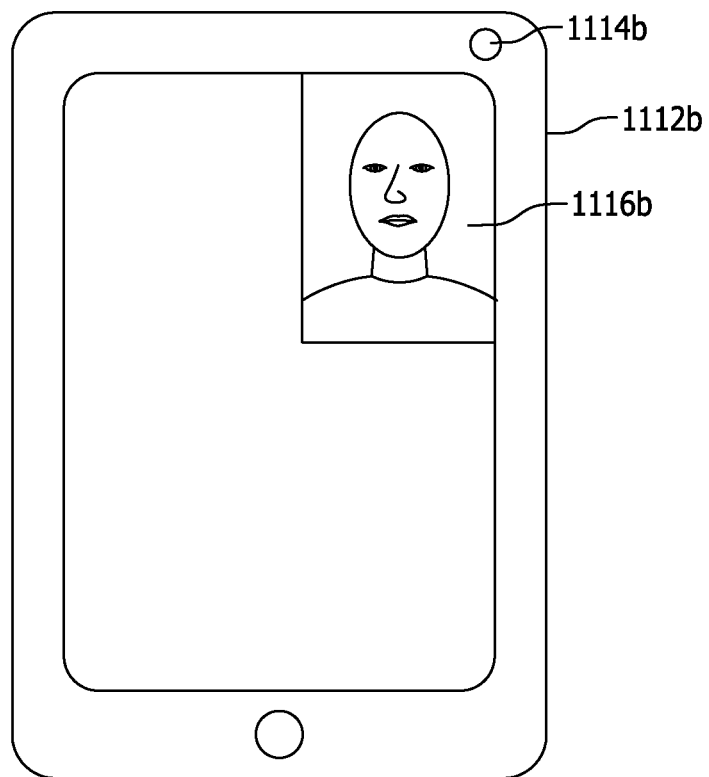
Figure 11C:
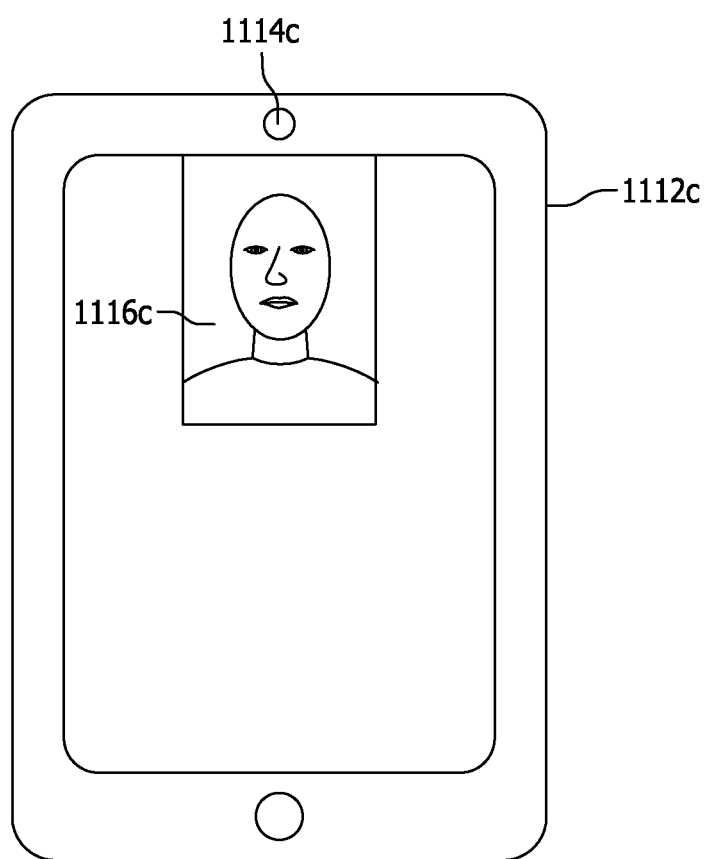

The image shown on the display may also be positioned to correspond with a camera location on the user's device, as shown in FIGS. 11A-11C. Mobile devices that are available today may include front-facing cameras disposed at several different positions. For example, one mobile device 1112a, 1112b may have a front-facing camera 1114a, 1114b that is disposed above the display and off center towards one side or the other, as shown in FIGS. 11A and 11B. Accordingly, the feedback image 1116a, 1116b of the user shown on the display may be positioned to correspond with the location of the camera 1114a, 1114b as shown. In FIG. 11A, where a camera 1114a is above the display and is off-center at a position left of the center, then the image 1116a may be shown in an upper left corner of the display. In FIG. 11B, where a camera 1114b is above the display and is off-center at a position right of the center, then the image 1116b may be shown in an upper right corner of the display. As shown in FIG. 11C, a mobile device 1112c may have a camera 1114c that is disposed centered directly above the display. There, the image 1116c may be displayed centered in an upper portion of the display. In this manner, a user's eyes are directed close to and/or track as close to the camera as possible, aiding eye tracking and movement verification. The user is also able to better see the feedback image, and other feedback or information on the screen, as they move the mobile device.

Figure 12:
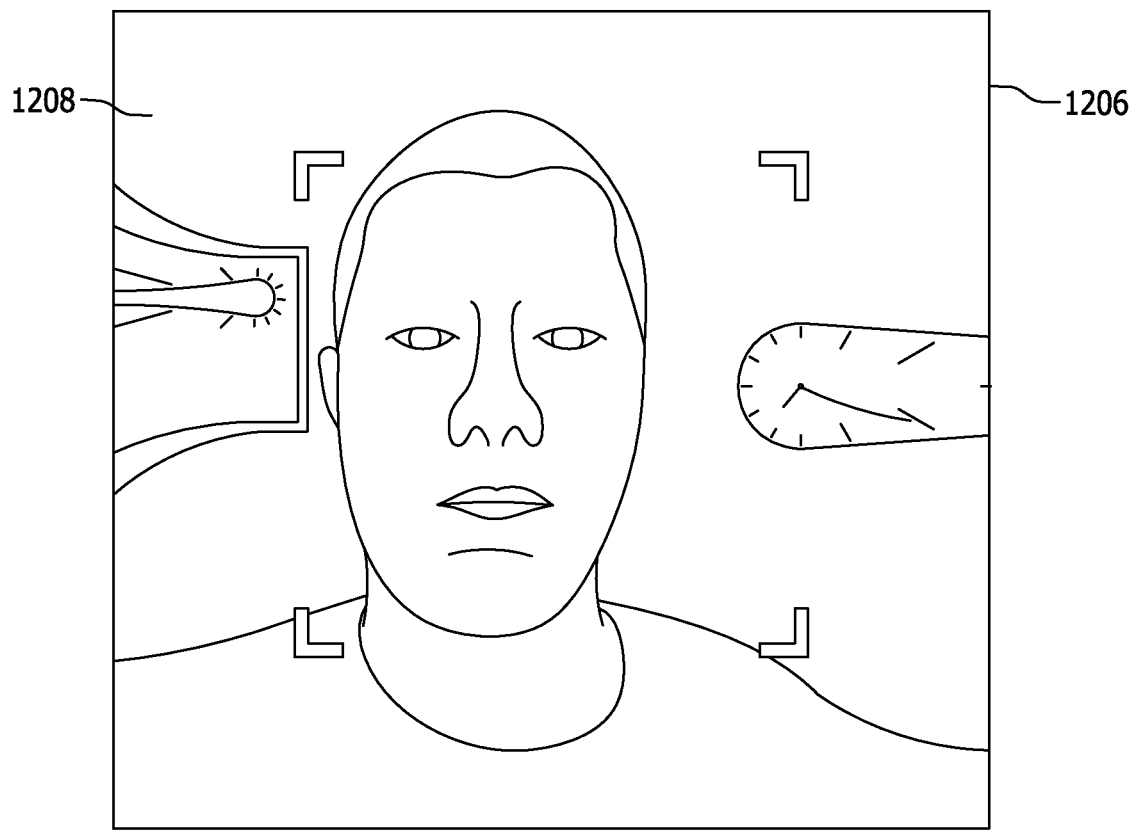
FIG. 12 shows an exemplary video display feedback of a facial recognition authentication system where edge pixels on the sides of the display are stretched horizontally.

The image viewed on the display by the user may further be modified such that the edge pixels on the sides display are stretched horizontally as shown in FIG. 12. That is, a predetermined area 1206, 1208 on both the right and the left sides are warped to stretch towards right and left edges, respectively, of the screen. This allows a larger vertical portion of the displayed image to be shown on the display. Simultaneously, this trains a user to use the system correctly by keeping his or her face in the center of the screen, as his or her face would become warped on the screen if it becomes off center and part of the face enters the one of the warped areas.

Authentication in Low-Light Environments

To facilitate imaging, the screen on the mobile device may additionally be displayed with a white background, and the brightness of the screen may be increased to light up the user's face in dark environment. For example, a portion of the display could provide video feedback for the user to ensure he or she is imaging himself or herself, while the remaining portion of the display is configured to display a bright white color. Referring to the example shown in FIG. 11C, this may be done by showing the video feedback 1116c on a center of the display, with the surrounding areas being displayed as bright white bars around the video feedback 1116c. In very dark situation, an LED flash on the back side of the mobile device and the back facing camera may be used. Alternatively, the camera may be configured to create an image using infrared light or other night vision techniques.

When infrared imaging is used as thermal imaging, further security enhancements are possible. Particularly, the thermal imaging may be analyzed to indicate whether the obtained images are from an actual user or are fraudulent images from a screen or other device. When a person is in front of an infrared thermal imaging camera, the heat radiation detected should be fairly oval shaped designating the person's head. In contrast, the heat radiating from a screen is typically rectangular. Further, the heat patterns detected in the actual person's face as well as the movement of the heat patterns in the images can be compared with expected heat patterns of a human face to distinguish the images from fraudulent authorization attempts using a screen.

Detecting Output from the Mobile Device

The display or other light source on the mobile device may further be utilized to provide additional security measures. During the authentication process described above, light from the display or other light source is projected onto the user's face and eyes. This projected light may then be detected by the camera of the mobile device during imaging. For example, the color tone detected on the skin, or a reflection of the light from the cornea of a user's eye may be imaged by the camera on the mobile phone. Because of this, random light patterns, colors, and designs may be utilized to offer further security and ensure there is a live person attempting authentication and not merely an image or video of a person being imaged by a fraudster.

As one example, when a user begins authentication, the authentication server may generate and send instructions to the user's device to display a random sequence of colors at random intervals. The authentication server stores the randomly generated sequence for later comparison with the authentication information received from the mobile device. During authentication imaging, the colors displayed by the device are projected onto the user's face, and are reflected off the user's eyes (the cornea of the eyes) or any other surface that receives and reflects the light from the screen. The camera on the user's mobile device detects the colors that are reflected off the user's skin or eyes (or other surface) and generates color data indicating the colors detected based on the screen projection. This data may be returned to the authentication server to determine if the color sequence or pattern sent to the mobile device matches that known sequence or pattern projected by the screen of the user device. Based on this comparison at the authentication server the authentication is a success or denied. The comparison with the random sequence of colors in the instructions may alternatively occur exclusively at the user device to determine that a live user is being authenticated.

As another example, when a user begins authentication, the authentication server may send instructions the user's device to display a randomly generated pattern which is then stored on the authentication server. This pattern may include graphics, text, lines or bars, flashing light patters, colors, a QR code, or the like. The randomly generated pattern is displayed during authentication imaging, and the pattern is reflected off the user's eyes (cornea). The camera of the user's device detects the reflected pattern off the eye of the user and processes the reflected, mirrored image of the displayed pattern. The processed pattern (such as being converted to a numeric value) is transmitted to the authentication server and compared to the pattern that was randomly generated and stored on the authentication server to verify if the pattern displayed by the screen, and imaged after reflection off the user's face establishes a pattern match.

If a match occurs, this establishes or increases the likelihood that a live person is being imaged by the device. If the pattern is not a match, or does not meet a match threshold level, then the authentication process may fail (access denied) or the account access or transaction amount may be limited. It is noted that this example could also be incorporated on desktop computer with a webcam that does not incorporate the enrollment movement and authentication movement described above. Further, this example may not only be incorporated with facial recognition, but could also serve as an added layer of security for iris recognition or any other type of eye blood vessel recognition, or any facial feature that is unique to a user.

When the above example is implemented on a desktop computer, eye tracking may also be utilized to further demonstrate the presence of a live user. For example, the screen could show a ball or other random object or symbol moving in a random pattern that the user watches with his or her eyes. The camera can detect this real-time movement to verify the user is live, and not a picture or display, and verify that the eye or head movements correspond to and match the expected movement of the object or words on the screen, which are known by the authentication system. Eye tracking can also be done by establishing an anchor point, such as via a mouse click at a location on the screen (if the user is looking at the location where the mouse click takes place), and then estimating where the user is looking at the screen relative to the anchor position.

The use of a moving object on the screen may also be beneficial during enrollment on either a mobile or stationary device. For example, while capturing the enrollment images, the device may display a moving digital object (such as a circle or words(s)) that moves around the screen so that the user is encouraged to follow it with his or her head and eyes. This movement may be involuntary from the user, or the device may be configured to instruct the user to follow the object. This results in movement of the head and/or eyes creating small changes in the orientation of the user's head and face with the device camera, providing more complete enrollment information. With more complete enrollment information, the system may better ensure that the user will later be authenticated at a high rate even at slightly different angles during future authentication attempts.

Intuitive User Training and Enhanced Security by "Zooming"

Figure 13A:
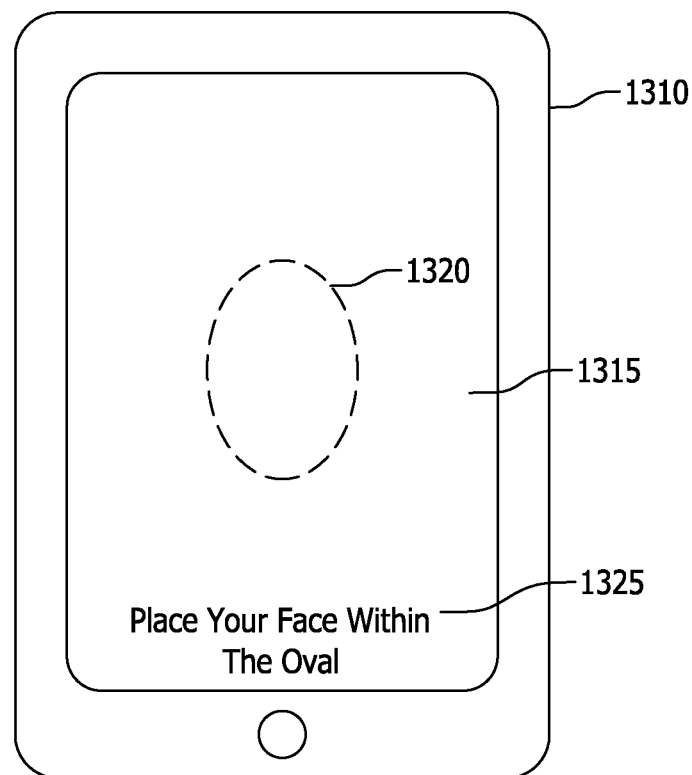
FIGS. 13A and 13B illustrates exemplary screen displays with face alignment indicators shown as an oval to serve as a guide as the user moves the mobile device closer to or away from their face.

In one embodiment, the system is configured to aid the user to easily learn to authenticate with the system. As shown in FIG. 13A, once enrollment or authentication is begun as described previously, the system causes the user's mobile device 1310 to display a small oval 1320 on the screen 1315 while the mobile device 1310 is imaging the user. Instructions 1325 displayed on the screen 1315 instruct the user to hold the mobile device 1310 so that his or her face or head appears within in the oval 1320. Because the oval 1320 is small, the user is required to hold the mobile device 1310 away from his or her body, such as by straightening his or her arm while holding the mobile device 1310. The maximum arm length and face size is unique to the user. In other embodiment, the arm may not be fully straightened such as to accommodate operation when space is not available, such as in a car or in a crowded location. It is noted that while the small oval 1320 is shown centered in the display, it may be positioned anywhere on the screen 1315.

Figure 13B:
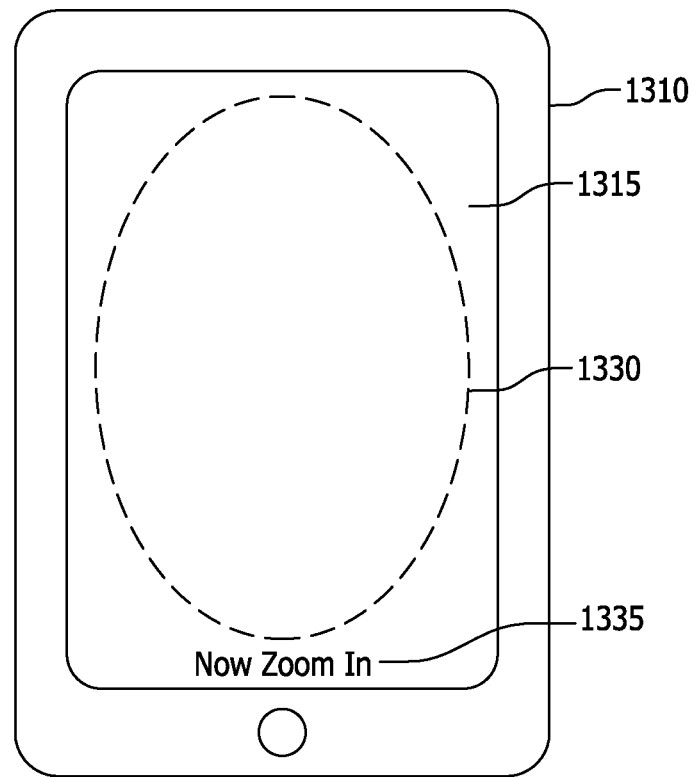

Next, as shown in FIG. 13B, the system causes the user's mobile device 1310 to display a larger oval 1330 on the display 1315. The display 1315 may also show corresponding instructions 1335 directing the user to "zoom in" on his or her face to fill the oval 1330 with his or her face. The user does this by bringing the mobile device 1310 closer to his or her face in a generally straight line to the user's face (such as shown in FIGS. 7A and 7B) until the user's face fills the oval 1330 or exceeds the oval. In other embodiments, the large oval 1330 may simply be a prompt for the user to bring the mobile device 1310 closer to the user's face.

Thus, the system provides and teaches the user a simple method to provide enrollment and authentication images along with enrollment and authentication movement as explained above. The system may also teach varying enrollment and authentication movement by varying the location of the small oval 1320 on the screen 1315, and by changing the order and the size of the ovals displayed. For example, the user may zoom in ½ way, then out, then in all the way, by moving the mobile device. The system may be configured to monitor that the camera's zoom function (when equipped) is not in use, which typically requires the user to touch the screen.

In one embodiment, the enrollment movement may be omitted, and the authentication movement may be compared to expected movement based on the prompts on the screen. For example, the device or authentication server generates a series of differently sized ovals within which the user must place his or her face by moving the mobile device held in the user's hand. In this manner, the authentication movement may be different during each login depending on the order, size, and placement of the ovals shown on the screen.

The system may also incorporate other security features when the "zoom in" movement is used as shown in FIGS. 13A and 13B. Typical cameras on a mobile device or any other device include a curved lens. This results in a barrel distortion effect in the resulting images taken by the camera. In some instances, this curvature may not be visible to the human eye, or may only be noticeable at certain focal lengths. The curvature or barrel distortion effect can vary with focal length or distance between the user and the lens. The degree of the barrel distortion effect is thus dependent on the type of optics used in the camera's lens and other factors.

The barrel distortion effect becomes more pronounced on an image of a person's face when the person images his or her face close to the lens. The effect results in the relative dimensions of the person's face appearing different than when the imaging is done with the person's face farther away from the lens. For example, a person's nose may appear as much as 30% wider and 15% taller relative to a person's face when the image is taken at a close proximity as compared to when the image is taken at a distance. The differences in the relative dimensions are caused by the relatively larger differences between the camera and the various facial features when the person is imaged close to the lens as compared to the relatively equal distances when the person is imaged at a distance farther from the lens.

Such differences have been found to be significant in many facial recognition algorithms. That is, a facial recognition algorithm may not recognize a live person imaged at a close proximity and a far proximity as the same person. In contrast, if a two-dimensional photograph of a person is imaged by the camera at both a close proximity and a farther proximity, the relative focal lengths between the lens and the two-dimensional image do not change so significantly. Thus, a facial recognition algorithm would recognize the two-dimensional photograph as the same person when imaged at both a close proximity and a distance farther from the lens.

This effect may be used to increase the security of the authentication system. For example, during enrollment, enrollment images may be provided by the user at both the close and far proximity from the lens, in addition to other positions through the movement. Later, during authentication, authentication images may be obtained at both the close and far distances from the lens to determine if they match with the enrollment information obtained from the enrollment images. Further, because the barrel distortion effect is expected when an actual, three-dimensional person is present, an absence of the relative change in the dimensions of the facial features alerts the system to a fraudulent attempt at authentication. This effect could not easily be re-created with a two-dimensional picture (printed photograph or screen) and thus, this step can serve as a secure test to prevent a two-dimensional picture (in place of a live face) from being used for authentication.

In other words, using this movement of "zooming" in and out on the user's face, two or more biometric profiles could be created for the same person. One of the multiple profiles for the person may be imaged farther from the camera, and one of the multiple profiles may be for the person imaged closer to the camera. For the system to authenticate the person, the authentication images and biometrics must match the two or more profiles in the enrollment images and biometrics.

In addition, the system may detect the presence of a real person as compared with a fraudulent photograph of a person by comparing the background of the images obtained at a close and a far proximity. When the mobile device 1310 is held such that the person's face fits within the oval 1320, objects in the background that are almost directly behind the person may be visible. However, when the mobile device 1310 is held such that the person's face fits within the larger oval 1330, the person's face blocks the cameras ability to see the same objects that are almost directly behind the person. Thus, the system may compare the backgrounds of the images obtained at the close and the far proximity to determine whether the real person is attempting authentication with the system.

Of course, in FIGS. 13A and 13B, shapes or guides other than ovals 1320 and 1330 may be used to guide the user to hold the mobile device 1310 at the appropriate distance from his or her face. For example, the mobile device 1310 may show a full or partial square or rectangle frame. Further, the system may vary the size and location of the frame, such as the ovals 1320, 1330 to add further security. For example, the system may require a medium sized frame, a small frame, and then a large frame. As another example, the system may require a small frame at a first location and a second location, and then a large frame. This may be done randomly to teach different users different enrollment and authentication movements.

The number of frame sizes presented to the user may also vary for a single user based on the results of other security features described herein. For example, if the GPS coordinates of the mobile device show that the device is in an unexpected location, more frames at different distances may be required for authentication. One or more indicators, such as lights, words, or symbols may be presented on the screen to be visible to the user to direct the user to the desired distance that the mobile device should be from the user.

In FIGS. 13A and 13B, the system may predict the expected barrel distortion of the images based on the mobile device used for enrollment and authentication, and based on known and trusted enrollment data. In addition or as an alternative, the known specifications of a mobile phone camera for a given model may be utilized to predict the expected distortion of the person's facial features at different distances from the lens. Thus, the authentication may be device dependent. Further, enrollment information from the user is not required at every possible distance from the camera.

For example, as described above, enrollment images and biometrics may be obtained for a user at two distances from the user. During authentication, multiple images are captured in addition to images corresponding the close and far distances of the enrollment images and biometrics. Based on the expected distortion of these intermediary images according to the distanced traveled by the device, the system may validate that the change in distortion of the images is happening at the correct rate, even though only two enrollment profiles are obtained.

The capturing of these images may be still images or video, such that frames or images are extracted from the video that is taken during the movement from the first position distant from the user and the second position proximate the user. Thus, it is contemplated the operation may capture numerous frames during the zoom motion and ensure that the distortion is happening at the correct rate for the head size and the movement of the mobile device distance based on data from the accelerometers, magnetometers, and so forth.

Over time based on accumulated data, or calculated data during design phase, the system will have data indicating that if a phone is moved a certain distance toward a user's face, then the distortion effect should fall within a known percentage of the final distortion level or initial distortion level. Thus, to fool or deceive the authentication system disclosed herein, the fraud attempt would not only need to distort the fraudulent two-dimensional picture image, but would also need to cut the background, and then make a video of the face, distortion, and background that does all of this incrementally and at the correct speed, all while not having any banding from the video screen or having any screen edges visible, which is very unlikely.

Many currently known facial detection and facial recognition algorithms are configured to look for a small face within an image. Thus, to ensure that the facial detection and recognition algorithms detect and recognize the user's face in the zoomed in image (FIG. 13B), the system may add a large buffer zone around the image taken at a close proximity. This creates a larger overall image and allows current facial detection and recognition algorithms to detect and recognize the face, even where the face of the user is large in the original image.

When the enrollment and authentication movement resulting from the process described with FIGS. 13A and 13B is used, the eye tracking security features described above may also be enhanced. For example, when the user is instructed to bring the mobile device 1310 closer to his or her face to fill the oval 1330, the QR code, a random shape, a bar code, color, text, numbers or any other visual indictor may be displayed on the screen. At this close distance, the reflection of the displayed indicator off the user's eye or face may be more easily imaged by the camera. Furthermore, eye movement, blinking, and the like to determine the "liveness" of the person being imaged may also be more easily obtained at the close proximity.

In one embodiment, at least one blink is required to prove liveness for authentication. In another embodiment, blinks may be counted, and the number of blinks may be averaged over time during authentications. This allows for an additional factor in authentication to be the number of blinks observed during the motion. If a pattern of when the user blinks during the motion is observed, the system may verify that the user blinks at the expected time and device location during the motion during future authentication attempts.

In other embodiments, the size or location of the oval or frame may change to sizes or locations other than that shown in FIGS. 13A, 13B such that the user must position and/or angle the phone to place his or her face within the oval. This establishes yet another method of insuring liveness of the user.

In one exemplary method, the mobile device is positioned at a first distance from the user and a first image captured for processing. This distance may be linearly away from the user and in this embodiment not in an arc or orbit. This may occur by the user moving the mobile device, either by hand, or by the mobile device being on a movable device or rail system. Or, the lens system may be adjusted if in a fixed system to change the size of the user's face in relation to the frame size. Alternatively, the user may stay stationary, the multiple cameras may be used, or camera may move without the user moving. Once some form of movement (from a device, camera, lens, or user) has occurred to establish the camera at a second distance, a second image is captured for processing. Movement from the first position to the second position may be straight toward the user. Processing occurs on both images.

The processing may include calculations to verify a difference between the two images, or a difference in biometrics obtained from the two images, that indicates that a real person is being imaged. Processing may occur to compare the first authentication image to a first enrollment image (corresponding to the first distance) to determine if a match is present and then compare the second authentication image to a second enrollment image (corresponding to the second distance) to determine if a match is present. If a match occurs, then authentication may proceed.

Variations on these methods are also possible with the system requiring a match at the first distance, but a failure to match at the second distance, thereby indicating that the second image is not of a two-dimensional picture. The processing resulting in a match or failure to match may be any type image or facial recognition processing algorithm. As with other processing described herein, the processing may occur on the mobile device, one or more remote servers, or any combination of such devices.

All the processing described herein may occur on only the mobile device, only a remote server, or a combination there. The biometric data may be stored on the mobile device or the server, or split between the two for security purposes. For example, the images could be processed on the mobile device, but compared to enrollment data in the cloud or at a remote server. Or, the images could be sent to the cloud (remote server) for processing and comparison.

Touch Screen Enhancements

Additional added security modifications may include information about a user's finger. Many mobile devices with touch screens can detect the location and approximate size of a user's touch on the screen. Accordingly, an approximate size of a user's finger or thumb may be measured by the system. In addition to the size of a finger, an orientation angle of the finger or whether the fingers or thumbs of the right or left hand are used can be detected.

In one embodiment, a user selects an account to open, begins enrollment imaging, or begins authentication imaging by touching the touchscreen of the user device. The authentication system may thus detect whether the touch by a user during authentication corresponds with previously stored enrollment information including the size of the user's finger or thumb, amount of pressure applied to the screen and whether the user is right or left handed. This adds an additional security layer for the authentication system.

Figure 14:
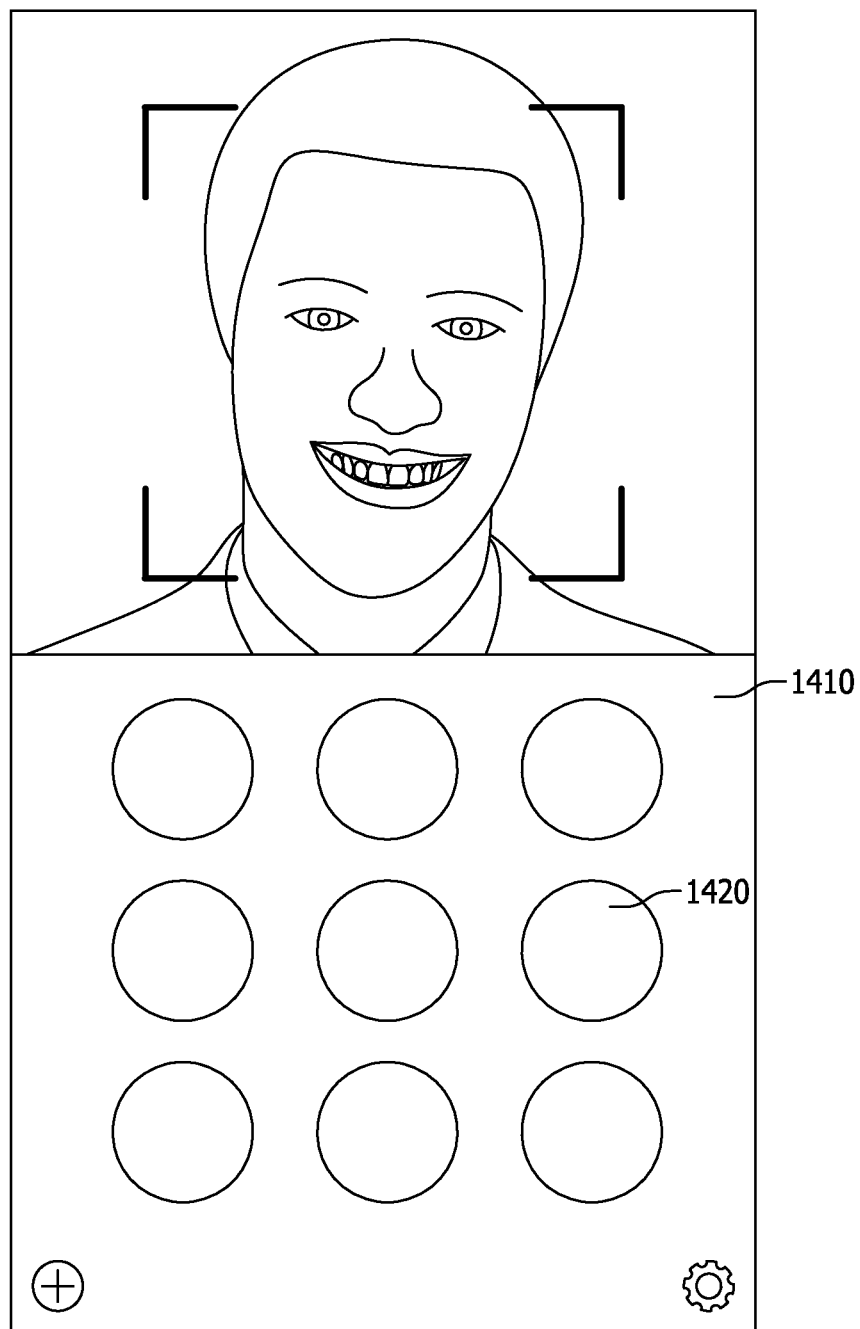
FIG. 14 illustrates an exemplary mobile device display showing a graphical code entry interface with an imaging area.

Furthermore, the authentication system may require that the user initiates an authentication by touching a fingerprint reader or the touchscreen in one or more predetermined manners. In one embodiment, as shown in FIG. 14, a touchscreen 1410 may be divided up into predetermined regions 1420. For example, there may be nine equal, circular, square, or other shaped regions 1420 on the touchscreen 1410 of the mobile device. During enrollment, the user selects one of the regions 1420 of the screen 1410 to touch to initiate authentication. During authentication, if the pre-selected region 1420 is not touched to begin authentication or during the entire authentication process, then authentication is denied. This is but one possible design possibility and other design options are contemplated.

Figure 15:
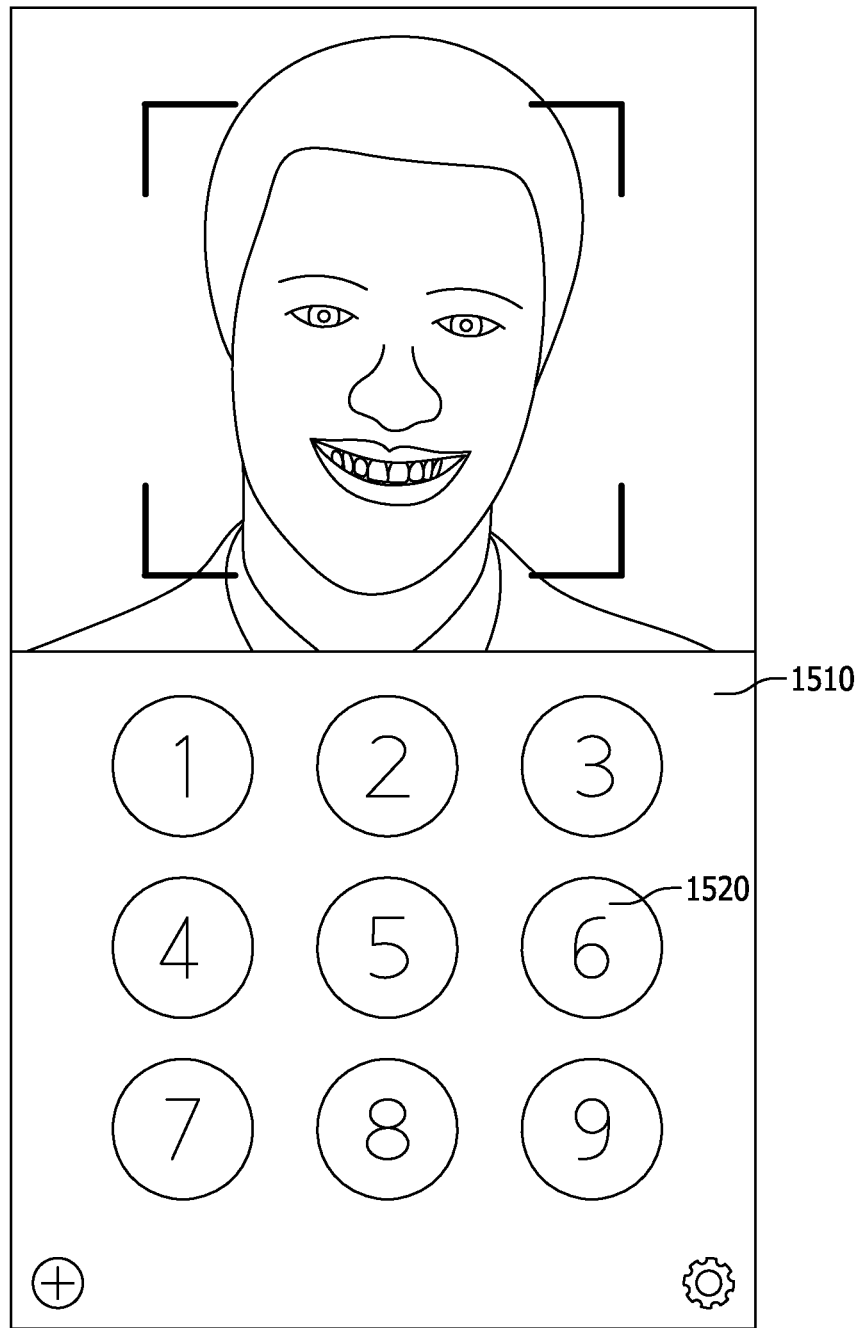
FIG. 15 illustrates an example mobile device display showing a numeric and graphical code entry interface with an imaging area.

The regions 1420 on the touchscreen may be visually represented by a grid, or may not be displayed at all on the touchscreen 1410. As shown in FIG. 15, in addition to or in place of the regions 1420, buttons 1520 may be displayed on a touchscreen 1510. Here, the user may initiate the authentication by pressing one or more of the buttons 1520 in a predetermined pattern. The user may also initiate authentication via a predetermined swiped pattern. The position to be touched by the user may change with each authentication attempt and may be conveyed to the user through any instructions from the authentication server, such as a code, number, letter, color, captcha or other indicator.

Voice Parameters

It is also contemplated that the user could record their voice by speaking a phrase while recording their images during the enrollment process when first using the system. Then, to authenticate, the user would also have to also speak the phrase when also moving the mobile device to capture the image of their face. Thus, one additional path parameter may be the user's spoken voice and use of voice recognition as another layer or element of the authentication process.

Image Quality Assurance

The authentication system may also process the images received from the mobile device to determine if the images are of sufficient quality. For example, the system may check the images for blurriness caused by the images being out of focus or by the camera lens being obscured by fingerprints, oils, etc. The system may alert that user that the quality of the images is insufficient (or too bright or too dark) and direct the user to adjust a focus, exposure, or other parameter, or to clean the lens of the camera.

Autofocus

The authentication system may also utilize an autofocus feature when the mobile device camera is equipped with such. For example, when an actual, three-dimensional person is being imaged, the system checks to ensure that the sharpness of the image changes throughout as the camera perform auto-focusing. In another embodiment, the system may control the autofocus so that the camera focuses on a first location or distance to check for sharpness (in focus) of a portion of the image containing a face. The system then controls the camera to focus at a second location or distance where the presence of a face is not detected and check for sharpness (in focus) of a portion of the image. If a three-dimensional person in a real environment is being imaged, it is expected that the focal length settings should be different at the first and second locations, which suggests a real person is presently being imaged. However, if the focal lengths of both locations are the same, this indicates that a two-dimensional photograph or screen is being imaged, indicating a fraudulent login attempt.

The system may also control the auto-focus of the device to check for different focal lengths of different features in the image. For example, when a person's face is imaged from the front, a person's ear is expected to have a different focal length (more distant) than the tip of a person's nose.

Images of Login Attempt

The authentication server may also be configured to store the authentication images for a predetermined length of time. The images may provide additional security benefits as evidence of a person attempting to log in to a user's account. For example, the system may store a predetermined number of prior log in attempts, such as twenty login attempts, or store images from login attempts for a predetermined time period, such as during the past seven days or weeks. Any fraud or attempted fraud will result in pictures of the person attempting the login being stored or sent to the authentication server of the account server.

The mere knowledge that photos will be taken and sent is a significant deterrent to any potentially dishonest person because they know their picture will be taken and stored, and it is an assurance of security to the user. Likewise, any attempted and failed attempt can have the photo stored and indicator of who is attempting to access the account. It is also contemplated that an email or text message along with the picture of the person attempting the failed log in may be sent to the authorized user, so they know who is attempting to access their account. This establishes the first line of security for the account as the user with the photo or image also being possessed by the authentication server.

Adaptive Match Thresholds

Further, the level or percentage of correspondence between the enrollment information and the authentication information to authenticate the user may change over time. In other words, the system may comprise an adaptive threshold.

After a user regularly uses the authentication system described above, the user will have logged in with the system by moving the mobile device in the predetermined path relative to his or her head many times. Accordingly, it may be expected that as the user will gain experience using the authentication system, and that the user will gradually settle into a comfortable and standardized motion path. In contrast, the initial enrollment movement of a user will likely be the most awkward and clumsy movement as the user has little experience with the authentication system.

To make the authentication system more convenient for the user without losing security, the adaptive threshold system allows the enrollment movement to adapt so that the user is not locked into the awkward and clumsy initial movement as the enrollment movement. To facilitate this, upon each successfully authorization, the successful authorization movement is stored, and the motion path is added to a list of acceptable motion paths. The list of acceptable motion paths may be limited to a predetermined number of paths. When a new successfully authorization is completed and the list of acceptable motion paths is full, the older enrollment motion path is deleted and the newest is stored in its place. Alternatively, the motion path that is least like the other motion paths stored on the list may be deleted. Thus, by storing the most alike or newest motion paths, the enrollment movement may slowly adapt over time as the user because familiar with the system and settles into a comfortable motion path for authentication.

In addition, other enrollment information may adaptively change in a similar manner as the user information. For example, successful authentication photos or biometric information can be stored as part of the enrollment information, and old enrollment information may be discarded over time. In this manner, the authentication system can be convenient for a user even over a long period of time as the user experiences aging, facial hair growth, different styles of makeup, new glasses, or other subtle face alterations.

Determining how much variance is allowed over time in the motion path or the biometric information, or both may be set by the entity requiring authentication to meet that entity's security requirements. Time or number of scans after the initial enrollment can be used to modify the adaptive threshold. For example, during a first few days after enrollment, the threshold may be lower while a security threat is low and the differences in paths are likely to be higher. After several authentications or several days, the threshold may increase. The threshold further may be set based on trending data of either the motion path or biometric information. For example, the threshold may be more lenient in a direction the data is trending, while having a tighter tolerance for data against the trend.

A temporal aspect may also be added along with the location information. For example, if the user conducts and authenticates a transaction near his home, and then one hour later another transaction is attempted in a foreign country, the transaction may be denied. Or it may be denied if the distance between the prior authentication location and the next authentication location cannot be traveled or is unlikely to have been traveled in the amount of time between login or authentication attempts. For example, if the user authenticates in Denver, but an hour later an attempt is made in New York, Russia or Africa, then either first or second attempt is fraudulent because the user likely cannot travel between these locations in 1 hour.

Further, if the next transaction is attempted at a more reasonable time and distance away from the first transaction, the level of correspondence threshold may be raised to provide added security, without automatically denying the transaction. Likewise, an altimeter may be used such that if the altitude determined by the mobile device is different than the altitude of the city in which the user is reported to be located, then this may indicate a fraud attempt. Thus, altitude or barometric readings from the mobile device may be used to verify location and can be cross referenced against GPS data, IP address or router location data, or user identified location.

Random Image Distortion

To provide an additional layer of security to the facial recognition authentication system, the system may utilize random image distortion. For example, a user may be assigned a random distortion algorithm upon enrollment into the system. The distortion algorithm may include such distortions to the image as widening or narrowing the person's face by a predetermined amount, adding or superimposing a predetermined shape at a predetermined position on the user's face. As one example of this, the distortion may be a circle superimposed at 100 pixels above the user's left eye.

With the uniquely assigned distortion on the images from the user, the biometric data for that user will be unique to the account or device used by the user. That is, the enrollment biometrics stored on the authentication server or on the mobile device will reflect not only the facial features of the user, but also will reflect the uniquely assigned image distortion. Thus, even if an accurate, fraudulent representation of a person were used on a different device or via a different account, the proffered authentication biometrics would not sufficiently correspond due to a different or an absence of the unique distortion. Thus, the overall security may be enhanced.

Security Layers

It is noted that each of the above embodiments, modifications, and enhancements may be combined in any combination as necessary to create multiple layers of security for authentication. For example, the facial recognition may be combined with motion detection or path detection, or operate independently of these features for authentication. Further, when more than one of the above described enhancements or modifications are combined, the authentication system may be configured so as not to provide any feedback or indication on which layer failed authentication.

For example, when a predetermined touch pattern to initiate authentication is combined with the authentication movement and facial authentication, the system does not indicate whether a touch pattern was incorrect, or the authentication movement or authentication images failed to correspond to the enrollment information. Instead, the system provides an identical denial of authentication no matter what failure occurs. This is the case when any number of the security features described above are combined. In this manner, it is difficult for a fraudster to detect what aspect of the fraudulent credentials must be corrected, further enhancing the security of the system.

All the above features may be incorporated together, or only some features may be used and others omitted. For example, when the device prompts the user to move the device so that the user places his or her head within a first small frame (such as an oval) then to a second large frame (such as in FIGS. 7A, 7B, 13A, and 13B), the system may be configured such that facial recognition need not be performed on the image(s) in the first frame (distantly captured frames). The security of the system is maintained by performing facial recognition throughout the imaging at some point between the first and second frames, and at the second frame. This may especially be true when also integrated another layer of security, such as checking eye tracking following a moving object on the screen, or reading a reflection of a QR code or random shape off the user's eye. In another embodiment, when two or more cameras are used creating three dimensional, stereoscopic images, the facial recognition may not be performed at the first, far away frame, but instead the liveness of the person may be validated at the closer in frame only after the movement of the device. In still other embodiments, other security layers may be used, and the motion parameters may be omitted. Such combinations may be beneficial for larger or stationary devices, such as gaming laptop computers, personal desktop computers, a stationary kiosk, or the like.

Example Applications

Likewise, although described herein as financial account authentication, the authentication using path parameters and image data may be implemented in any environment requiring verification of the user's identity before allowing access, such as auto access, room access, computer access, web site or data access, phone use, computer use, package receipt, event access, ticketing, courtroom access, airport security, retail sales transaction, IoT access, or any other type of situation.

For example, an embodiment will be described where the above authentication system is used to securely conduct a retail sales transaction. In this embodiment, a user is enrolled with the authentication server or an authentication application on the mobile device as described above and has generated enrollment information including enrollment images and/or biometrics, and enrollment movement. In this example, the user initiates or attempts to complete a transaction at a retail establishment with a credit card, smart card, or using a smart phone with NFC capabilities.

The user begins the transaction by swiping a credit card, smart card, or using an application on a smartphone with NFC capabilities to pay for goods or services. The retail establishment would then authorize the card or account with the relevant network of the financial institution ("Gateway"). For example, the retail establishment, through a Gateway such as one operated by VISA or AMERICAN EXPRESS would determine whether the account is available and has sufficient available funds.

The Gateway would then communicate with the authorization server to authorize the transaction by verifying the identity of the user. For example, the Gateway may send an authorization request to the authentication server, and the authentication server then sends a notification, such as a push notification, to the user's mobile device to request that the user authenticate the transaction.

Upon receipt of the notification from the authentication server, such as through a vibration, beep, or other sound on the mobile device, the user may then authenticate his or her identify with the mobile device. The authentication server may also send information concerning the transaction to the user for verification by the user. For example, the authentication server may send information that causes the mobile device to display the merchant, merchant location, and the purchase total for the transaction.

Next, as before, the user may hold the mobile device and obtain a plurality of authentication images as the user moves the mobile device to different positions relative to the user's head. While moving the mobile device to obtain the authentication images, the mobile phone further tracks the path parameters (authentication movement) of the mobile device via the gyroscope, magnetometer, and the accelerometer to obtain the authentication movement of the device. The mobile device may then send the device information, the authentication images, and the authentication movement to the authentication server. In other embodiments, the mobile device may process the images to obtain biometric data and send the biometric data to the server. In still other embodiments, the mobile device may process the images, obtain the authentication information, compare the authentication information to enrollment information stored on the mobile device, and send pass/fail results of the comparison to the authentication server.

The authentication server may then authenticate the identity of the user and confirm that the user wishes to authorize the transaction on his or her account if the device information, authentication images and/or biometrics, and authentication movement correspond with the enrollment device information, the enrollment images and/or biometrics, and the enrollment movement. The authentication server then transmits an authorization message to the Gateway. Once the gateway has received confirmation of the authorization, the Gateway then communicates with the retail establishment to allow the retail transaction.

Several advantages may be obtained when a retail transaction is authorized utilizing the above system and method. Because the identity verification of the user and the confirmation of the transaction is completed via the authentication system and mobile device, there is no longer a requirement for a user to provide his or her credit card or signature, or to enter a pin number into the retailer's point of sale system. Further, the retail establishment does not need to check a photo identification of the user. The above method and system also has the advantage that it provides secure transactions that can work with mobile and online transactions that do not have cameras, such as security cameras, on the premises.

In the secure retail transaction described above, the user obtains the total amount due on his or her mobile device from the retail establishment via the Gateway and authentication server. However, in one embodiment, the mobile phone may use the camera as a bar code, QR code, or similar scanner to identify the items and the prices of the items being purchased. The mobile device may then total the amount due and act as the checkout to complete the transaction with the retail establishment.

In another embodiment, a user of the application may want to anonymously pay an individual or a merchant. In this instance, the user would designate an amount to be paid into an application, and the application would create a unique identifying transaction number. This number may then be shown to the second user, so the second user can type the identifying transaction number on an application on a separate device. The unique identifying transaction number may also be sent from the user to the second user via NFC, Bluetooth, a QR code, or other suitable methods. The second user may also type the amount and request payment.

Upon receiving the payment request and unique identifying transaction number, the authentication server may send a notification to the first user's mobile device to authenticate the transaction. The user would then verify his or her identity using the facial recognition authentication system described above. The user may alternatively or additionally verify his or her identity using other biometric data such as a fingerprint or retina scan, path based motion and imaging, or the user may enter a password. Upon authentication, the user's device would send a request to the user's payment provider to request and authorize payment to the second user. In this manner, the payment may be done securely while the users in the transaction are anonymous.

According to one embodiment, as an additional measure of security, the GPS information from the mobile device may also be sent to the authentication server to authenticate and allow the retail transaction. For example, the GPS coordinates from the mobile device may be compared with the coordinates of the retail establishment to confirm that the user is actually present in the retail establishment. In this manner, a criminal that has stolen a credit card and attempts to use the card from a distant location (as compared to the retail location) is unable to complete a transaction because the user's phone is not at the location of the retail establishment. IP addresses may also be used to determine location.

As explained above, the level or percentage of correspondence between the enrollment information and the authentication information to authenticate the user may also be adjusted based on the coordinates of the GPS of the mobile device. For example, if the retail establishment and GPS coordinates of the mobile device are near a user's home, then the level of correspondence may be set at a lower threshold, such as at a 99% match rate. Alternatively, if the location is very far from the user's home, and is in a foreign country, for example, then the level of correspondence may be set at a higher threshold, such as at a 99.999% match rate.

Biometric Identification Using Root Identity Information

Most biometric identification systems in recent years use devices such as smartphones to capture biometric data (e.g. a digital photograph or scan of a fingerprint). This biometric data is matched to preexisting biometric data either on the device (in compliance with the FIDO Alliance standards) or on the cloud (a remote computing device) where the biometric data is sent to servers and compared to preexisting data.

However, with the ability to convert images or other biometric data into biometric templates on the device without sending the raw data files up to a server, an additional option is available. Existing raw biometric data such as facial images, fingerprint scans, etc. or converted biometric templates may be downloaded to the device. The downloaded biometric data may then be converted and/or compared to a biometric template that was created from the data captured on that device and previously uploaded to the cloud or captured and uploaded to the cloud from a different device.

This allows a third party to provide an existing root identity profile for comparison to the biometric information obtained at the device for authentication. For example, the root identity profile may comprise an image or other biometric reading from a customer that was captured and verified in a bank branch, from a DMV file, or from another authorized and trusted source. The root identity profile may alternatively or additionally comprise biometric templates created from the verified image or biometric reading. In this manner, the identification match at the device has in increased level of trust based on the verified, third-party root identity profile.

Figure 16:
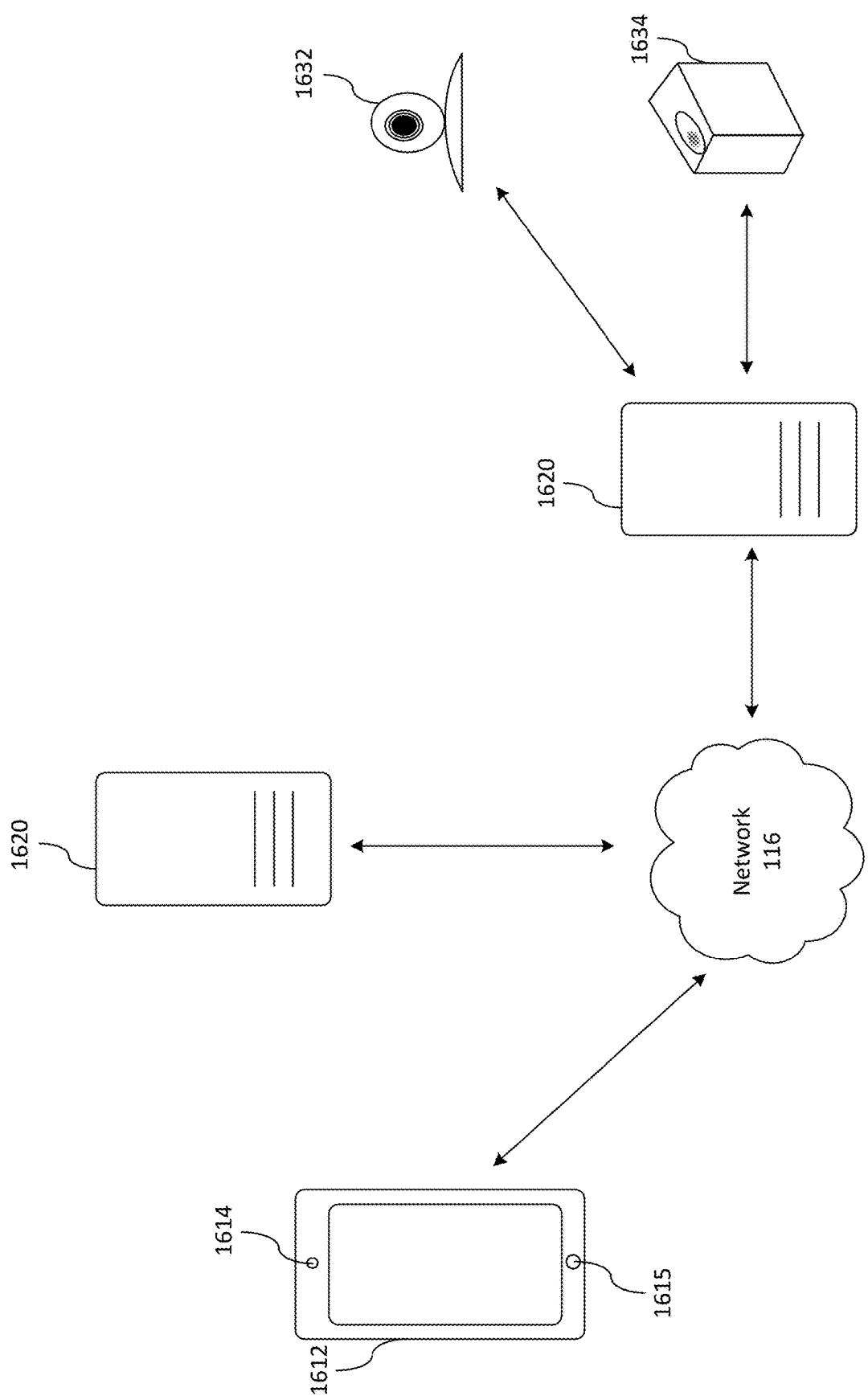
FIG. 16 shows a system for biometric identification using root identity information, according to an exemplary embodiment.

FIG. 16 shows a system for biometric identification using root identity information, according to an exemplary embodiment. The system includes a user device 1612 such as a smart phone or tablet computing device that comprises one or more biometric sensors such as a camera 1614 and fingerprint scanner 1615. The device 1612 communicates with a network 116 such as the Internet.

A root identity server 1630 is also connected to the network 116. The root identity server 1630 may be a bank server, a government server, or other "trusted" server that stores the root identity information including biometric information and/or biometric template(s). The root identity server 1630 is connected to biometric sensing devices such as a camera 1632 or fingerprint scanner 1634. An authentication server 1620 providing an application such as facial recognition algorithms and the like is also connected to the network 116.

Figure 17:
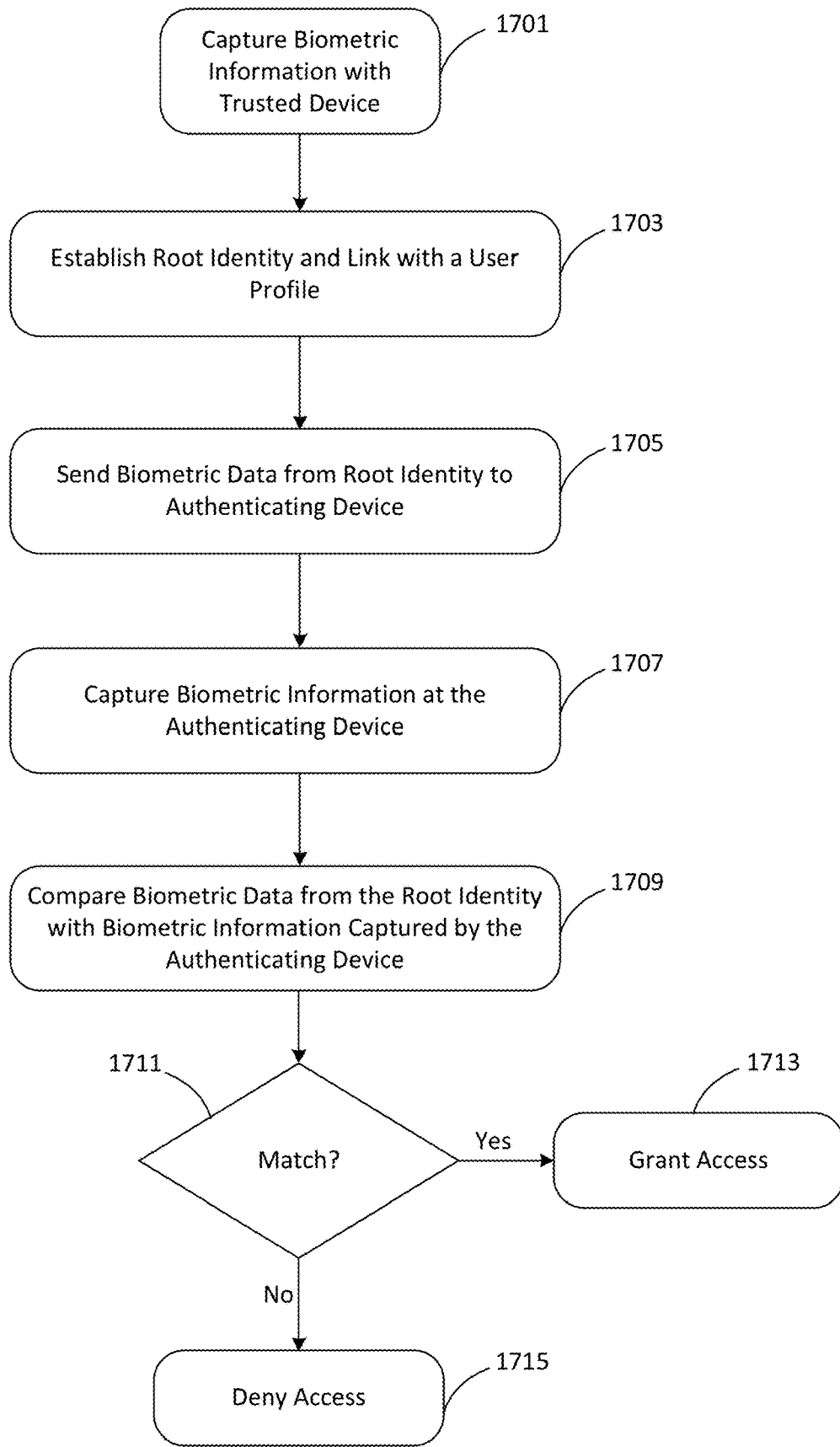
FIG. 17 shows a method for authenticating using a root identification system, according to one exemplary embodiment.

FIG. 17 shows a method for authenticating using a root identification system, according to one exemplary embodiment. Authentication using facial recognition as the biometric information analyzed for a root identity profile may work as explained in the following exemplary embodiment. First, in step 1701, biometric information is captured via a trusted device (camera 1632 or scanner 1634 in FIG. 16). The device is considered trusted because the biometric information collected at the device is verified by a trusted institution such as a bank or government agency. A root identity profile is established in step 1703 that comprises the biometric information from the trusted device and links the biometric information to a user identity. This root identity profile is stored on the server, such as server 1630.

In step 1705, biometric information such as an image that contains data about the face of an individual from the root identity profile is sent from the server 1630 to the smart device 1612 upon an authentication request from the smart device 1612. The user of the smart device 1612 then articulates the camera 1614 so that the user's face can be captured by the device's camera 1614, in step 1707. The image downloaded from the server 1630 and the image that has been captured on the device 1612 can now be compared in step 1709. For example, each image is converted into a biometric template by a facial recognition algorithm for comparison. Upon comparison, if the templates are similar enough based on the thresholds set by, for example, an application publisher, the device captured image (device identity) and the previously captured image (root identity) can be considered a match in step 1711. Access may then be granted, or the signup/enrollment process may then be completed based on the matching images in step 1713. If there is no match in step 1711, the access is denied in step 1715.

The benefits of this system include but are not limited to the ability to match previously captured biometric data from a different device with a new device while no Biometric Data leaves the new device during the matching. This is important in some regulatory environments and industries.

For facial recognition systems with a server component, the same facial recognition algorithm can be loaded onto the server as is running in an application on the smart device. This allows only the template to be transferred to the device instead of the biometric reading itself (e.g. the facial images, fingerprints scans, etc.). For example, in step 1705, the biometric information may be the biometric template instead of an image from the root identity profile. The algorithms must be configured so that the templates they create are homogenous and can be compared. That is, if the algorithms output data in different formats, the resulting biometric templates/data format is incompatible, and no matching can occur because the similar facial features would not be represented by similar biometric template data patterns. The term template is defined herein as biometric data points represented by a string of numbers or other data formed in a consistently formatted pattern so that similarities and differences may be determined via various methods of comparison.

In an embodiment where on the template is transferred to the device, the root identity established in step 1703 may include a biometric template created from a biometric algorithm, such as a facial recognition algorithm. For example, an image that includes the face of an individual that captured with a trusted device (camera 1632 at a bank branch, DMV, etc.) is sent to the server 1630 where it is converted to a biometric template with a facial recognition algorithm. As mentioned above, the biometric template from the root identity profile is sent to the smart device 1612 upon an authentication request in step 1705. This can be referred to as the root identity biometric template. The method proceeds as previously explained with reference to FIG. 17, where the biometric templates are compared in step 1709.

In another example, two or more biometric modalities could be used together such as fingerprints, face, and voice. Another example of the method of FIG. 17 using two or more biometric modalities may work as follows. First, images of a user's face, scans of the user's fingerprints, as well as a recording of the user's voice are captured with trusted devices in step 1701 (e.g. devices 1632, 1634 at a bank branch, a DMV, etc. where the identity of the captured data is verified) to establish a root identity in step 1703. The images, scans, and recording may be considered root identity biometric data because this information is captured from a trusted source. In step 1707, the user of the smart device (1) presses one or more of his/her fingers on a fingerprint sensor, and/or takes a photo of their fingers; (2) articulates the camera so that the user's face can be captured by the device's camera; and/or (3) speaks words into the device's microphone to be recorded. The device recorded data may be considered device identity biometric data.

The root identity biometric data and the device identity biometric data are converted into biometric templates (root identity biometric templates and device identity biometric templates) by fingerprint recognition, facial recognition, and/or voice recognition algorithms. In some instances, the root identity biometric data may be converted into the root identity biometric templates at the server, and the templates may be sent to the device. The root identity biometric templates and the device identity biometric templates are compared in step 1709, and if the templates are similar enough based on the thresholds set by, for example, an application publisher, the root identity templates and the device identity templates can be considered a match. Based on the match, access may be granted, or a signup/enrollment process can be completed in step 1713.

In another embodiment, in step 1709, the images and/or the biometric template(s) from the user's device may be uploaded to the server where they can be stored and/or compared with the root identity biometric images and/or template(s). Then, if the user wishes to replace the original device or add a second user device to the account, both the root identity image(s) and/or template(s) the device identity image(s) and/or template(s) captured on the first device can be sent to the second device during set up or enrollment for comparison and matching. This daisy-chains the root identity from the server to the first device identity, and then again to the second device identity. If no root identity image and/or template has been captured previously and stored on the server, the image and/or template that is uploaded from the first device can still provide added security. If the user chooses to add a second device to an account, the image(s) and/or template(s) from the first device can be downloaded to the second device, and the comparison described above may again occur. This allows the user to add a second device with increased security because the user identities on both devices were deemed to be a match.

In addition, when the image(s) and/or template(s) are uploaded to the server, the on-server comparisons between the image(s) and/or template(s) can be performed independent from a comparison performed directly on the device. This offers a significant increase in security because even if a hacker was somehow able to manipulate the user's device to send a "Match" result back to the server, the server would also compare the same image(s) and/or biometric template(s). Hence, the authentication may occur at two or more devices or servers to make the system more secure. If less than all or a predetermine number of device/serves to not authenticate, then a match is not declared. Thus, the server would also need to determine that the image(s) and/or biometric template(s) were a match using the same thresholds. Therefore, the hacker would not only need to compromise the user's device, but also the one or more servers to defeat the security.

In addition to the biometric matching, liveness checks may be included on the device portion of the matching as well as the server portion, as have been described in detail above. For example, additional information such as device movement, skin texture, three-dimensional depth information can be used to help determine that the biometric data being presented to the camera is from a live human being and not a photo, video, or mask spoof.

Remote Collection of Biometric Images/Templates

To verify biometric data, an individual typically is required to enter a bank branch, a government office such as a DMV or police station, or other "trusted" location to have his/her biometric data collected. For example, a bank may require a photograph, a fingerprint, or a voice recording to open certain types of accounts. The obtained biometric data is then linked to the person and the account. This in-person collection of biometric data has typically been required because there was no other way to trust that an individual was indeed who they claimed to be. Through the in-person collection, the identification is verified by, for example, the person providing documents with their name and photograph issued by a governing body.

However, according to an exemplary embodiment disclosed herein, an individual may provide his/her own biometric data using any smart device with a biometric sensor or camera to be verified without in-person verification. In fact, according to the disclosed embodiments, account providing or financial institutions may trust with more certainty than ever before that the biometric data provided is from the correct individual and not an imposter, hacker, or bad actor.

Figure 18:
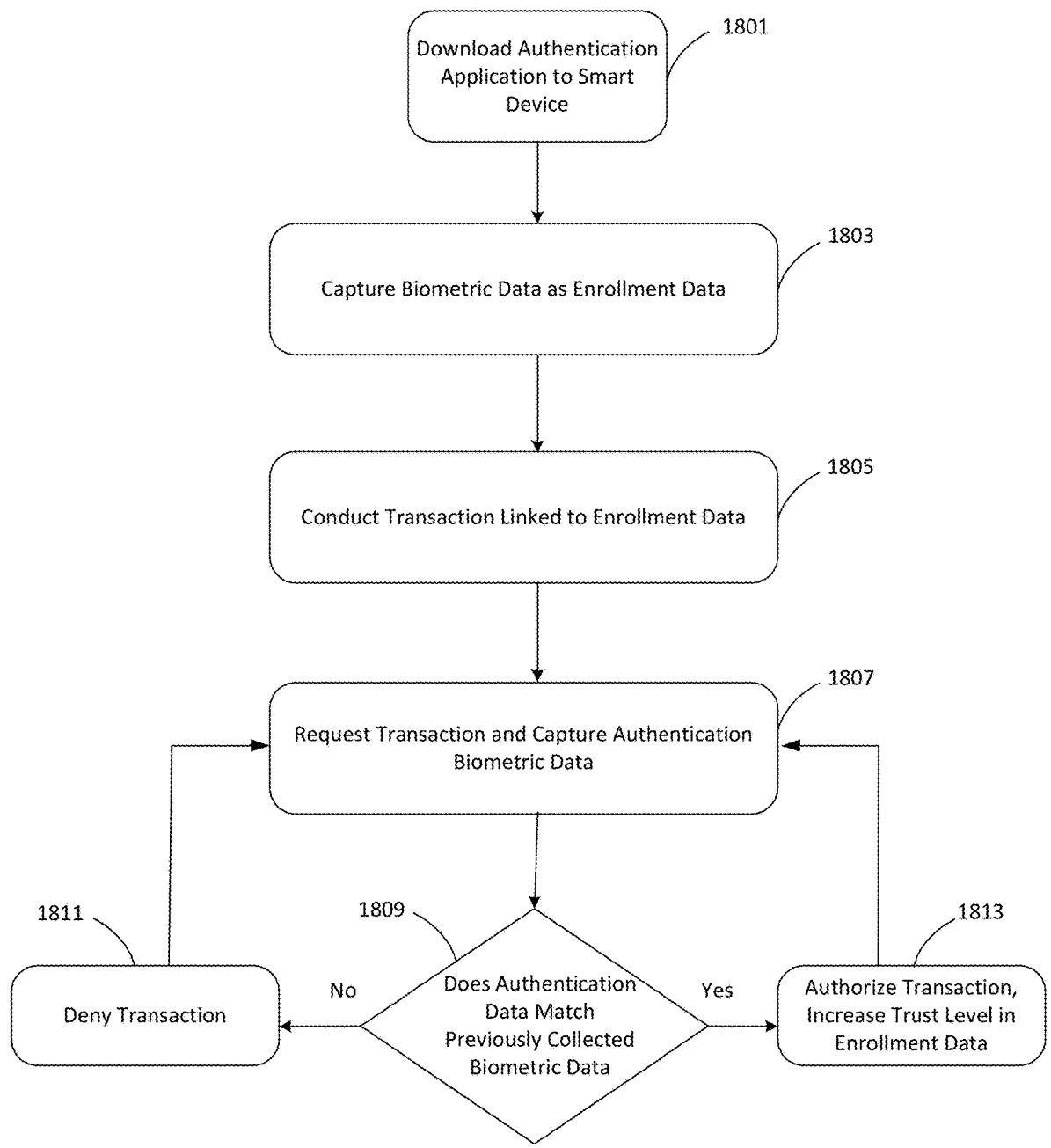
FIG. 18 shows a method of remotely establishing a biometric identity, according to one exemplary embodiment.

FIG. 18 shows a method of remotely establishing a biometric identity, according to one exemplary embodiment. In this embodiment, an individual first downloads an application to his/her smart device from an institution with which he/she either has an account, or with which he/she wants to open an account in step 1801. Upon opening the application and when prompted, the person presents his/her face, fingerprint, etc. to the camera or sensor. The biometric data is captured and stored on the device as "enrollment data" in step 1803. In some embodiments, the enrollment data is sent to the server.

Next, the user makes a payment or a deposit to the institution in step 1805. For example, if a lending institution has provided a mortgage to the user, then the user would enter his/her payment account information into the application so that the institution could collect payment. When the payment information and authorization is transmitted to the lending institution some or all of the biometric enrollment data from the user is collected and is transferred to the lending institutions server with it. Because the payment is made by the user for the user's debt, which causes money to flow away from the user and thus would not occur by a potential hacker or person committing fraud, the resulting biometric data collected as part of the transaction is considered as trusted.

Later, when the user again opens the application to conduct another transaction, the user is again prompted to present his/her biometric information to the camera or sensor, and new biometric templates can be created in step 1807. The new biometric templates are compared to the previous "enrollment data" on the device and/or the new templates can be sent to the server for comparison in step 1809. In some embodiments, the device may compare the templates by downloading the enrollment data templates from the server to the device for matching.

When it is determined that the new biometric information and/or templates do not match the enrollment data, then the transaction may be denied as shown in step 1811 and the root identity will not have the unmatched biometric data added to it. However, when the new biometric information sufficiently matches the enrollment data, the transaction may be authorized as shown in step 1813. Furthermore, when there is a match, the trust level of the biometric data appended to the user's profile is increased.

Because the user is sending funds into the account, for example to pay a debt or to make a deposit, he/she has an incentive to be able to later access the account that contains those funds or that has had debt reduced. Thus, over time as several deposits and/or payments are made with matching biometric templates, the trust in the identity of the user performing the transactions increases as shown in the loop of steps 1807, 1809, and 1813.

To limit liability, access of withdrawals can be limited to the same amount or less than has been deposited or paid in total by the user. For example, if a user pays a $3,000 mortgage payment each month for three months using his/her smart device and using his/her face to identify themselves each time, the lending institution may be willing to allow that person to transfer up to $9,000 from a different account that the bank has for the user, such as a checking account.

As banks and other lending institutions report on outstanding balances, credit limits, and payment timeliness to the credit bureaus, it is envisaged that the bank could also provide the biometric template (possibly in an encrypted format) to the credit bureau to store as part of the identifying information in the user's credit file. Then if the user desires to apply for credit from a different institution that institution can require that the user access their version of the application with the same biometric data collection system as was used to create the template. The biometric templates could be sent to the credit bureaus servers and be compared with the templates on file for that individual. With this process, the user can positively identify themselves and grant access to the financial institution to view their credit information without providing or transmitting their social security number, date of birth or other sensitive information.

If a user does not have a debt to pay to the account issuer or the issuer is not a financial institution, it is possible to simply offer a temporary escrow service to provide the assurance that the biometric data provided is true and correct for the user being claimed. For example, a user can provide a credit card number with his/her name and address, the card could be billed $100 and the user would provide their biometric data to the app in their smart device. The user would then correctly answer a series of knowledge based authentication questions based on their credit report, insurance information, medical information or other potential confidential information, and provide their biometric data again to the app to retrieve the funds. The result is a biometric identity that can be trusted in future transactions up to the amount that was previously placed into escrow and successfully retrieved.

Decentralized Biometric Identity Ledger

There are numerous security and privacy benefits to a decentralized, anonymous, biometric identity network as compared to biometric authentication conducted on a centralized database or solely on a user device. As previously explained, biometric identity information may comprise images having biometric data such as digital photographs of a face or a fingerprint, and/or biometric templates which are strings of numbers representing data that has been captured by a sensor and converted to a string by a biometric recognition algorithm.

Figure 19:
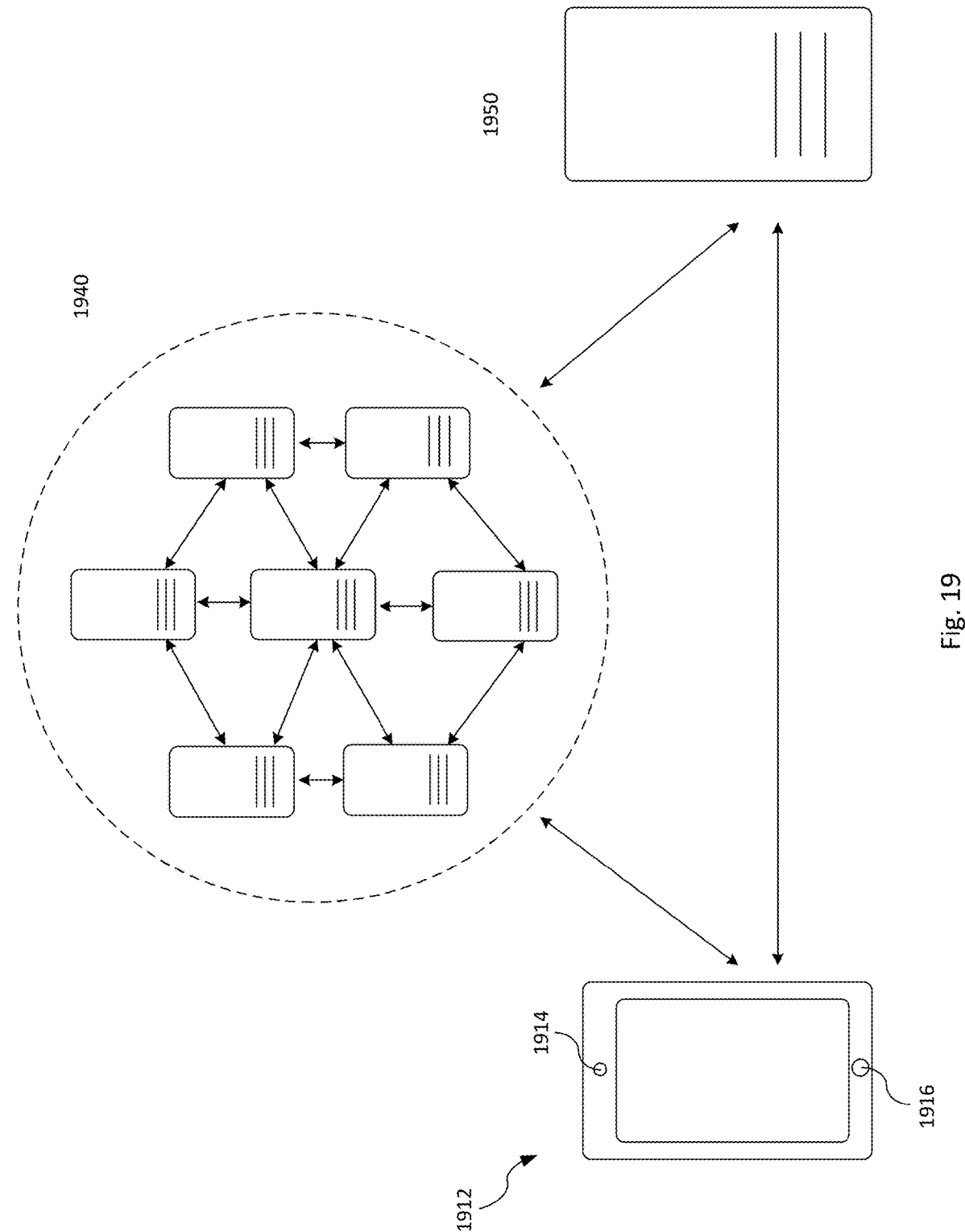
FIG. 19 shows a system of biometric authentication using a blockchain, according to an exemplary embodiment.

Decentralized Ledgers such as Blockchains, Tangles, HashGraphs etc., referred to hereafter at Blockchains, can be used to create public or private records that provide an immutable transaction history. The blocks may store various data, and in this embodiment, the blocks may store biometric data in the form of an image or a biometric template created from a biometric sensor (camera, fingerprint scanner, etc.) and/or from an algorithm analyzing an output from the biometric sensor (photograph, fingerprint scan, etc.). FIG. 19 shows a system of biometric authentication using a blockchain, according to an exemplary embodiment.

In an exemplary biometric authentication method, a smart device 1912 would run an application allowing a sensor 1916 or camera 1914 to capture biometric data and optionally convert the biometric data to one or more biometric templates. That biometric data and/or template(s) would be added to an encrypted block along with additional information such as a device ID, a unique user ID, user identity information, the algorithm/sensor version/type info, date and time stamp, GPS information, and/or other data.

The block may be added to the blockchain 1940 where it is stored. If the user attempts to open the application again, or provides the public key or a unique user identifier that corresponds to the public key for the block into another application. Then the user is again presented with the biometric data capture interface through which the user again presents his/her biometric data to the sensor 1619 or camera 1914. The captured biometric data may again optionally be converted to a biometric template on the device 1912. Next, the user's previous block is requested from the blockchain 1940 and is downloaded to the smart device 1912 where a private key may be kept in the application to decrypt the block. The data and/or biometric template(s) from the block can now be compared to the recently captured biometric data and/or biometric template(s). If a match is found, then the user is authenticated and granted access to the application, can make a transaction, etc. and the successful decryption of the block and the matching of the templates can be recorded with any combination of the data, the transaction, original template, the most recently successfully matched template or both may be stored in the new block.

In addition to or as an alternative to the comparison and matching being done on the device 1912, the comparison and matching may be completed on the blockchain ledger servers 1940. In this instance, biometric data obtained at the user device 1912 and/or biometric template(s) generated at the user device 1912 from the biometric data is encrypted and sent to the blockchain ledger servers 1940. Next, the public key and the private decryption key may be sent to the blockchain ledger servers 1940 to decrypt one or more previous blocks of the user's biometric information and/or template(s) as well as to decrypt the most recently sent biometric data and/or template(s). The blockchain ledger servers 1940 then run the matching algorithms to determine if the biometric information and/or template(s) stored in the block and the most recently collected biometric information and/or template(s) are deemed a match by the thresholds previously set in the matching algorithm. By providing template matching on all the blockchain ledger severs 1940 (which could be hundreds or thousands of servers), an account provider can be sure that the device 1912 running the application has not been compromised if the matching results are the same as on the blockchain ledger servers 1940. The device 1912 and all of the blockchain ledger servers 1940 would have to be compromised at the same time for a hacker to change all of them, which of course would be highly unlikely if not impossible.

In yet another embodiment a dedicated "matching server" 1950 could be employed that would be sent a copy of both the recently collected biometric information and/or template(s) from the device and the biometric information and/or template(s) in the block. The device 1912 may provide the decryption key directly to the matching server 1950, or the blockchain 1940 could be instructed to send the encrypted biometric template(s) to the matching server with a "smart contract" which is a set of computer instructions coded into the block. This is a feature of blockchains with decentralized processing abilities like Ethereum.

It is also envisaged that when a new device requests a block using a user's unique ID, for example an email address, phone number, or a public key, that the device is only authorized to download blocks in the chain that contain biometric templates of the user that are associated with that unique ID because the device contains the private keys. So the user's most recent templates could be compared with all the templates that have been captured and are stored on the blockchain, allowing for multiple matches. This may provide fewer false rejections of the correct users that can result from changes in appearance due to lighting, aging, makeup, hair, beard, glasses, etc.

In one configuration of the system and method disclosed herein, there is a private key and the private key will decrypt the block contents, but the biometric data inside the block is what is used on the comparison to determine if there is a match between new biometric data and stored biometric data. Thus, the private key is required to gain access to the biometric data block. The private key may be created by the user, the system, or the private key could corresponded to a combination of unique identifiers that are is easier to remember, a phone number, a social security number, an email address and a date of birth, etc., and thus also unique to the user. In this configuration, it's possible and contemplated that there are two blockchains, one with the personal data in it, and one with anonymous storage of biometrics templates only, in it. The personal data blocks in the first blockchain would be decrypted by a private key or corresponding personal data combos that only you know, and you share it only with specific vendors that you want to be able to verify that identity, then in that data the block number of another block(s) with your biometric data is appended to that record and then the app can go unlock that block and match/update your newly uploaded biometric data to the data in that biometric block.

In addition to the biometric matching, the application collecting the biometric data may perform liveness tests on the biometric data collected, such as those described above. If the user is proven to exhibit traits that typically only exist in living humans, at the exact moment that the identity is verified then the biometric data can be trusted to be from a real human being, not a non-living object such as a photo or video spoof.

Figure 20:
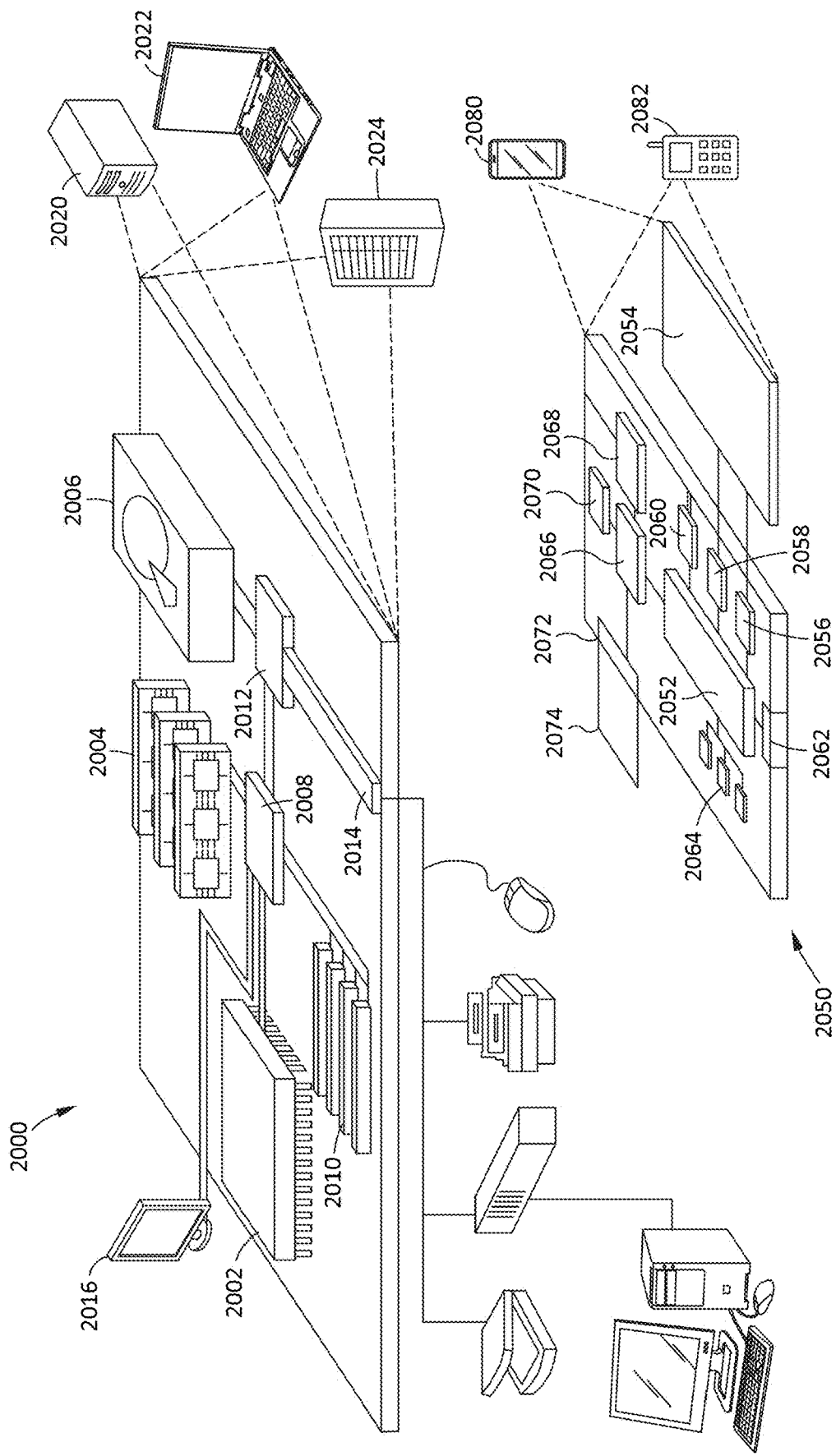
FIG. 20 is a schematic of a computing or mobile device such as one of the devices described above, according to one exemplary embodiment

FIG. 20 is a schematic of a computing or mobile device, or server, such as one of the devices described above, according to one exemplary embodiment. FIG. 20 shows an example of a computing device 2070 and a mobile computing device 2050, which may be used with the techniques described here. Computing device 2070 is intended to represent various forms of digital computers, such as laptops, desktops, workstations, personal digital assistants, servers, blade servers, mainframes, and other appropriate computers. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit the implementations described and/or claimed in this document.

Computing device 2070 includes a processor 2002, memory 2004, a storage device 2006, a high-speed interface or controller 2008 connecting to memory 2004 and high-speed expansion ports 2010, and a low-speed interface or controller 2012 connecting to low-speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2070, including instructions stored in the memory 2004 or on the storage device 2006 to display graphical information for a GUI on an external input/output device, such as display 2016 coupled to high-speed controller 2008. In other implementations, multiple processors and/or multiple buses may be used, as appropriate, along with multiple memories and types of memory. Also, multiple computing devices 2070 may be connected, with each device providing portions of the necessary operations (e.g., as a server bank, a group of blade servers, or a multi-processor system).

The memory 2004 stores information within the computing device 2070. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2070. In one implementation, the storage device 2006 may be or contain a computer-readable medium, such as a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high-speed controller 2008 manages bandwidth-intensive operations for the computing device 2070, while the low-speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed bus 2014. The low-speed bus 2014, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2070 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2070 may be combined with other components in a mobile device (not shown), such as device 2050. Each of such devices may contain one or more of computing device 2070, 2050, and an entire system may be made up of multiple computing devices 2070, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provide in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provide as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, Wifi, or other such transceiver (not shown). In addition, GPS (Global Positioning system) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smart phone 2082, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 2070 and/or 2050) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Biometric data templates are not suitable to be used as public keys, and cannot be reliably hashed into public keys because each session contains biometric data that is slightly different than previous sessions. Biometric matching is done by creating a probability of a match and setting an acceptable threshold. In one embodiment, the settings are such that if the comparison reveals collected biometrics data that a 100% match, it is may be considered to not be a match an instead a potential fraud attempt because biometric data comparisons are typically never a 100% a match unless a replay (of the same data) attack is being perpetrated. Because biometrics rely on probability to confirm a matching identity it is important not to allow bad actors to specifically target a known identity armed with copies of that individual's biometric data, such a photos, videos or masks. This may be achieved by limiting access to the blockchain using user question data. It is also contemplated that an efficient means to provide a blockchain wherein the identity of the individual whose biometric data contained in each encrypted block is not readily known to the other users of the blockchain and therefore cannot be easily singled out and targeted is desirable. This is typically accomplished in blockchains with a Public Key, however if a bad actor knows the public key for a specific individual they can target a spoofing attack with reproduction of that individual's biometric data. By using a questions layer (requiring users to answer questions before granting access to the block chain) that does not require the users to store, transmit or even know their public key, the likelihood that a bad actor could match a specific block to a specific user and then spoof the system is reduced significantly. This method would allow a user to easily input data from memory that would then be used to recreate their Public Key and then used to identify to the blocks in the block chain system that contain their encrypted biometric data for authentication but not use personally identifiable information (PII) to do so. In one embodiment, this is accomplished through a series of questions that the person answers to generate user question data. In one embodiment, these questions are such that the person would always know the answers, such as city of birth, parent names, or high school name. In one embodiment, the questions are such that the person creates the answers such as favorites, things that change, or opinion based questions. Examples of this type of user question data include favorite color, favorite food, or favorite holiday. In one embodiment, the user question data is created based on system requirements but does not relate to the user. Examples of this type of user data may be data containing only numbers, data containing special symbols, data containing only letters, and/or data containing a required number of each type of characters. Some of this data may be easily recalled and thus not forgotten by the user. Other data is less likely to be guessed by others, but is harder to remember. It is contemplated that any other type of information and questions may be used for the user questions and associated user question data.

For the questions that are easily recalled or which are memorized, this user question data is always available to the user. In one embodiment, as part of an identification process, the user is asked questions or asked to provide the answers (user question data) to the questions. The user question data is concatenated and then hashed to create a public key and/or block identifier. This may then be used for one or more of the following: identify the user, identify the block associated with the user in the block chain, combined with personally identifiable information to identify the user or the blocks that contain a user's encrypted information. For example, this concatenated and hashed user question data may identify to the authentication system which block to match their biometric authentication session against. This user question data may be referred to as a public key.

Examples of the type of user questions include, but are not limited to, best year of your life, number of siblings, shoe size, height, favorite color, eye color, last 4 digits of your first phone number, middle name, parents name, favorite grade in school, favorite month, favorite day of the year, best physical trait, school name, favorite food, dietary choices, political affiliation, and religious affiliation or any other similar type of question or data. In one embodiment the data is well known (and not forgettable by the user) but is not of the type that is of public record or can be obtained by typical identity theft methods.

In one example method of operation, this authentication system may be used when obtaining a money loan, at an automobile dealership, or any other situation where it is necessary or desired to positively identify the person and allow them to grant access their credit bureau information to a third party (or some other function where identity is required and important).

Figure 21:
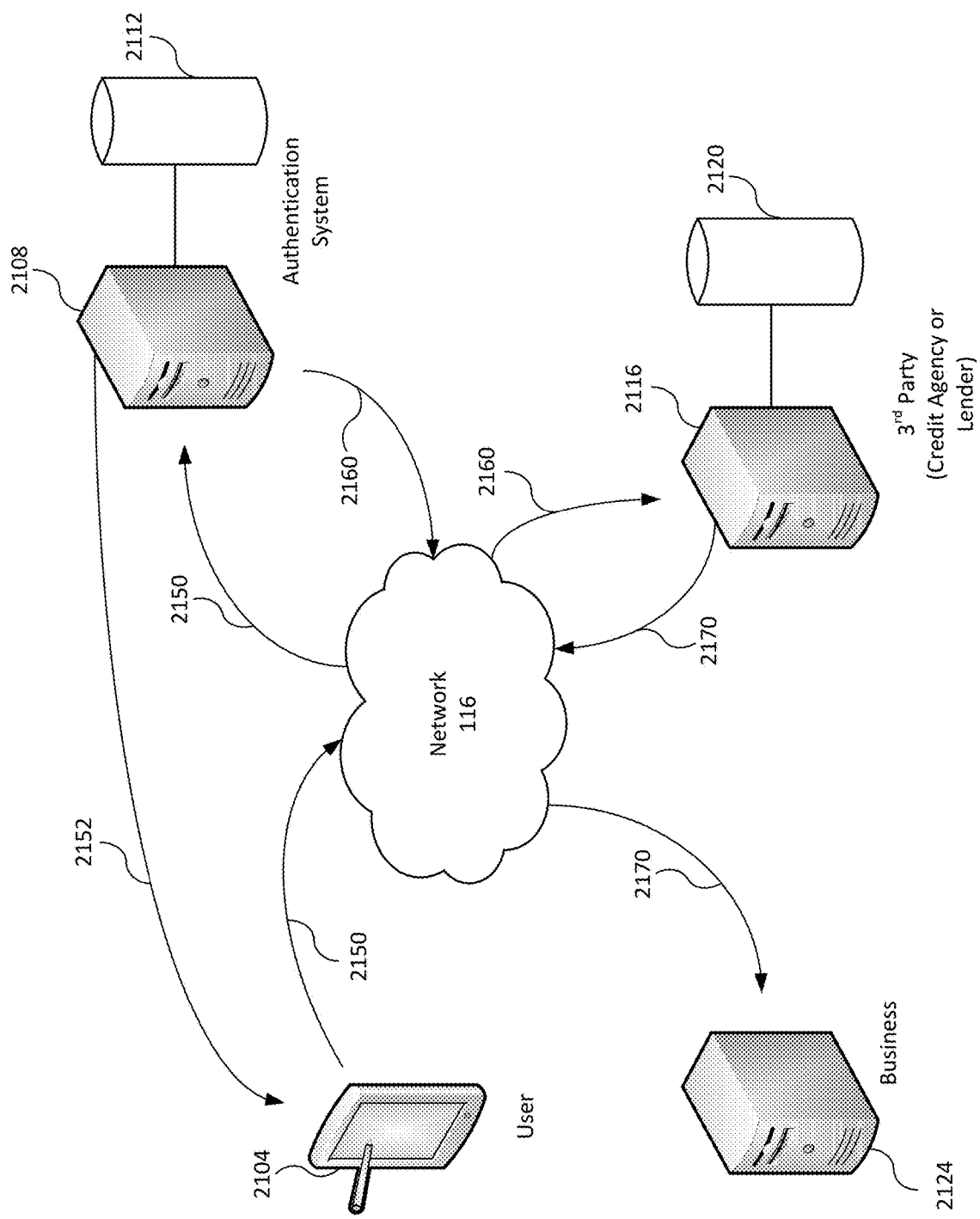
FIG. 21 illustrates a block diagram of an example system and environment of use.

FIG. 21 illustrates a block diagram of an example system and environment of use. In reference to FIG. 21, at the automobile dealer (business) 2124 (one example environment of use), the user is presented with a computer interface 2104, such as a tablet. Using the computer interface 2104, the user questions data may be inputted into a secure application or web interface with drop down fields or text fields which do not store or record the user's input. The user is presented with questions for which they select their previously specified answers, or they provide the user question data without being presented with questions. At this stage a hash operation or other algorithm processing may occur to the one or more user question data. The hash may occur on device 2104 or on a separate device 2108. Example operations that may occur on the user question data may include, but is not limited to hash, encryption, combination with personal identifiable information such as name or social security number. By hashing or otherwise processing the user question data at this stage (prior to electronic transmission or storage) the user question data is protected. A biometric authentication session may also be performed on the same device prior to, at the same time as, or after, providing and processing the user question data.

The user device 2104 provides the user question data which, after hashing or other processing is provided 2150 by electronic transmission, to the remote authentication system 2018 with associated database 2112 to identify both the user and their block. The authentication system 2108 can run a same hash operation on the stored previously captured data, stored on data base 2112 to determine if the received data matches a user, account, block in a blockchain, or another identifier. In accordance with blockchain operation, many authentication systems 2018 may be provided at different locations, or there blockchain data for the user maybe stored in many different databases 2112 at different locations. The authentication system 2108 may provide communication back to the user. Thus, the submitted user answer data matching the stored user answer data may identify the blockchain which stores the user's authentication data, grant access to the blockchain, or both.

Once the block or blocks that are associated with that public key are identified, it can be decrypted with the hash to obtain the contents of that block. In this example, the hashed user question data provides access to the user's blocks and can be used to reveal the biometric data stored in the block, which is then compared to the newly submitted user's authentication attempt (facial data and movement data) to determine if the user's identity matches the identity stored in the block chain (distributed at different locations thus preventing unauthorized access and unauthorized changes). If a match occurs, then, credit agency, loan department or other entity 2116 will receive notice of the authentication via communication 2160. This in turn may allow the loan to occur or a credit report to be sent to the business 2124 via communication 2170. For example, if the loan or credit is approved by the $3^{rd}$ party 2116, then that will be communicated to the car dealership 2124 which in turn will allow the car to be driven away with only the down payment and/or a payment agreement. The match may also be a gateway requirement before the dealership can pull a user's credit or access a user's credit report. It is contemplated that in some embodiments the lender 2116 and business 2124 may be combined.

Using this method, the user may provide user question data that would not be easily known by a third party since it is personal to the user and not asked by third parties. This form of data and associated method overcomes the drawbacks of the prior art by providing and associating complex data (user question data) that the user will have memorized and thus always with them but yet that others don't know, and which uniquely identifies themselves or their block or account in the blockchain. The answer to the user question data is complex, difficult to guess and longer and more difficult to obtain by a third party than the nine digit social security number or other personal information (PII) but is generally easy for the user to remember.

If a third party knows the answers to all of the user's questions, the system would only allow them to attempt to match presented biometric data with the data stored in the blocks for that user. Because the third party will not easily match the biometric data with a photo, video or mask if the biometric authentication has strong depth and liveness detection systems, the authentication attempt would be not authenticated and thus the third party would not able to impersonate the user. In addition an email address or mobile phone number could be entered into to the encrypted block when the user is enrolling and an email or text message could be sent to the registered user's email address or phone number every time that block is unlocked and the biometric data matched from an authentication session or for every attempt. This would alert a user if a bad actor had gained the answers to their public key generating questions and was attempting to impersonate them through various means such as by using a look-alike of the user for a biometric spoof. If the bad actor was successful in spoofing the system the real registered user would get an email saying that a successful authentication session had been performed and if it was not them they could initiate steps to stop the bad actor. Notification could also be provided for unsuccessful attempts to access the block. It is contemplated that notification may be sent by email, phone call, or text, or any combination. In embodiment, the system may alternatively or in addition send a verification code to the user, such as by mail, phone (voice), or text, that must be entered with the user question data to provide an additional level of security. Sending and entry of verification codes are known and thus not described in detail.

It is contemplated that the user question data can arrive into the dealership, credit agency, bank or other entity, in any manner. For example, the user question data may be entered by the user with the business's device, uploaded by the user on their own device, by using a third party kiosk, provided by telephone, text messages, or any other means. Using this innovation, a method of creating a public key that people can easily remember because it is well suited for how human memory works. While the user question data may not all be secret, it can be easily remembered and it is not publicly available and has not been part of the numerous data breaches, as the questions are not typical data such as social security number, birth date, and middle name. Any number of questions may be provided to create the public key, such as for example, two questions or ten questions such that the more questions, the less likely someone will know or guess the answers to access the block data for an authentication attempt. While it is possible to use a user's name, social security number, email or phone, this data would also identity the user and easily lead back to the blocks in the blockchain but would expose the user's identity and can become known due to use of that information in other situations. With the disclosed system, utilizing user question data, the identity of the user and the block that stores their corresponding biometric data are anonymous to everyone including the operators of the blockchain nodes. It is still possible for an individual to provide all of the answers to their user questions to a dishonest $3^{rd}$ party or have that information phished from them unknowingly, but this is unlikely. For this to occur would still require the bad actor to spoof the biometric authentication system to gain access to any credit information or other information, which due to the extreme accuracy of the authentication routines disclosed herein, is extremely unlikely.

Figure 22:
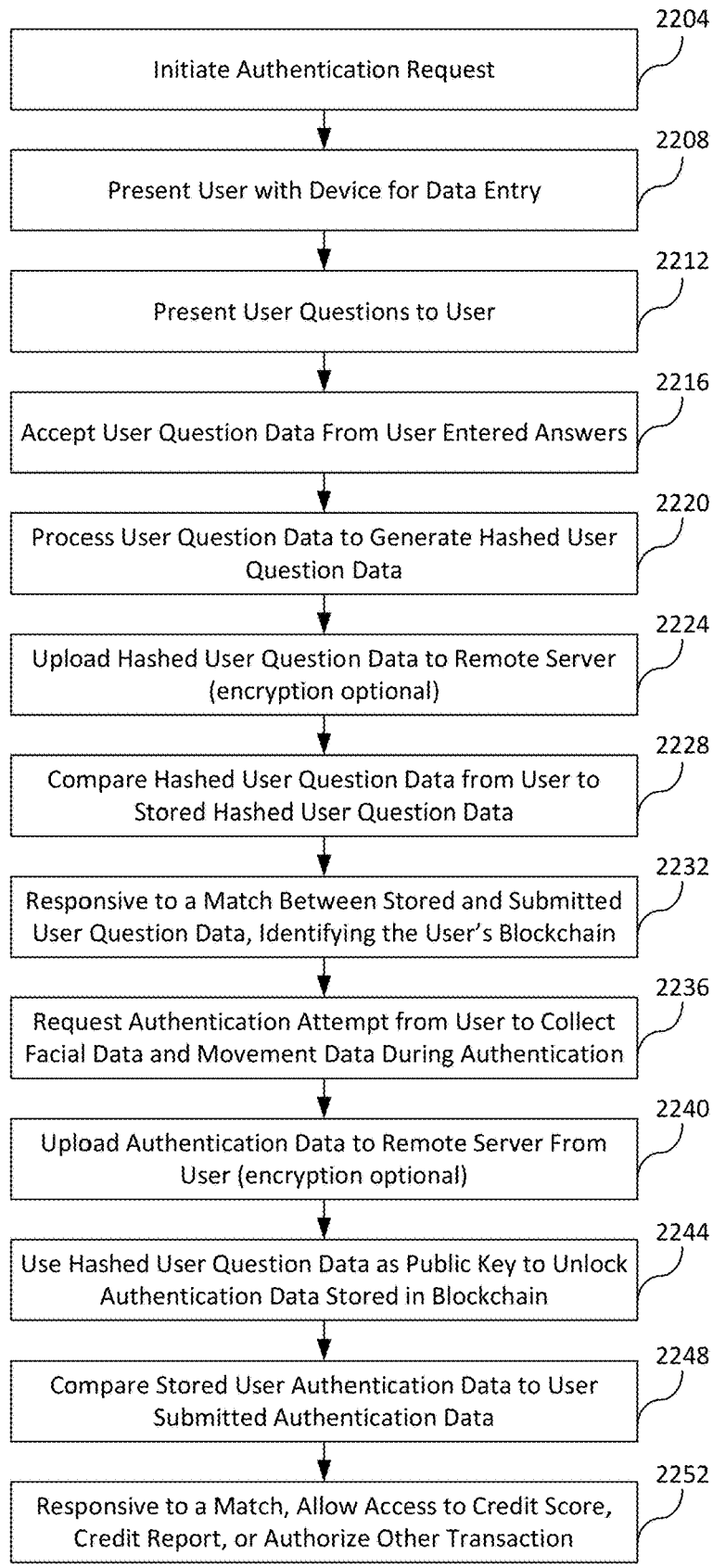
FIG. 22 illustrates a flow chart providing an example method of operation.

FIG. 22 illustrates as flow chart providing an example method of operation. This is but one possible method of operation and it is contemplated that in other systems and environments the method may depart from that disclosed in FIG. 22 without departing from the claims. At a step 2204 the user, business, or system initiates an authentication session and as part of this, at a step 2208 the business attempting to verify the identity of the person may present to the user a computing device for data entry. The device may be any computer, including a tablet. The device and any server described herein may include a processor with memory such that the memory stored non-transitory machine executable instructions which are executable on the processor. The non-transitory machine executable instructions may also be referred to as software. At a step 2212 the computing device presents questions to the user and as the user provides their answers the computing device accepts the user question data at step 2216.

At a step 2020 the system processes the user question data to generate hashed user question data. This could also occur at a remote location. The hashed user question data may serve as a public key. Then, at a step 2024 the system uploads the hashed user question data to a remote server (encryption optional). Then, at a step 2228, the system, such as a remote computer configured for user authentication, compares hashed user question data from the user to stored hashed user question data that is stored on one or more databases. The stored data was from earlier input from the user when the identity was known.

At a step 2232, responsive to a match between the stored user question data and the submitted user question data (hashed or unhashed), the system identifies the user's blockchain. Thereafter, the system requests an authentication attempt from the user to collect facial data and movement data during authentication. This occurs at a step 2236. In this embodiment, this data is collected the user question data matches, but in other embodiments, the user facial and movement data may be collected at the time of collection of the user question data. At a step 2240, the system uploads the authentication data to a remote server from a user (encryption optional) and at a step 2244 the system uses the hashed user question data as a public key to unlock the authentication data (facial, movement, or combination thereof) that is stored in the blockchain. This may occur at multiple locations such is the nature of a distributed blockchain.

At a step 2248 the authentication system compares the stored user authentication data to the user submitted authentication data to determine if there is a match within a predetermine threshold. As discussed above, 100% matches are unlikely or impossible so the similarities between data should be within some range or threshold which can be adjusted based on the use and need to verify identity. At a step 2252, responsive to a match, access is allowed or the requested information is provided such as access to a credit score, credit report, or authorization for other type transaction or loan. This system can be used in any scenario where verifying a person's identity is important. For example, buying a expensive watch or jewelry would benefit from identify verification, or access to a secure location or data.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for authenticating identity of a customer as part of a business transaction comprising:
   presenting a customer, with customer questions, the customer questions having corresponding customer answers;
   receiving customer answers from the customer in response to the presenting of customer questions;
   processing the customer answers to create processed customer answers;
   transmitting the processed customer answers to a remote computing device;
   comparing processed customer answers to stored data at the remote computing device;
   responsive to the comparing determining that a match has not occurred, then denying further authentication;
   responsive to the comparing determine that a match has occurred, then allowing further authentication by:
   capturing and processing one or more facial images of the customer to convert the one or more facial images to captured authentication data to verify the liveness of the customer and
   comparing the captured authentication data to stored authentication data to determining if a match occurs, wherein the stored authentication data is stored in a blockchain and the comparing the reverse processed customer answers to stored customer answers data for a match controls access to the blockchain storing the stored authentication data; and
   wherein verifying the liveness of the customer occurs by processing a first image of the customer's face captured, with a camera, at a first distance from the customer and capturing a second image of the customer's face captured, with the camera, at a second distance from the customer, the first distance being different than the second distance and the user or the camera moves from the first distance to the second distance.

2. The method of claim 1 wherein the processed customer answers are encrypted, subject to a hash operation, or both.

3. The method of claim 1 wherein a result of the identity and liveness verification of the customer is communicated to a business to thereby verify the identity of the customer to the business.

4. The method of claim 3 wherein the business is a credit reporting agency or a lender.

5. The method of claim 1 wherein the authentication further comprises comparing at least one image of the customer's face to a previously captured image of the customer's face which is part of stored authentication data.

6. An authentication system to verify a user's identity comprising:
   a data collection device having a processor and memory storing non-transitory machine executable code which is executable by the processor, the machine executable code of the data collection device configured to:
   present user related questions to the user;
   receive answers to the user related questions, the answers entered by the user into the data collection device;
   process the answers to create secured answer data;
   transmit the secured answer data;
   responsive to instructions from a remote server, collect and transmit collected authentication data from the user;
   the remote server having a processor and memory storing non-transitory machine executable code which is executable by the processor, the machine executable code configured to:
   receive the secured answer data from the data collection device and:
   process the secured answer to determine if the received secured answer data matches stored secured answer data;
   responsive to the received secured answer data not matching the stored secured answer data, denying access to stored authentication data for the user;
   responsive to the received secured answer data matching the stored secured answer data:
   initiate an authentication session by communicating with the data collection device to collect and transmit collected authentication data;
   receive collected authentication data from the data collection device; and
   compare the collected authentication data received from the data collection device to stored user authentication data stored on the remote server to determine if a match occurs, such that a match verifies the identity of the user wherein the stored user authentication data is stored in a blockchain and the blockchain storing the stored user authentication data is accessed only if the received secured answer data matches the stored secured answer data;

wherein the collected authentication data comprises one or more images of the user captured by a camera of the data collection device; and the user authentication data comprises a first image of the user's face captured, by the camera, at a first distance separating the user and the camera and second image of the user's face captured, by the camera, at a second distance separating the user and the camera, and wherein the first distance is different from the second distance and the change in distance results in movement of the camera, movement of the user, or both.

7. The system of claim 6 wherein the secured answer data comprises encrypted answers or hashed answers.

8. The system of claim 6 further comprising transmitting a verified identity notice to a third party server and responsive thereto, receiving data from the third party server as part of a business transaction.

9. An authentication system for use by a business to verify identity of a user, the authentication system comprising:
a data collection device having a screen and a user interface, the data collection device configured to:
receive answers from the user to questions presented to the user;
process the answers to create secure answer data;
transmit the secure answer data to a verification server;
a verification server configured to:
receive the secure answer data from the data collection device;
compare the secure answer data or processed secure answer data to stored answer data;
responsive to the comparing determining that the secure answer data or processed secure answer data does not match the stored answer data, terminating the identify verification;
responsive to the comparing determining the secure answer data or processed secure answer data matchings the stored answer data, initiating an authentication session which includes:
capture of one or more images of the customer's face with a camera associated with the data collection device or another device process the at least one of the one or more images of the customer's face to generate captured image data;
transmit the captured image data to the verification server;
at the verification server, process the captured image data to verify three dimensionality of the user;
compare the captured image data to stored image data derived from at least one previously captured image of the user's face to determine if a match occurs within a threshold range, wherein the stored image data derived from at least one previously captured image of the user's face is stored in a blockchain; and
responsive to verifying three dimensionality of the user and obtaining the match within the threshold range, then verify the identity of the user to the business.

10. The system of claim 9 wherein the data collection device is an electronic device owned by the user.

11. The system of claim 9 wherein the data collection device is an electronic device owned by the business.

12. The system of claim 9 wherein the stored answer data is created by performing the same processing on the answers as occurred by the data collection device to form the secure answer data.

13. The system of claim 9 wherein the questions presented to the user are based on information personal to the user.

14. The system of claim 9 wherein the one or more images of the user's face comprises a first image captured with the camera at a first distance from the user and a second image captured with the camera at a second distance from the user, the first distance different than the second distance.

15. A method for verifying identity of a customer by a business comprising:
initiating an identity verification session for the customer;
at the business, presenting to questions to the customer, the questions having stored answers which are stored at a remote location;
at the business, receiving customer answers to the questions;
transmitting the customer answers or a processed version of the customer answers to an authentication system;
receiving the customer answers or the processed version of the customer answers at the authentication system;
comparing the customer answers or the processed version of the customer answers to stored customer answers or a stored processed version of the customer answers to determine if a match occurs, wherein the stored customer answers or a stored processed version of the customer answers is stored a blockchain;
if a match does not occur, providing notice to the business of a failure to match and ending the identity verification processes;
if a match does occur, initiating an authentication process by obtaining one or more images of the customer's face with a camera;
processing one or more of the images of the customer's face to generate captured facial image data;
transmitting the captured facial image data to the authentication system;
processing the captured facial image data to determine three-dimensionality and liveness of the customer generating the captured facial image data;
comparing the captured facial image data to stored facial image data confirm the stored facial image data matches the captured facial image data, the stored facial image data based on previously captured images of the customer's face.

16. The method of claim 15 further comprising, responsive to the stored facial image data matching the captured facial image data, sending an identity verification success message to the business.

17. The method of claim 15 further comprising, responsive to the stored facial image data matching the captured facial image data, sending an identity verification success message to a credit reporting agency so the credit reporting agency can sent a credit report to the business.

18. The method of claim 15 further comprising, responsive to the stored facial image data matching the captured facial image data, sending an identity verification success message to a lender so the lender will provide a loan or financing to the customer.

19. The method of claim 15 wherein the one or more images of the user comprise a first image capture with the camera a first distance from the customer's face and a second image captured with the camera a second distance from the user's face, the first distance different than the second distance.

20. The method of claim 15 wherein the customer answers are encrypted or hashed prior to transmitting to the authentication system.

\* \* \* \* \*